(12) United States Patent
Takaoka et al.

(10) Patent No.: US 9,241,329 B2
(45) Date of Patent: *Jan. 19, 2016

(54) WIRELESS COMMUNICATION APPARATUS AND FREQUENCY HOPPING METHOD

(71) Applicant: Panasonic Intellectual Property Corporation of America, Torrance, CA (US)

(72) Inventors: Shinsuke Takaoka, Osaka (JP); Daichi Imamura, Beijing (CN); Seigo Nakao, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,897

(22) Filed: Nov. 3, 2014

(65) Prior Publication Data

US 2015/0055618 A1    Feb. 26, 2015

Related U.S. Application Data

(63) Continuation of application No. 14/195,628, filed on Mar. 3, 2014, now Pat. No. 8,908,495, which is a continuation of application No. 13/320,318, filed as application No. PCT/JP2010/003606 on May 28, 2010, now Pat. No. 8,705,339.

(30) Foreign Application Priority Data

May 29, 2009 (JP) ................................ 2009-131255
Apr. 30, 2010 (JP) ................................ 2010-105329

(51) Int. Cl.
*H04J 11/00* (2006.01)
*H04W 72/04* (2009.01)
(Continued)

(52) U.S. Cl.
CPC ............. *H04W 72/042* (2013.01); *H04B 1/713* (2013.01); *H04J 1/02* (2013.01); *H04L 5/0005* (2013.01); *H04L 5/0012* (2013.01); *H04L 27/2605* (2013.01)

(58) Field of Classification Search
None
See application file for complete search history.

(56) References Cited

U.S. PATENT DOCUMENTS

| 6,567,459 B1 | 5/2003 | Hakkinen et al. |
| 7,852,743 B2 | 12/2010 | Kwon et al. |

(Continued)

FOREIGN PATENT DOCUMENTS

| CN | 1256816 A | 6/2000 |
| CN | 1567741 A | 1/2005 |

(Continued)

OTHER PUBLICATIONS

LG Electronics, "UCI piggybacking on PUSCH in case of transmit power limitation," R1-091205, 3GPP TSG RAN WG1 #56bis, Agenda Item: 15.4, Seoul, Korea, Mar. 23-27, 2009, 4 pages.

(Continued)

*Primary Examiner* — Bob Phunkulh
(74) *Attorney, Agent, or Firm* — Seed IP Law Group PLLC

(57) ABSTRACT

Disclosed are a wireless communication apparatus and frequency hopping method which minimize the change in the instantaneous power distribution characteristics of the time waveform of transmission signals when a plurality of channels are multiplexed by frequency division. At a terminal (200), a mapping unit (212) maps the PUCCH to frequency resources of a first slot, maps the PUSCH to frequency resources, among the frequency resources of the first slot, separated exactly by predetermined frequency spacing (B) from the frequency resources to which the PUCCH is mapped, and cyclically shifts the frequencies so as to map the PUCCH and PUSCH to frequency resources, within an IDFT or IFFT bandwidth, of a second slot while maintaining the predetermined frequency spacing (B), thereby allowing frequency hopping of the PUCCH and PUSCH between the first slot and the second slot.

22 Claims, 44 Drawing Sheets

(51) Int. Cl.
*H04B 1/713* (2011.01)
*H04L 5/00* (2006.01)
*H04J 1/02* (2006.01)
*H04L 27/26* (2006.01)

(56) References Cited

U.S. PATENT DOCUMENTS

| | | | |
|---|---|---|---|
| 8,179,857 | B2 | 5/2012 | Kwon et al. |
| 8,374,161 | B2 | 2/2013 | Malladi |
| 8,416,835 | B2 | 4/2013 | Ahn et al. |
| 8,437,379 | B2 | 5/2013 | Nanri |
| 8,509,178 | B2 | 8/2013 | Kwon et al. |
| 2008/0025247 | A1 | 1/2008 | McBeath et al. |
| 2008/0090528 | A1 | 4/2008 | Malladi |
| 2008/0165893 | A1 | 7/2008 | Malladi et al. |
| 2008/0212532 | A1 | 9/2008 | Heo et al. |
| 2009/0068956 | A1 | 3/2009 | Naito et al. |
| 2009/0239539 | A1 | 9/2009 | Zhang et al. |
| 2010/0091755 | A1 | 4/2010 | Kwon et al. |
| 2010/0099431 | A1 | 4/2010 | Sampath et al. |
| 2010/0111007 | A1 | 5/2010 | Suo et al. |
| 2010/0118828 | A1 | 5/2010 | Kwon et al. |
| 2010/0232373 | A1 | 9/2010 | Nory et al. |
| 2010/0284363 | A1 | 11/2010 | Ahn et al. |
| 2011/0007779 | A1 | 1/2011 | Nanri |
| 2011/0026471 | A1 | 2/2011 | Miki et al. |
| 2012/0076089 | A1 | 3/2012 | Kawamura et al. |
| 2012/0213193 | A1 | 8/2012 | Kwon et al. |
| 2013/0142149 | A1 | 6/2013 | Malladi |
| 2013/0286977 | A1 | 10/2013 | Kwon et al. |

FOREIGN PATENT DOCUMENTS

| | | |
|---|---|---|
| CN | 101184318 A | 5/2008 |
| CN | 101383654 A | 3/2009 |
| JP | 2009-049541 A | 3/2009 |
| JP | 2009-065403 A | 3/2009 |
| JP | 2010-219820 A | 9/2010 |
| WO | 2008/006088 A2 | 1/2008 |
| WO | 2008/048055 A1 | 4/2008 |
| WO | 2008/086481 A1 | 7/2008 |
| WO | 2009/008677 A2 | 1/2009 |
| WO | 2009/054396 A1 | 4/2009 |

OTHER PUBLICATIONS

3GPP TR 36.814 V0.4.1, "3rd Generation Partnership Project; Technical Specification Group Radio Access Network; Further Advancements for E-UTRA, Physical Layer Aspects (Release 9)," Feb. 2009, 31 pages.

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.

International Search Report, dated Jul. 6, 2010, for corresponding International Application No. PCT/JP2010/003606, 3 pages.

NTT DOCOMO, Inc., "UL Layered Control Signal Structure in LTE-Advanced," R1-083679, 3GPP TSG RAN WG1 Meeting #54bis, Prague, Czech Republic, Sep. 29-Oct. 3, 2008, 14 pages.

Samsung, "Concurrent PUSCH and PUCCH Transmissions," R1-090611, 3GPP TSG RAN WG1 #56, Athens, Greece, Feb. 9-13, 2009, 2 pages.

Search Report, dated Oct. 9, 2013, for corresponding Chinese Application No. 2010800237229, 2 pages.

ZTE, "Uplink Control Channel Design for LTE-Advanced," R1-090629, Agenda Item: 121, 3GPP TSG RAN WG1 Meeting #56, Athens, Greece, Feb. 9-13, 2009, 5 pages.

English Translation of Chinese Search Report dated Jul. 17, 2015, for corresponding CN Application No. 2014101854381, 2 pages.

| FREQUENCY DISTANCE FROM BOTH EDGES OF SYSTEM BAND | FREQUENCY DISTANCE FROM CENTRAL FREQUENCY OF SYSTEM BAND | FREQUENCY INTERVAL B | MAXIMUM VALUE (THRESHOLD) OF FREQUENCY INTERVAL B |
|---|---|---|---|
| LARGE | SMALL | WIDE | LIMITLESS |
| SMALL | LARGE | NARROW | X [RE] |

RE: Resource Element

FIG.26

| WITHIN Y[RE] FROM BOTH EDGES OF SYSTEM BAND | FREQUENCY INTERVAL B (MAXIMUM VALUE OF FREQUENCY INTERVAL B) |
|---|---|
| YES | X[RE] OR BELOW |
| NO | LIMITLESS |

FIG.28

| | WITHIN Y[RE] FROM BOTH EDGES OF SYSTEM BAND | TOTAL TRANSMISSION POWER OF FREQUENCY-DIVISION-MULTIPLEXED SIGNAL | FREQUENCY INTERVAL B (MAXIMUM VALUE OF FREQUENCY INTERVAL B) |
|---|---|---|---|
| Case (a) | YES | Z0[dBm] OR BELOW | LIMITLESS |
| Case (b) | YES | Z0[dBm] OR ABOVE | X0[RE] OR BELOW |
| Case (c) | NO | Z1[dBm] OR ABOVE, Z2[dBm] OR BELOW | LIMITLESS |
| Case (d) | NO | Z2[dBm] OR ABOVE | X1[RE] OR BELOW |

| | WITHIN Y[RB] FROM BOTH EDGES OF SYSTEM BAND | TRANSMISSION POWER OF ONE CHANNEL OF CHANNELS MAKING UP FREQUENCY-DIVISION-MULTIPLEXED SIGNAL | FREQUENCY INTERVAL B (MAXIMUM VALUE OF FREQUENCY INTERVAL B) |
|---|---|---|---|
| Case (a') | YES | $Z'_0$[dBm] OR BELOW | LIMITLESS |
| Case (b') | YES | $Z'_0$[dBm] OR ABOVE | $X_0$[RE] OR BELOW |
| Case (c') | NO | $Z'_1$[dBm] OR ABOVE, $Z'_2$[dBm] OR BELOW | LIMITLESS |
| Case (d') | NO | $Z'_2$[dBm] OR ABOVE | $X_1$[RE] OR BELOW |

FIG.36  WHEN PUCCH NUMBER IS EVEN NUMBER

FIG.37 WHEN PUCCH NUMBER IS EVEN NUMBER

WIRELESS COMMUNICATION APPARATUS AND FREQUENCY HOPPING METHOD

TECHNICAL FIELD

The present invention relates to a radio communication apparatus and a frequency hopping method for frequency division multiplexing and transmitting a plurality of channels.

BACKGROUND ART

3GPP (Generation Partnership Project) is studying standardization of LTE-advanced as a mobile communication system which becomes a successor of LTE (Long Term Evolution). LTE-advanced has decided to adopt DFT-spread OFDM (DFT-S-OFDM) using DFT (Discrete Fourier Transform) precoding which is also adopted in LTE as an uplink (UL) radio access scheme or SC-FDMA (Single-Carrier Frequency Division Multiple Access).

In LTE UL transmission using SC-FDMA, the following method is adopted as a frequency resource allocation and mapping method of UL physical channel (physical uplink shared channel (PUSCH), physical uplink control channel (PUCCH)) that transmits a data signal and control signal to improve transmission quality while maintaining low PAPR (Peak-to-Average Power Ratio) characteristics of a transmission signal capable of realizing high coverage.

[Regarding PUSCH]

A DFT-spread data signal (or control signal or signal resulting from multiplexing a data signal and control signal) of each terminal apparatus (User Equipment, hereinafter abbreviated as "terminal" or "UE") is mapped to a continuous frequency band of a PUSCH region in a localized manner.

In addition, a resource allocation method is also available whereby a signal mapped to a continuous frequency band of a PUSCH region is subjected to frequency hopping (inter-slot frequency hopping) between two slots; first-half slot and second-half slot, configured by dividing one subframe into two portions in the PUSCH region.

[Regarding PUCCH]

A control signal spread using a CAZAC (Constant Amplitude Zero Autocorrelation) sequence is subjected to frequency hopping (inter-slot frequency hopping) between two slots; first-half slot and second-half slot, configured by dividing one subframe into two portions in the PUCCH region.

[Regarding PUCCH and PUSCH]

Each terminal does not simultaneously transmit PUSCH for mapping a data signal or the like and PUCCH for mapping a control signal. That is, the PUSCH and PUCCH are not frequency-multiplexed and transmitted. Therefore, a method is adopted whereby when a control signal and data signal are generated simultaneously, both signals are multiplexed into one signal sequence, DFT-spread and mapped to a continuous frequency band of a PUSCH region.

As described above, the frequency resource allocation and mapping method in an LTE UL physical channel (1) maps a signal to a continuous frequency band in a localized manner to thereby maintain a low PAPR characteristic of a UL SC-FDMA signal and (2) use inter-slot frequency hopping, and can thereby improve a frequency diversity effect and an effect of suppressing other cell interference.

For example, Patent Literature 1 discloses an inter-slot frequency hopping method for an uplink physical channel (uplink control channel, uplink shared channel or the like) targeted at a UL SC-FDMA scheme in LTE.

However, due to the influence of limitations to the above-described PUSCH and PUCCH frequency resource allocation and mapping method, there is a problem that flexibility of UL frequency resource allocation is low, and therefore the following method is under study about LTE-advanced UL SC-FDMA transmission (see Non-Patent Literature 1 and Non-Patent Literature 2).

[Regarding PUCCH and PUSCH]

A method of simultaneously transmitting PUSCH for mapping a data signal or the like and PUCCH for mapping a control signal (e.g. L1/L2 control signal). That is, a method of transmitting PUSCH and PUCCH for each terminal through frequency division multiplexing.

FIG. 1 shows an example of time-frequency resource mapping of PUCCH and PUSCH within one subframe by a terminal that frequency division multiplexes and transmits the PUSCH and PUCCH. The PUCCH to which a control signal is mapped frequency-hops at both edges of a system band subjected between slots. On the other hand, the PUSCH to which a data signal or the like is mapped is allocated to continuous resources in the frequency direction and time direction within one subframe in a PUSCH region sandwiched between PUCCH regions, thereby realizing simultaneous transmission of the PUSCH and PUCCH.

When a control signal and data signal are generated simultaneously, this makes it possible to avoid the following problems in the mapping method through an LTE UL physical channel, that is, the method of multiplexing both signals, applying DFT spreading to the signal sequence generated and then mapping the signal sequence to a continuous frequency band of the PUSCH.

That is, when a control signal and data signal are generated simultaneously, the signals are multiplexed and mapped to the PUSCH region, and it is thereby possible to solve the problems that (1) the control signal is not mapped to the allocated PUCCH and therefore the resource utilization efficiency of the PUCCH deteriorates and that (2) the amount of data that can be transmitted with frequency resources of the PUSCH is reduced and the data throughput deteriorates.

CITATION LIST

Patent Literature

PTL 1 Japanese Patent Application Laid-Open No. 2009-49541

Non-Patent Literature

NPL 1 3GPP TR 36.814 v.1.0.0, "Further Advancements for E-UTRA Physical Layer Aspects," February, 2009
NPL 2 R1-090611, "Concurrent PUSCH and PUCCH transmissions," 3GPP RAN WG1 #56, February, 2009
NPL 3 3GPP TS 36.211 v.8.9.0, "Physical Channels and Modulation (Release 8)," December, 2009

SUMMARY OF INVENTION

Technical Problem

However, when the above-described prior art is used, the frequency mapping position of the PUCCH changes between slots within one subframe (one TTI (Transmission Time Interval)), and therefore the instantaneous power distribution characteristic (e.g. PAPR complementary cumulative distribution function (CCDF) characteristic) of the transmission signal waveform in the time domain changes between slots.

This results in a problem that the distortion characteristic of the transmission signal caused by nonlinearity of input/output characteristics of a power amplifier (PA) changes between the first-half slot and second-half slot.

Hereinafter, the above-described problems will be described in further detail.

To improve power efficiency of the PA while avoiding distortion of the transmission signal caused by non-linearity of the input/output characteristics of the PA, it is generally preferable to cause the PA to operate in the vicinity of a certain value (operation point) at which a margin is provided according to an instantaneous power variation width of the transmission signal waveform from a change point of the linear—non-linear region of the input/output characteristics of the PA (see FIG. 2). However, when the above prior art is used, the mapping position of the PUCCH in the frequency domain differs between the first-half slot and the second-half slot, and therefore as shown in FIG. 2, there may be a case where the instantaneous power variation width of the time waveform of the transmission signal in the second-half slot (slot #1) is greater than the instantaneous power variation width of the time waveform of the transmission signal in the first-half slot (slot #0) (e.g. the value of PAPR at which a CCDF of PAPR becomes 1% (=10-2)). As a result, the distortion characteristic of a transmission SC-FDMA signal changes between the first-half slot and the second-half slot. For example, as shown in FIG. 2, when the instantaneous power variation width of the first-half slot is small and the instantaneous power variation width of the second-half slot is large, distortion of the transmission SC-FDMA signal in the second-half slot is greater than distortion of the transmission SC-FDMA signal in the first-half slot.

As described above, when AMC (Adaptive Modulation and Coding) control or transmission power control is operated so as to satisfy certain required quality using the same transmission format (e.g. same MCS (Modulation and channel Coding Scheme) set or a certain transmission power control value instructed by a base station apparatus (hereinafter abbreviated as "base station") using a transmission power command or the like within one subframe (one TTI), there is a problem that the receiving quality deteriorates caused by the distortion characteristic of the SC-FDMA signal in the second-half slot and the required quality cannot be satisfied and a data signal of the one entire subframe comprised of two slots cannot be received correctly. LTE controls the transmission format (MCS set or transmission power control value) of the one entire subframe comprised of two slots of UL under the instruction of the downlink control channel (PDCCH: Physical Downlink Control Channel) reported in each subframe of the downlink (DL). For this reason, if the terminal changes the MCS set for each slot by taking into account the change of the distortion characteristic of the SC-FDMA signal between slots, the base station may not be able to correctly recognize the transmission format for each slot of the UL and may not be able to correctly receive the data signal of the one entire subframe. When the data signal of the one entire subframe cannot be received correctly, retransmission takes place, leading to a problem of a delay or the like.

Furthermore, when pre-distortion for compensating non-linear distortion of the PA is used together with the PA, if the distortion characteristic of the SC-FDMA changes between the first-half slot and the second-half slot, there is also a problem that optimum control of the pre-distortion in the first-half slot will not work out in the second-half slot.

It is therefore an object of the present invention to provide a radio communication apparatus and a frequency hopping method when a plurality of channels are frequency division multiplexed, capable of suppressing changes in an instantaneous power distribution characteristic of a time waveform of a transmission signal.

Solution to Problem

A radio communication apparatus according to the present invention adopts a configuration including an arrangement section that arranges a signal of a first channel to frequency resources of a first slot and a second slot transmitted in a predetermined transmission format and arranges a signal of a second channel to frequency resources located a predetermined frequency interval apart from a frequency resource of the frequency resources of the first slot in which the first channel is arranged, and an inverse Fourier transform section that applies inverse discrete Fourier transform (IDFT) or inverse fast Fourier transform (IFFT) to the signals arranged in the first channel and the second channel, wherein the arrangement section cyclically frequency shifts within an IDFT or IFFT bandwidth while maintaining the predetermined frequency interval, arranges the signals of the first channel and the second channel to frequency resources of the second slot and thereby causes the first channel and the second channel to perform frequency hopping between the first slot and the second slot.

A frequency hopping method of the present invention includes an arranging step of arranging a signal of a first channel to frequency resources of a first slot and a second slot transmitted in a predetermined transmission format and arranging a signal of a second channel in a frequency resource located a predetermined frequency interval apart from a frequency resource of the frequency resources of the first slot in which the first channel is arranged, and a transforming step of applying inverse discrete Fourier transform (IDFT) or inverse fast Fourier transform (IFFT) to the signals arranged in the first channel and the second channel, wherein in the arranging step, the signals of the first channel and the second channel are cyclically frequency shifted within an IDFT or IFFT bandwidth while maintaining the predetermined frequency interval, arranged to frequency resources of the second slot, and the signals of the first channel and the second channel are thereby caused to perform frequency hopping between the first slot and the second slot.

Advantageous Effects of Invention

The present invention frequency division multiplexes and transmits a plurality of channels, and can thereby suppress changes in an instantaneous power distribution characteristic of a time waveform of a transmission signal in a predetermined time segment in which the signal is transmitted in a predetermined transmission format (MCS set or transmission power control value) while suppressing the deterioration of the frequency utilization efficiency and throughput.

BRIEF DESCRIPTION OF DRAWINGS

FIG. 26 is a diagram illustrating a table of correspondence between the frequency distances from both edges of the system band and the central frequency of the system band, frequency interval B and maximum value (threshold) of frequency interval B based on [frequency interval setting method #1-1];

FIG. 28 is a diagram illustrating a table of correspondence between the frequency distance from both edges of the system band, frequency interval B (or maximum value of frequency interval B) based on [frequency interval setting method #1-2];

FIG. 30 is a diagram illustrating a table of correspondence between the frequency distance from both edges of the system band, total transmission power of a frequency division multiplexed signal, frequency interval B (maximum value of frequency interval B) based on [frequency interval setting method #1-3];

FIG. 31 is a diagram illustrating a table of correspondence between the frequency distance from both edges of the system band, transmission power of one channel of a plurality of channels making up a frequency division multiplexed signal, frequency interval B (maximum value of frequency interval B) based on [frequency interval setting method #1-3];

DESCRIPTION OF EMBODIMENTS

Hereinafter, embodiments of the present invention will be described in detail with reference to the accompanying drawings.

The present inventors have arrived at the present invention by discovering that, when a plurality of channels such as PUCCH and PUSCH are frequency division multiplexed and caused to perform inter-slot frequency hopping, if the influence of the frequency hopping method on a change of the time waveform (combined time waveform of the plurality of channels) of the signal after the frequency division multiplexing can be limited to only phase components, the instantaneous power distribution characteristic (e.g. CCDF characteristic of PAPR) of the time waveform of a transmission signal does not change between slots.

In the following descriptions, regarding two slots configured by dividing one subframe into two portions, the first-half slot is called "first slot" and the second-half slot is called "second slot."

Embodiment 1

When the frequency interval between a first channel and a second channel allocated to the first slot in an IDFT (Inverse Discrete Fourier Transform) or IFFT (Inverse Fast Fourier Transform) band is B, the present embodiment cyclically allocates the second channel to a frequency resource in the second slot located B apart from the first channel within the IDFT or IFFT bandwidth.

Here, the IDFT or IFFT band may be called "system (component band) band." In an LTE-A system, to simultaneously realize communication at an ultra-high speed several times the transmission rate in the LTE system and backward compatibility for the LTE system, the band for the LTE-A system is divided into "component bands" of 20 MHz or below, which is a bandwidth support by the LTE system. That is, the "component band" is a band having, for example, a width of maximum 20 MHz and defined as a base unit of a communication band. Furthermore, the "component band" may also be expressed as "component carrier(s)" in English in 3GPP LTE-Advanced.

Figure 1:
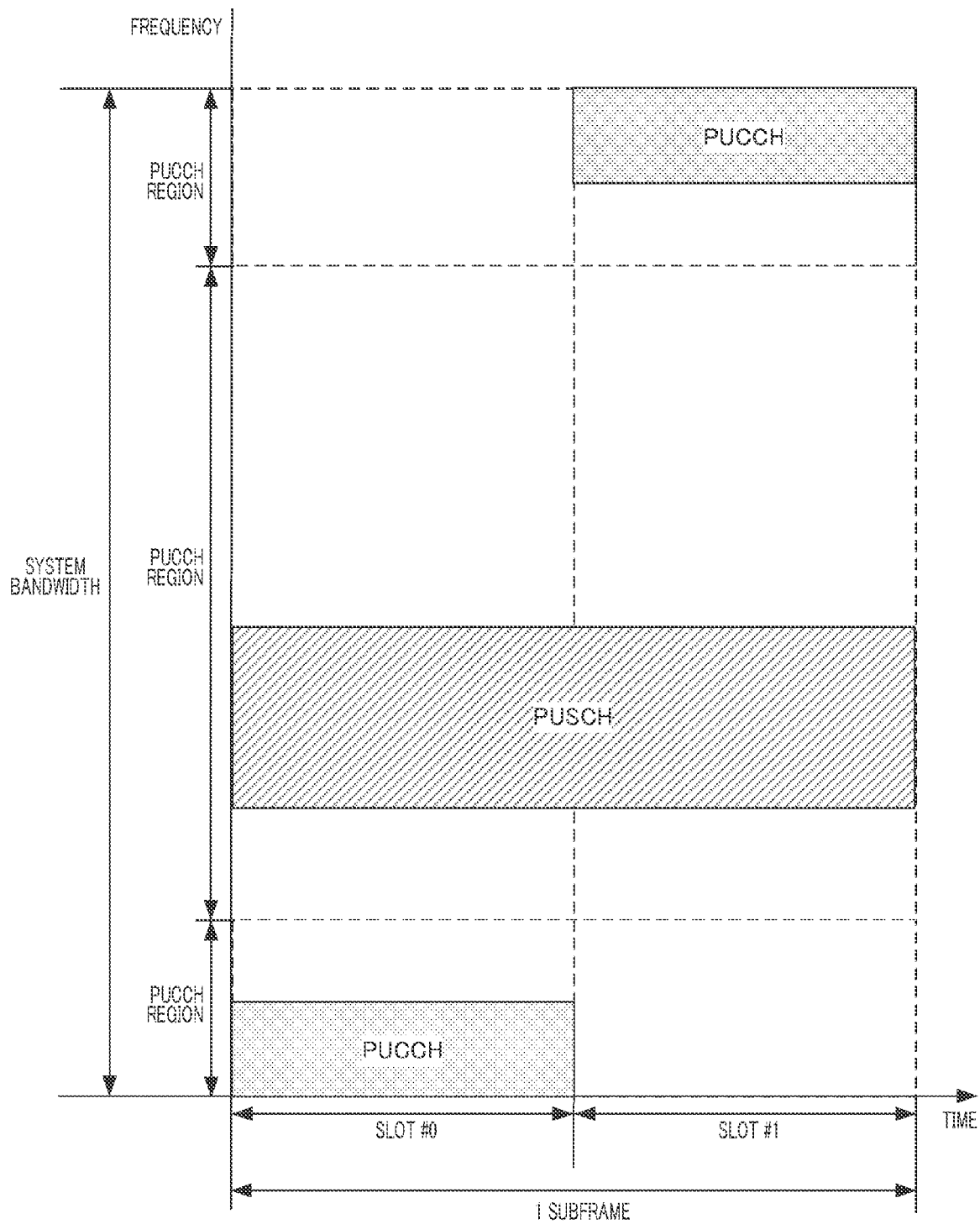
FIG. 1 is a diagram illustrating simultaneous transmission (frequency division multiplexing transmission) of PUCCH and PUSCH.
Figure 2:
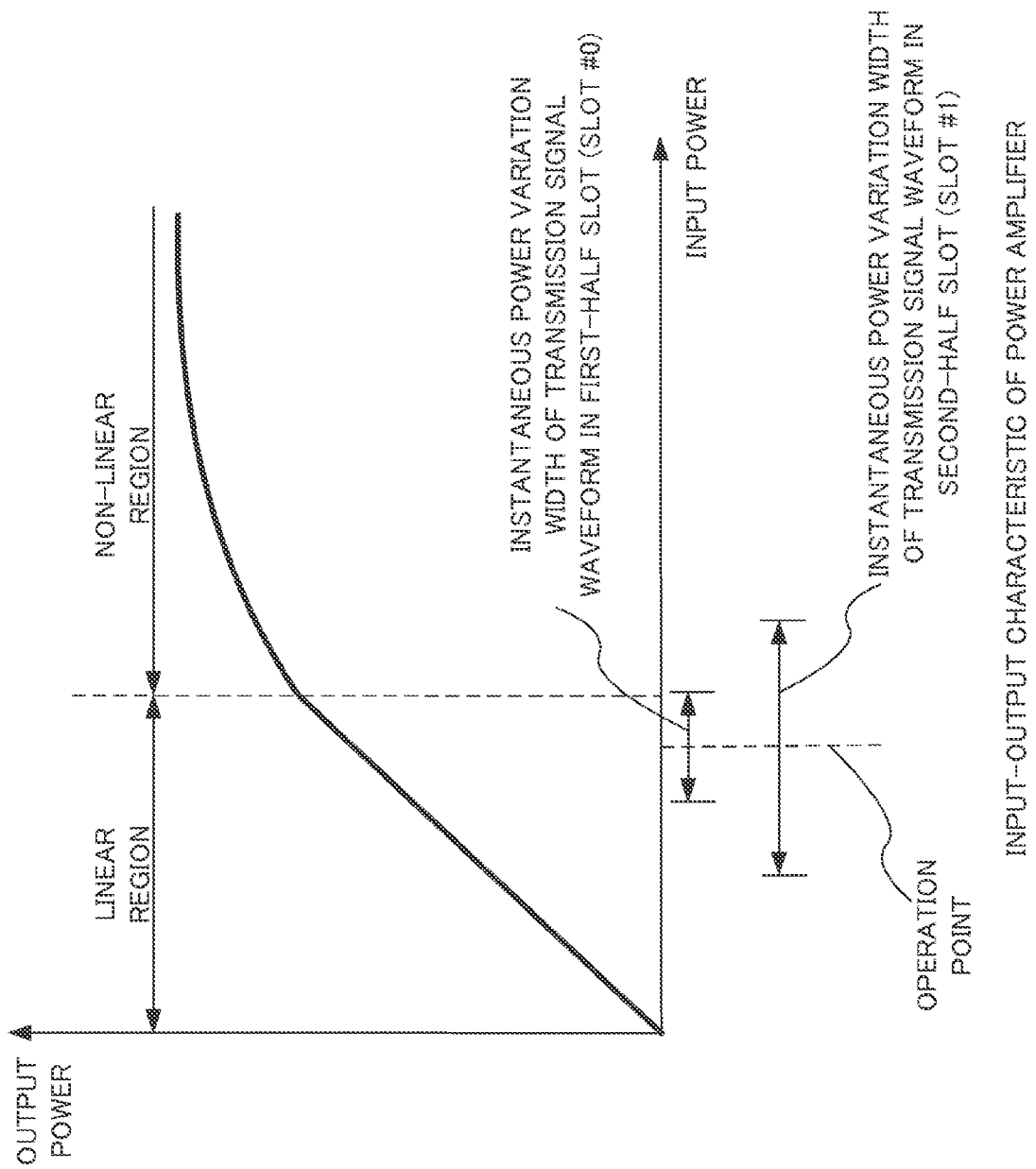
FIG. 2 is a diagram illustrating a situation in which the instantaneous power variation width of a time waveform of a transmission signal changes between slots.
Figure 3:
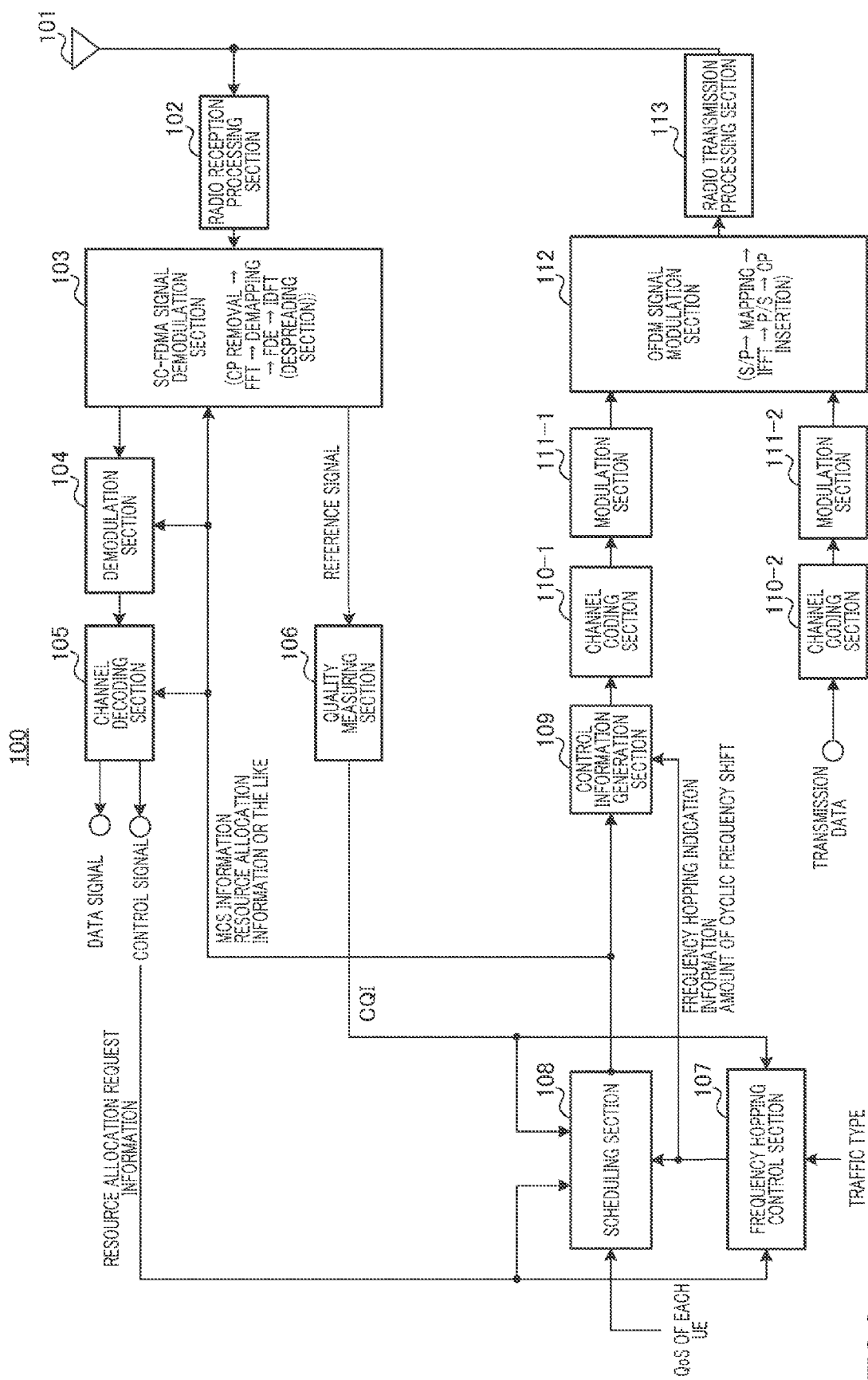
FIG. 3 is a block diagram illustrating main components of a base station according to Embodiment 1 of the present invention.

FIG. 3 shows main components of a base station that receives uplink data according to the present embodiment. To avoid explanations from becoming complicated, FIG. 3 shows components related to reception of uplink data closely related to the present invention and transmission over a downlink of a response signal to uplink data, and omits illustrations and descriptions of components related to transmission of downlink data.

Base station 100 is comprised of transmitting/receiving antenna port 101, radio reception processing section 102, SC-FDMA signal demodulation section 103, demodulation section 104, channel decoding section 105, quality measuring section 106, frequency hopping control section 107, scheduling section 108, control information generation section 109, channel coding sections 110-1 and 110-2, modulation sections 111-1 and 111-2, OFDM signal modulation section 112 and radio transmission processing section 113.

Radio reception processing section 102 converts, to a baseband signal, a UL SC-FDMA signal resulting from frequency division multiplexing a plurality of channels (PUSCH, PUCCH or the like) transmitted from a terminal on the transmitting side that transmits uplink data received by transmitting/receiving antenna port 101. Here, the UL SC-FDMA signal is a multi-carrier (MC) signal resulting from frequency division multiplexing a plurality of different channels as will be described later and is a signal having a greater PAPR than a single carrier FDMA signal in LTE. Therefore, there is some difference in the meaning of the term between the UL SC-FDMA signal according to the present embodiment and single carrier FDMA signal of LTE featuring a low PAPR, but for simplicity of explanation, a signal in which a plurality of channels are frequency-multiplexed will be called "SC-FDMA signal" and described hereinafter.

SC-FDMA signal demodulation section 103 is internally provided with a CP (Cyclic Prefix) removing section, an FFT (Fast Fourier Transform) section, a demapping section, an FDE (Frequency Domain Equalization) section and an IDFT section, and performs the following processing. The CP removing section removes a CP added at the head of the SC-FDMA signal and inputs the SC-FDMA signal after the CP removal to the FFT section. The FFT section applies FFT to the SC-FDMA signal after the CP removal, thereby transforms the SC-FDMA signal from a time domain to a frequency domain subcarrier component (orthogonal frequency component), and outputs the subcarrier component after the FFT to the demapping section. When the subcarrier component after the FFT is a reference signal, the FFT section outputs the subcarrier component to quality measuring section 106. The demapping section demaps the data and control signal mapped to each subcarrier (orthogonal frequency component) of frequency resources used by a target terminal based on resource allocation information (which will be described later) of each terminal inputted from scheduling section 108 and outputs the demapped data and signal to the FDE section. The FDE section calculates an FDE weight from an estimate value of a frequency channel gain between each terminal and the base station, equalizes the received data and control signal in the frequency domain and outputs the data signal to IDFT section and outputs the control signal to the despreading section. The IDFT section applies IDFT to the data signal in the frequency domain after the FDE, transforms the data signal into a time domain data signal and outputs the time domain data signal to demodulation section 104. The despreading section performs despreading processing on the control signal after the FDE and outputs the control signal to demodulation section 104.

Demodulation section 104 performs demodulation such as QPSK modulation or the like on the equalized received data and control signal based on MCS information inputted from scheduling section 108 and outputs the demodulated data and control signal to channel decoding section 105.

Channel decoding section 105 performs decoding processing such as turbo decoding (Viterbi decoding) on the demodulated data and control signal based on the MCS information inputted from scheduling section 108 and then reconstructs the data and control signal. Furthermore, channel decoding section 105 outputs resource allocation request information of PUSCH and PUCCH included in the reconstructed control signal to frequency hopping control section 107 and scheduling section 108.

Quality measuring section 106 measures channel quality of each terminal in the frequency domain, for example, an SINR (Signal-to-Interference plus Noise power Ratio) for each subcarrier of each terminal using reference signals of all terminals extracted from subcarrier components after FFT and outputs the channel quality as CQI (Channel Quality Indicator or Channel Quality Information) to frequency hopping control section 107 and scheduling section 108.

Frequency hopping control section 107 receives CQI of each terminal, traffic type and resource allocation request information of PUSCH and PUCCH as input and decides whether or not to perform inter-slot frequency hopping. For example, when resource allocation requests for PUSCH and PUCCH (or a plurality of PUSCHs, or a plurality of PUCCHs) are simultaneously generated, frequency hopping control section 107 decides to apply inter-slot frequency hopping. Frequency hopping control section 107 reports indication information (frequency hopping indication information) indicating the presence or absence of indication as to whether or not to apply inter-slot frequency hopping to a target terminal to scheduling section 108 and control information generation section 109. Furthermore, when frequency hopping is applied, frequency hopping control section 107 reports information of the amount of cyclic frequency shift to control information generation section 109.

A case has been described above where base station 100 decides whether or not to apply inter-slot frequency hopping to the terminal based on the presence or absence of resource allocation request information for PUSCH and PUCCH from the terminal, but base station 100 may also decide whether or not to apply inter-slot frequency hopping based on the report information such as PHR (Power Head Room) from the terminal or a moving speed or the like of the terminal.

Scheduling section 108 outputs the information of MCS (modulation scheme, coding rate or the like) determined based on CQI to control information generation section 109, SC-FDMA signal demodulation section 103, demodulation section 104 and channel decoding section 105.

Furthermore, scheduling section 108 performs two-dimensional scheduling of time and frequency based on inputted QoS (request data rate, required error rate, delay or the like) of each terminal, resource allocation request information for CQI, PUSCH and PUCCH and frequency hopping indication information, and thereby allocates time and frequency resources to PUSCH and PUCCH. Scheduling section 108 outputs information of resources (time, frequency) allocated to PUSCH and PUCCH (resource allocation information) to control information generation section 109 and SC-FDMA signal demodulation section 103.

Control information generation section 109 converts control information such as inputted MCS information of the terminal, resource allocation information of PUSCH and PUCCH, frequency hopping indication information and amount of cyclic frequency shift of inter-slot frequency hopping or the like to a binary control bit sequence to be reported to the terminal and outputs the control bit sequence after the conversion to channel coding section 110-1.

Channel coding section 110-1 applies error correcting coding such as convolutional coding to the control bit sequence at a predetermined coding rate and then outputs the coded bit sequence to modulation section 111-1.

Channel coding section 110-2 applies error correcting coding such as turbo coding to the transmission data sequence at a predetermined coding rate and then outputs the coded bit sequence to modulation section 111-2.

Modulation sections 111-1 and 111-2 modulate the coded bit sequence using QPSK or the like and outputs the control and data symbol sequence obtained to OFDM signal modulation section 112.

OFDM signal modulation section 112 is internally provided with an S/P section, a mapping section, an IFFT section, a P/S section and a CP insertion section, and multiplexes the inputted control and data symbol sequence and then applies processing such as serial/parallel conversion (S/P conversion), mapping to subcarriers, IFFT (Inverse Fast Fourier Transform), parallel/serial conversion (P/S conversion), CP insertion and outputs the processed sequence to radio transmission processing section 113.

Radio transmission processing section 113 converts a baseband signal to an RF (Radio Frequency) signal, amplifies power thereof by a power amplifier (PA) and transmits the signal to transmitting/receiving antenna port 101.

Figure 4:
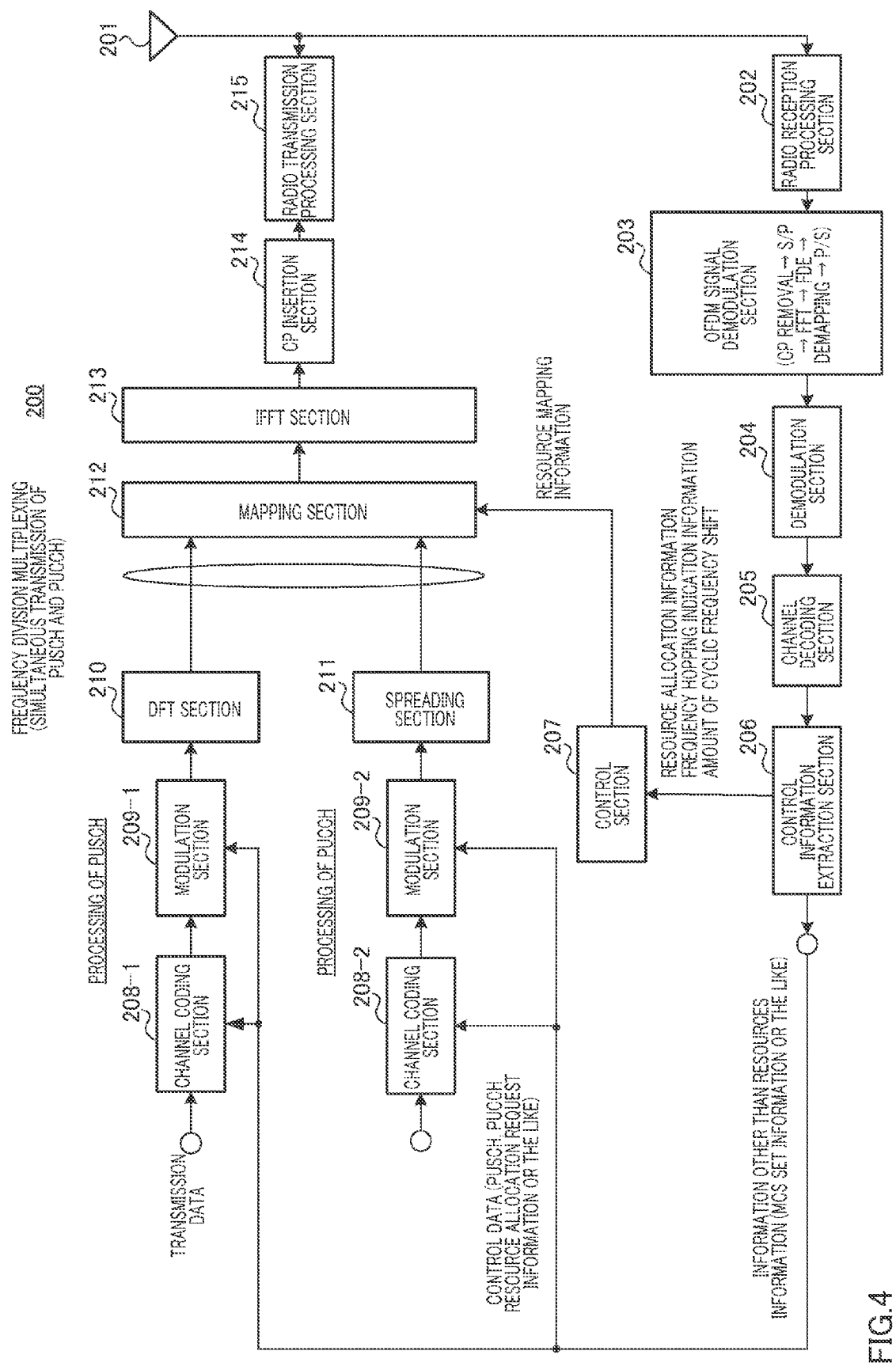
FIG. 4 is a block diagram illustrating main components of a terminal according to Embodiment 1.

FIG. 4 shows main components of the terminal according to the present embodiment. To avoid the explanation from becoming complicated, FIG. 4 shows components related to transmission of uplink data closely related to the present invention and reception of a response signal on the downlink for the uplink data and omits illustrations and descriptions of components related to downlink data.

Terminal 200 is provided with transmitting/receiving antenna port 201, radio reception processing section 202, OFDM signal demodulation section 203, demodulation section 204, channel decoding section 205, control information extraction section 206, control section 207, channel coding sections 208-1 and 208-2, modulation sections 209-1 and 209-2, DFT section 210, spreading section 211, mapping section 212, IFFT section 213, CP insertion section 214 and radio transmission processing section 215.

Radio reception processing section 202 converts a signal transmitted from base station 100 and received by transmitting/receiving antenna port 201 to a baseband signal.

OFDM signal demodulation section 203 applies CP removal, S/P conversion, FFT, FDE processing, demapping, P/S conversion processing to the baseband signal and then outputs a control and data symbol sequence to demodulation section 204.

Demodulation section 204 applies demodulation processing such as QPSK modulation to the control and data signal sequence and outputs the demodulated control and data sequence to channel decoding section 205.

Channel decoding section 205 applies error correcting decoding to the demodulated control and data sequence using turbo decoding or the like and reconstructs the control and data signal.

Control information extraction section 206 extracts resource allocation information of PUSCH and PUCCH of terminal 200, frequency hopping indication information and the amount of cyclic frequency shift of inter-slot frequency hopping (hereinafter referred to as "inter-slot frequency hopping information") from among the reconstructed control and data signal and outputs the extracted inter-slot frequency hopping information to control section 207. Furthermore, control information extraction section 206 outputs control information of MCS information other than the inter-slot frequency hopping information (modulation level (M-ary modulation value), coding rate or the like) to channel coding sections 208-1 and 208-2 and modulation sections 209-1 and 209-2.

Control section 207 sets time and frequency resources to be mapped by causing PUSCH and PUCCH to hop between slots in a first and second slots within a subframe using inputted inter-slot frequency hopping information of the terminal directed to the terminal and outputs information (hereinafter referred to as "resource mapping information") of the set time and frequency resources (resource mapping) to mapping section 212.

Channel coding section 208-1 for transmission data applies error correcting coding such as turbo coding to an information bit sequence (transport block, codeword) of the transmission data inputted from a higher layer, generates a coded bit sequence with a certain coding rate for the transport block through a rate matching algorithm based on the coding rate of an MCS set reported from base station 100 and outputs the coded bit sequence to modulation section 209-1.

Modulation section 209-1 for the transmission data modulates a certain transport block at the same modulation level such as QPSK based on the modulation scheme of the MCS set reported from base station 100 and outputs the transmission data symbol sequence obtained to DFT section 210.

A symbol sequence having the same transmission format (MCS set) is generated in the transport block (codeword) of the transmission information bit sequence through such channel coding and modulation processing. A multiplexing section may be provided between modulation section 209-1 and DFT section 210 so that the multiplexing section multiplexes a reference signal such as CAZAC (Constant Amplitude Zero Auto Correlation) with the transmission data symbol sequence after the channel coding and modulation processing.

DFT section 210 applies DFT to the transmission data symbol sequence, transforms the transmission data symbol sequence into subcarrier components (orthogonal frequency components) in the frequency domain and outputs the subcarrier components to mapping section 212.

Channel coding section 208-2 for control data (resource allocation request information of PUSCH and PUCCH (scheduling request (SR) or the like), ACK/NACK for DL transmission, CQI and CSI (Channel State Information) of the DL channel or the like) applies error correcting coding such as convolutional coding to the control bit sequence of the control data based on the coding rate of the MCS set reported from base station 100 and then outputs the coded bit sequence to modulation section 209-2.

Modulation section 209-2 for the control data performs modulation at a modulation level such as QPSK based on the modulation scheme of the MCS set reported from base station 100 and outputs the control data symbol sequence obtained to spreading section 211.

A control data symbol sequence having the same transmission format is also generated in the transmission control bit sequence through the channel coding and modulation processing. A multiplexing section may be provided between modulation section 209-2 and spreading section 211 so that the multiplexing section multiplexes a reference signal such as CAZAC with the control data symbol sequence after the channel coding and modulation processing.

Spreading section 211 spreads symbols in a sequence having a constant amplitude characteristic in the time and frequency domains of the CAZAC sequence or the like for the control data symbol sequence and outputs the spread control data symbol sequence to mapping section 212.

Mapping section 212 maps the transmission data symbol sequence after DFT spreading (precoding) in the same transmission format inputted from DFT section 210 and spreading section 211 and the spread control data symbol sequence in the CAZAC sequence to time and frequency resources of the PUSCH region or PUCCH region in one subframe (frequency division multiplexing of the control signal and data signal) based on the resource mapping information inputted from control section 207 and outputs the mapped control signal and data signal to IFFT section 213. The resource mapping information is information of the time and frequency resources for mapping PUSCH and PUCCH allocated so as to perform frequency hopping between slots.

IFFT section 213 inserts 0's into subcarriers other than frequency resources allocated to the terminal, then applies IFFT to thereby generate a time domain SC-FDMA signal resulting from frequency division multiplexing PUSCH and PUCCH and outputs the generated SC-FDMA signal to CP insertion section 214.

CP insertion section 214 adds a rear sample of 1 SC-FDMA block at the head of the block as a cyclic prefix (CP) and outputs the SC-FDMA signal with the CP added to radio transmission processing section 215.

Radio transmission processing section 215 converts the baseband signal of the SC-FDMA signal with the CP added to an RF signal and amplifies power thereof by a power amplifier (PA) and transmits the RF signal from transmitting/receiving antenna port 201.

Next, a mapping pattern of inter-slot frequency hopping according to the present embodiment (hereinafter referred to as "inter-slot hopping pattern") will be described. Control section 207 stores the inter-slot hopping pattern inside as a resource allocation rule and outputs resource mapping information based on the resource allocation rule to mapping section 212. Mapping section 212 maps the PUSCH and PUCCH to time and frequency resources based on the resource mapping information.

[Inter-Slot Hopping Pattern #1]

Figure 5:
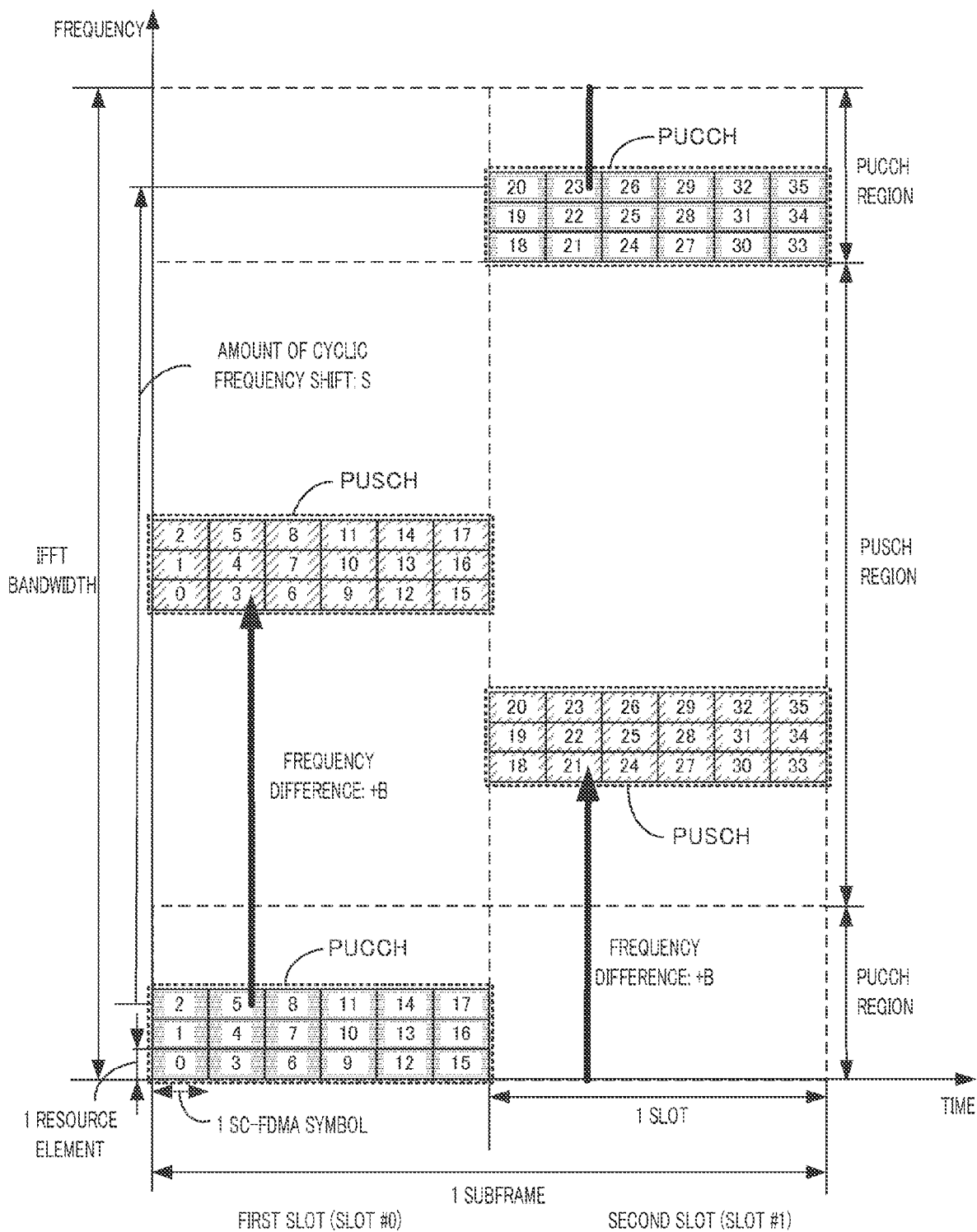
FIG. 5 is a diagram illustrating an example of [inter-slot hopping pattern #1]

FIG. 5 is a diagram illustrating an example of inter-slot hopping pattern #1 of PUSCH and PUCCH according to the present embodiment. The example shown in FIG. 5 shows a situation in which PUSCH to which a data signal (control signal or control signal and data signal) is mapped and PUCCH to which a control signal is mapped are assumed to be one block and this is cyclically frequency-shifted in the same direction (from the low frequency to high frequency direction in FIG. 5) within an IFFT band while maintaining frequency interval B and inter-slot frequency hopping is thereby performed.

Both PUSCH and PUCCH shown in FIG. 5 span one subframe and are transmitted in predetermined transmission formats respectively. That is, as shown in FIG. 5, in the first slot (first-half slot) and the second slot (second-half slot) resulting from dividing one subframe into two portions, signals of the same transmission format are allocated to the PUSCH and PUCCH respectively.

FIG. 5 shows an example where 12 data signals or control signals are spread by a DFT (3×3 DFT matrix) or CAZAC sequence having a sequence length of 3 so that the spread data signal and control signal have a sequence length of 12×3=36 (0 to 35) respectively. As shown in FIG. 5, the signal sequence is divided into two portions and the signal sequences are mapped to resources of the first slot (first-half slot) and second slot (second-half slot) in units of three continuous resource elements in order from the frequency direction to the time direction. The values of resources where the signal sequence is not mapped are 0. Therefore, within the same SC-FDMA symbol, the data signal after DFT spreading and the control signal spread by a CAZAC sequence, which are mapped to the PUSCH and PUSCH regions, are frequency division multiplexed.

As is clear from FIG. 5, the frequency difference between the PUCCH and PUSCH mapped to the PUCCH region located in a low frequency of the IFFT band in the first slot in one subframe is +B. In the second slot in one subframe, the PUCCH which has inter-slot frequency hopped to the PUCCH region located in a high frequency of the IFFT band cyclically maintains frequency interval +B from the PUSCH which has similarly inter-slot frequency hopped in the IFFT band.

As shown in FIG. 5, by frequency division multiplexing the PUSCH and PUCCH and at the same time applying inter-slot frequency hopping thereto while maintaining a frequency interval within the IDFT or IFFT band, it is possible to prevent the power distribution characteristic of the time waveform of the frequency division multiplexed signal from changing between slots while obtaining frequency diversity effects through frequency hopping.

The reason will be described below. That is, a detailed description will be given concerning the fact that inter-slot frequency hopping using inter-slot hopping pattern #1 according to the present embodiment does not cause any change to the instantaneous power distribution characteristic of the time waveform of the frequency division multiplexed signal, that is, the influence of the PUCCH and PUSCH on the change in the time waveform of the frequency division multiplexed signal can be limited to only the phase component.

N×1 time domain SC-FDMA signal vector $d_0$ in the first slot (slot #0) before inter-slot frequency hopping generated by applying IFFT after frequency division multiplexing the PUSCH and PUCCH can be expressed by equation 1. For simplicity, equation 1 shows $d_0$ in transmission signal expression before CP insertion.

(Equation 1)

$$d_0 = F^{-1}(D_{0,PUSCH} + D_{0,PUCCH}) \qquad [1]$$
$$= d_{0,PUSCH} + d_{0,PUCCH}$$

In equation 1, F represents an N×N DFT matrix, N represents the number of points of FFT (DFT). $D_{0,PUSCH}$ ($d_{0,PUSCH}$) represents an N×1 frequency domain (time domain) SC-FDMA signal vector before inter-slot frequency hopping when a data signal is mapped to only the PUSCH region and 0's are inserted in other resources, that is, when only PUSCH not subjected to frequency division multiplexing is transmitted.

Similarly, $D_{0,PUCCH}$ ($d_{0,PUCCH}$) represents an N×1 frequency domain (time domain) SC-FDMA signal vector before inter-slot frequency hopping when a control signal is mapped to only the PUCCH region and 0's are inserted in other resources, that is, when only PUCCHs not subjected to frequency division multiplexing are transmitted.

On the other hand, by cyclically frequency shifting the PUSCH and PUCCH as a block by S subcarriers in the same direction in the IFFT band, N×1 time domain SC-FDMA signal vector $d_1$ can be expressed by equation 2 in the second slot (slot #1) after performing inter-slot frequency hopping.

(Equation 2)

$$d_1 = F^{-1}T^{(S)}(D_{1,PUSCH} + D_{1,PUCCH}) \quad [2]$$
$$= F^{-1}T^{(S)}F(d_{1,PUSCH} + d_{1,PUCCH})$$
$$= \mathrm{diag}(1, e^{j2\pi S/N}, \ldots, e^{j2\pi S(N-1)/N})(d_{1,PUSCH} + d_{1,PUCCH})$$

In equation 2, $\mathrm{diag}(a_0, a_1, \ldots, a_{N-1})$ represents a diagonal matrix that has $a_0, a_1, \ldots, a_{N-1}$ as elements of the diagonal component. Furthermore, $T^{(S)}$ is an N×N cyclic frequency shift matrix representing a cyclic frequency shift of S subcarriers in the IFFT band and is given by equation 3. When a cyclic frequency shift of S(>N) subcarriers (resource elements) greater than N is performed, a cyclic frequency shift corresponding to $T^{(S\,mod\,N)}$ may be performed. Here, "mod" represents a modulo operation.

(Equation 3)

$$T^{(S)} = \begin{pmatrix} 0 & \cdots & \cdots & 0 & 1 & 0 & \cdots & 0 \\ \vdots & & & & & \ddots & \ddots & \vdots \\ 0 & & & & & & \ddots & 0 \\ 1 & \ddots & & & & & & 1 \\ 0 & \ddots & \ddots & & & & & 0 \\ \vdots & \ddots & \ddots & \ddots & & & & \vdots \\ 0 & \cdots & 0 & 1 & 0 & \cdots & \cdots & 0 \end{pmatrix} \quad [3]$$

As shown in equation 3, a 0-th column vector of $T^{(S)}$ is comprised of vectors in which elements of the 0-th row to (S−1)-th and elements of (S+1)-th to (N−1)-th rows are 0 and elements of only an S-th row are 1. Furthermore, other column vectors of $T^{(S)}$ are configured by cyclically shifting the 0-th column vector.

As is obvious from equation 1 and equation 2, the operation of providing the PUCCH and PUSCH with the same cyclic frequency shift in the same direction within the IFFT band, that is, applying inter-slot frequency hopping to the PUCCH and PUSCH while maintaining the frequency difference between them can limit the influence of the frequency division multiplexed signal on the change in the time waveform to only the phase components. That is, it is obvious that inter-slot frequency hopping according to the present embodiment has no influence on the amplitude of the time domain SC-FDMA signal of the first slot and second slot. Therefore, the distribution characteristic of the instantaneous power of the time waveform of a transmission signal within one subframe does not change between the first slot and second slot.

As shown in equation 4, inter-slot frequency hopping may also be performed using $T'^{(S)}$ generated by multiplying cyclic frequency shift matrix $T^{(S)}$ in equation 3 by certain constant C whose absolute value is 1. For example, C=exp(jD) (where D is a certain real number) or the like is available as the constant. As is obvious by substituting $T^{(S)}$ in equation 2 by $T'^{(S)}$, even in inter-slot frequency hopping using $T'^{(S)}$, the distribution characteristic of instantaneous power of a time waveform of a transmission signal within one subframe does not change between the first slot and the second slot.

(Equation 4)

$$T'^{(S)} = CT^{(S)} = C\begin{pmatrix} 0 & \cdots & \cdots & 0 & 1 & 0 & \cdots & 0 \\ \vdots & & & & & \ddots & \ddots & \vdots \\ 0 & & & & & & \ddots & 0 \\ 1 & \ddots & & & & & & 1 \\ 0 & \ddots & \ddots & & & & & 0 \\ \vdots & \ddots & \ddots & \ddots & & & & \vdots \\ 0 & \cdots & 0 & 1 & 0 & \cdots & \cdots & 0 \end{pmatrix} \quad [4]$$

Therefore, when a transmission signal is transmitted over the first slot and second slot in the same transmission format, distortion of the transmission signal caused by non-linearity of the PA can be equalized for the first slot and the second slot and it is possible to avoid deterioration of receiving quality caused when the non-linear distortion characteristic received by a transmission signal transmitted over the first slot and second slot in the same transmission format changes between slots. Furthermore, since the non-linear distortion characteristic received by a transmission signal transmitted in the same transmission format is uniform between the first slot and the second slot, it is possible to steadily perform optimum control of pre-distortion from the first slot to the second slot.

As described above, according to the present embodiment, mapping section 212 arranges PUCCH in a frequency resource of the first slot, arranges PUSCH in a frequency resource located predetermined frequency interval B apart from the frequency resource out of the frequency resources of the first slot in which PUCCH is arranged and cyclically frequency shifts and arranges PUCCH and PUSCH within the IDFT or IFFT bandwidth while maintaining predetermined frequency interval B in the frequency resources of the second slot, and can thereby cause the PUCCH and PUSCH to frequency hop between the first slot and the second slot.

This makes it possible to prevent changes in the instantaneous power distribution characteristic of the time waveform of the frequency division multiplexed signal between slots while obtaining a frequency diversity effect through inter-slot frequency hopping. Therefore, it is possible to equalize distortion of the transmission signal caused by the non-linear distortion characteristic of the PA between the first slot and the second slot and prevent deterioration of receiving quality caused by a change of the non-linearity characteristic received by the transmission signal transmitted in the same transmission format over the first slot and the second slot. Furthermore, it is possible to steadily perform optimum control of pre-distortion over the first and the second slots.

Figure 6:
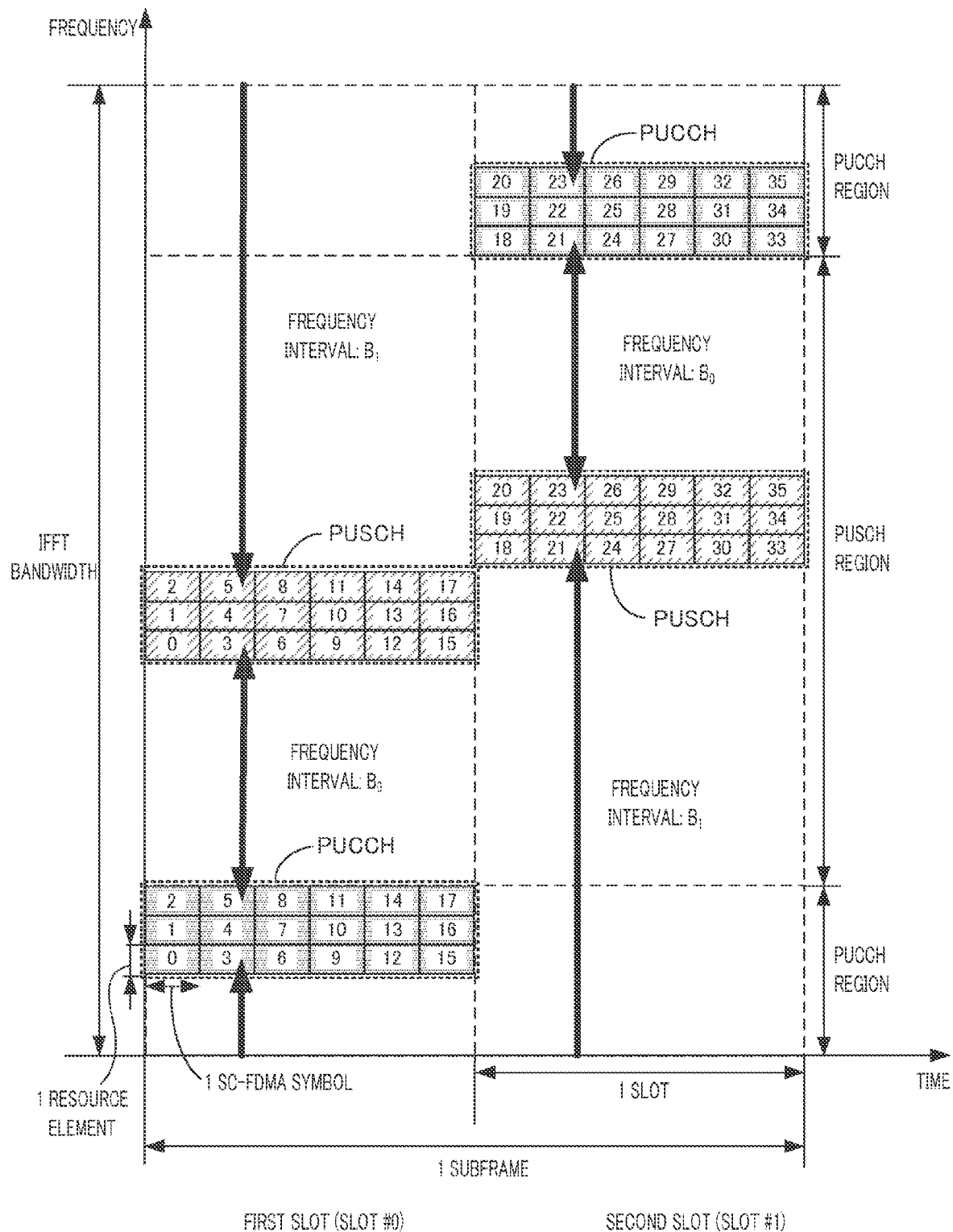
FIG. 6 is a diagram illustrating a definition of frequency interval.

Frequency interval B between the first channel and the second channel allocated to the first slot may be one of $B_0$ and $B_1$ as shown in FIG. 6 as long as it is a cyclically continuous frequency interval within the IFFT band.

Figure 7:
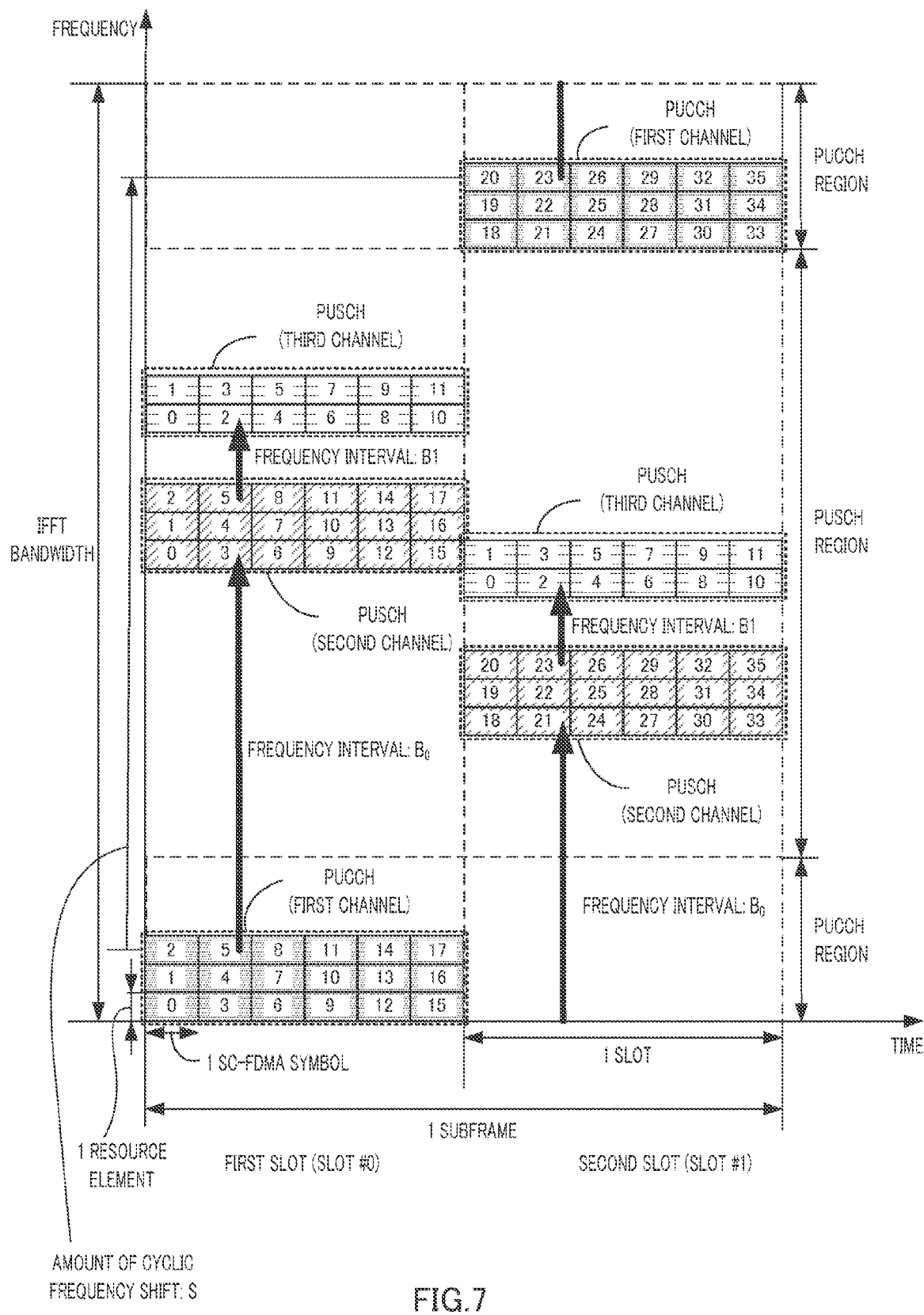
FIG. 7 is a diagram illustrating an example of an inter-slot hopping pattern when the number of frequency division multiplexed channels is 3 or more.

Furthermore, the number of channels transmitted through frequency division multiplexing may be three or more. As shown in FIG. 7, when three channels are allocated, if the frequency interval between the first channel and the second channel in the first slot is $+B_0$ and the frequency interval between the second channel and the third channel is $+B_1$, the second channel may be cyclically allocated to a frequency resource located $+B_0$ apart from the first channel and the third channel may be cyclically allocated to a frequency resource located $+B_1$ apart from the second channel within the IDFT or IFFT bandwidth in the second slot. When three or more channels are subjected to frequency division multiplexing and inter-slot frequency hopping, this makes it possible to obtain effects similar to those with two channels.

A case has been described above where the PUSCH and PUCCH are cyclically frequency shifted by S subcarriers in the same direction within the IFFT band, but the amount of cyclic frequency shift may be one of $+S$ and $-S$ subcarriers. Since $-S \bmod N=(N-S) \bmod N$, that is, the cyclic frequency shift of $-S$ ($<0$) subcarriers is equivalent to the cyclic frequency shift of $(N-S)$ ($>0$). Therefore, as is clear from equation 2, whether the amount of cyclic frequency shift is $+S$ or $-S$, the influence on the time domain SC-FDMA signal in the second slot is limited to only the phase component (in the case of the cyclic frequency shift of $-S$ subcarriers, S in equation 2 is simply substituted by $(N-S)$) and there is no influence on the magnitude of the amplitude. This gives effects similar to those described above.

In the inter-slot hopping pattern shown in FIG. 5, when the frequency difference from the frequency resource to which PUSCH is allocated in the first slot to the frequency resource to which PUCCH is allocated is $+B$ ($-B$), it is possible to say that the PUCCH is cyclically allocated to the frequency resource located $+B$ ($-B$) apart from the PUSCH in the second slot within the IDFT or IFFT bandwidth.

Figure 8:
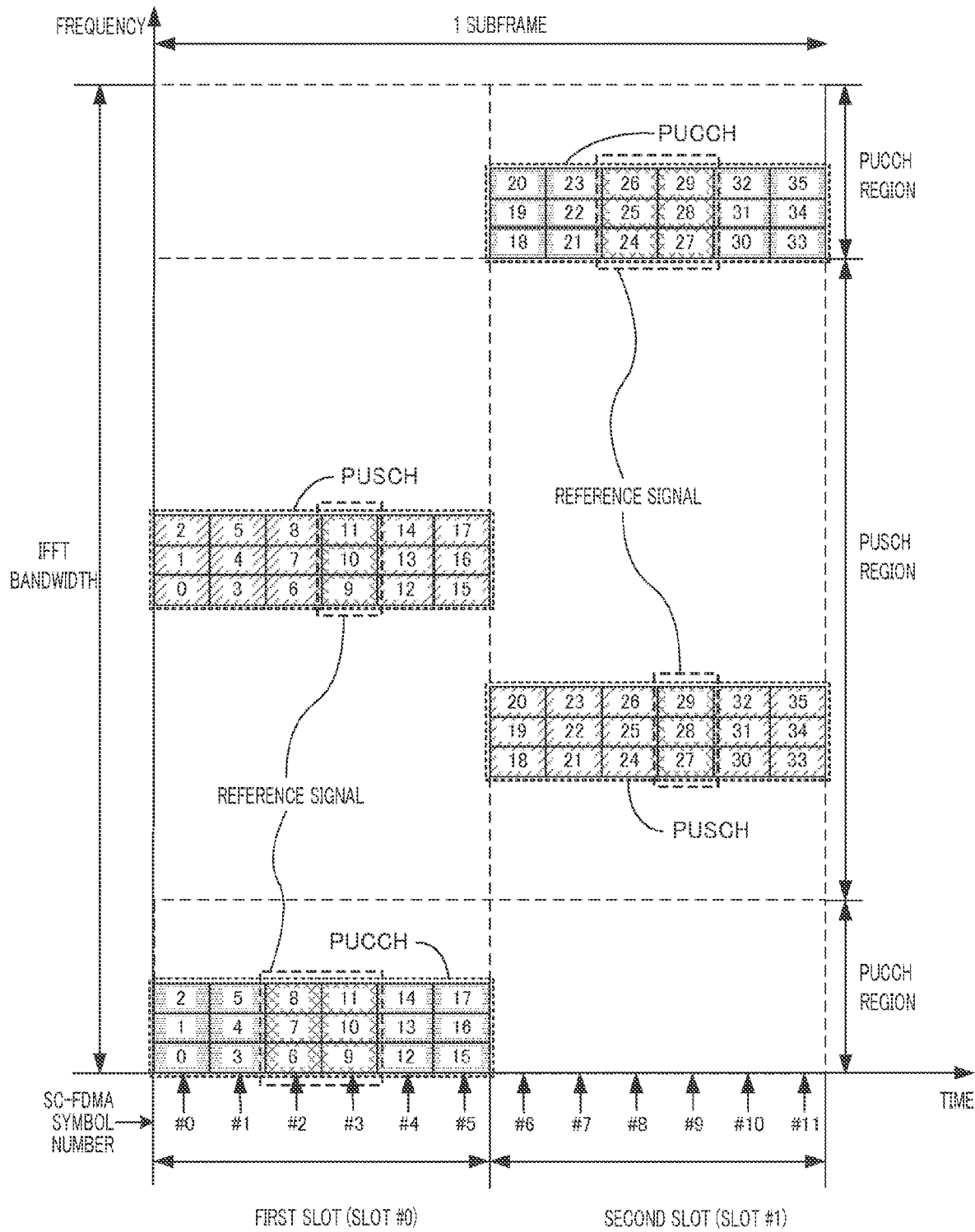
FIG. 8 is a diagram illustrating an example of frequency division multiplexed signals having different statistical properties.

When a plurality of signals mapped to the PUSCH and PUCCH in the slot include a specific signal sequence (=deterministic signal) such as a reference signal using a CAZAC sequence and stochastically changing signal sequence (stochastic signal) such as data signal and control signal (CQI, CSI, ACK/NACK or the like), and when deterministic signals (e.g. reference signals), stochastic signals and deterministic signal and stochastic signal are frequency division multiplexed within the same SC-FDMA signal, the above-described effect is obtained by applying an inter-slot hopping pattern as shown in FIG. 5. FIG. 8 shows an example of frequency division multiplexing in this case. FIG. 8 is an example where signals having different statistic properties are frequency division multiplexed.

FIG. 8 shows a case where reference signals (deterministic signals) of CAZAC sequence or the like are mapped to second and third SC-FDMA symbols of the PUCCH in the first slot, eighth and ninth SC-FDMA symbols of the PUCCH in the second slot, third SC-FDMA symbol of the PUSCH in the first slot and ninth SC-FDMA symbol of the PUSCH in the second slot and stochastic signals such as different data signals (control signals) are mapped to other resources of the PUSCH and PUCCH. Therefore, FIG. 8 shows a case where data signals or the like (stochastic signals) are frequency division multiplexed in the 0-th, first, fourth, fifth, sixth, seventh, tenth and eleventh SC-FDMA symbols, data signals (stochastic signals) and reference signals (deterministic signals) are frequency division multiplexed in the second and eighth SC-FDMA symbols and reference signals (deterministic signals) are frequency division multiplexed in the third and ninth SC-FDMA symbols, and transmitted.

Next, a control procedure when performing inter-slot frequency hopping according to the present embodiment will be described.

Figure 9:
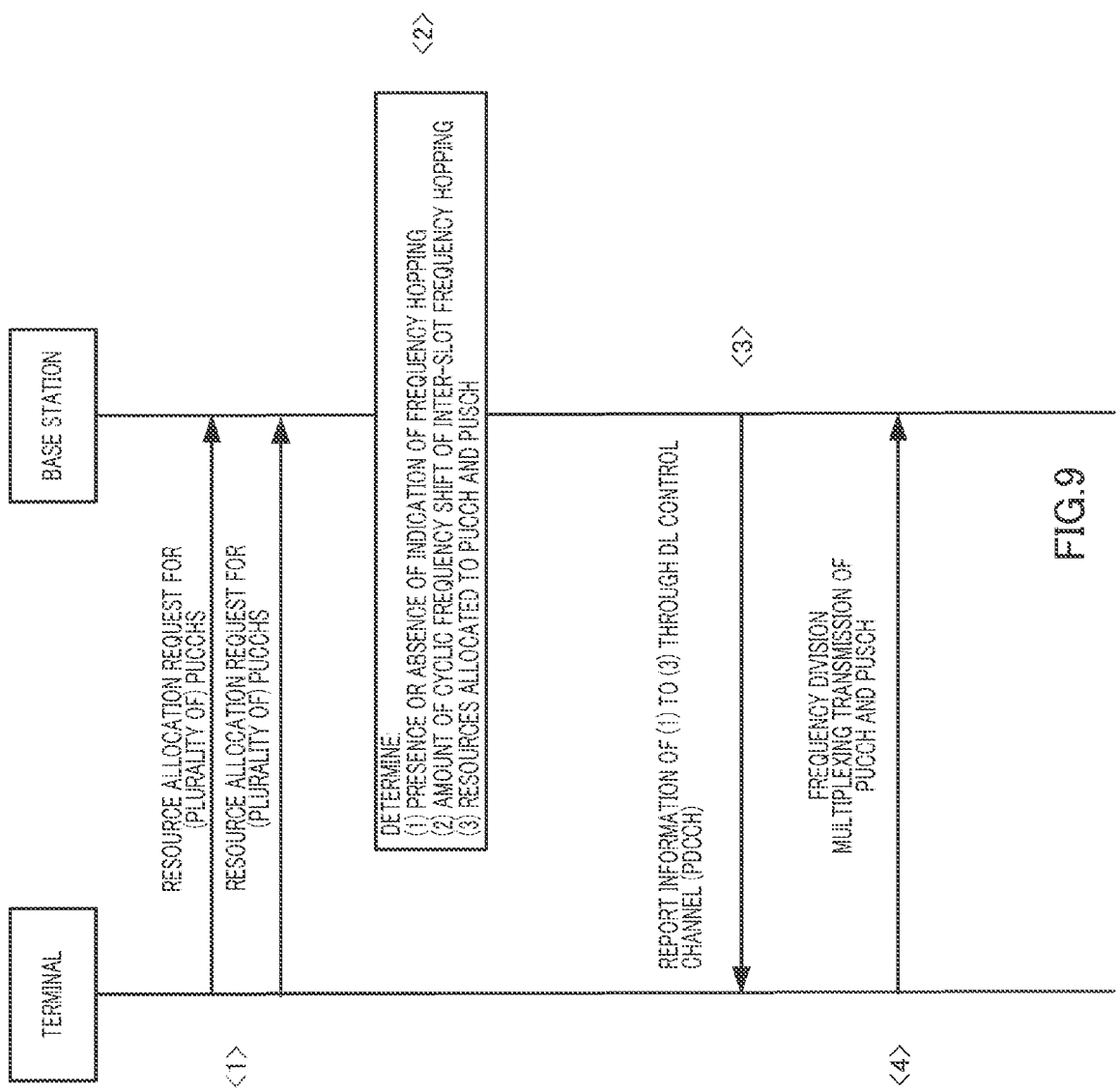
FIG. 9 is a sequence diagram illustrating an example of a control procedure when performing inter-slot frequency hopping.

FIG. 9 is a sequence diagram showing an example of control procedure.

<1> Terminal 200 transmits allocation requests for both (a plurality of) PUCCHs and (a plurality of) PUSCH resources.

<2> Base station 100 determines, based on these allocation requests, (1) the presence or absence of indication of frequency hopping of PUSCH and PUCCH, (2) amount of cyclic frequency shift of inter-slot frequency hopping of PUSCH and PUCCH when performing frequency hopping and (3) UL PUSCH and PUCCH allocation resources.

<3> Base station 100 reports the information (inter-slot frequency hopping information) to terminal 200 through a DL control channel (PDCCH or the like).

<4> Terminal 200 frequency-division-multiplexes and transmits UL PUCCH and PUSCH based on the reported resource allocation information of PUCCH and PUSCH and the amount of cyclic frequency shift of inter-slot frequency hopping or the like.

The control procedure when performing inter-slot frequency hopping is not limited to the above-described one, but the following procedures may also be adopted.

[When Index Number of (Logical) Control Channel Used for PDCCH is Associated with Resource Number of PUCCH]

For example, UL ACK/NACK transmission of LTE corresponds to this. The control procedure in this case will be described using FIG. 10 and FIG. 11.

<1> Terminal 200 transmits an allocation request for (a plurality of) PUSCH resources.

<2> Base station 100 determines, based on the allocation request, (1) the presence or absence of indication of frequency hopping of PUSCH and PUCCH, (2) when frequency hopping is performed, the amount of cyclic frequency shift of inter-slot frequency hopping of PUSCH and PUCCH and (3) UL PUSCH and PUCCH resource allocation.

The following two methods are available as the method of determining (3) UL PUSCH and PUCCH resource allocation.

Figure 10:
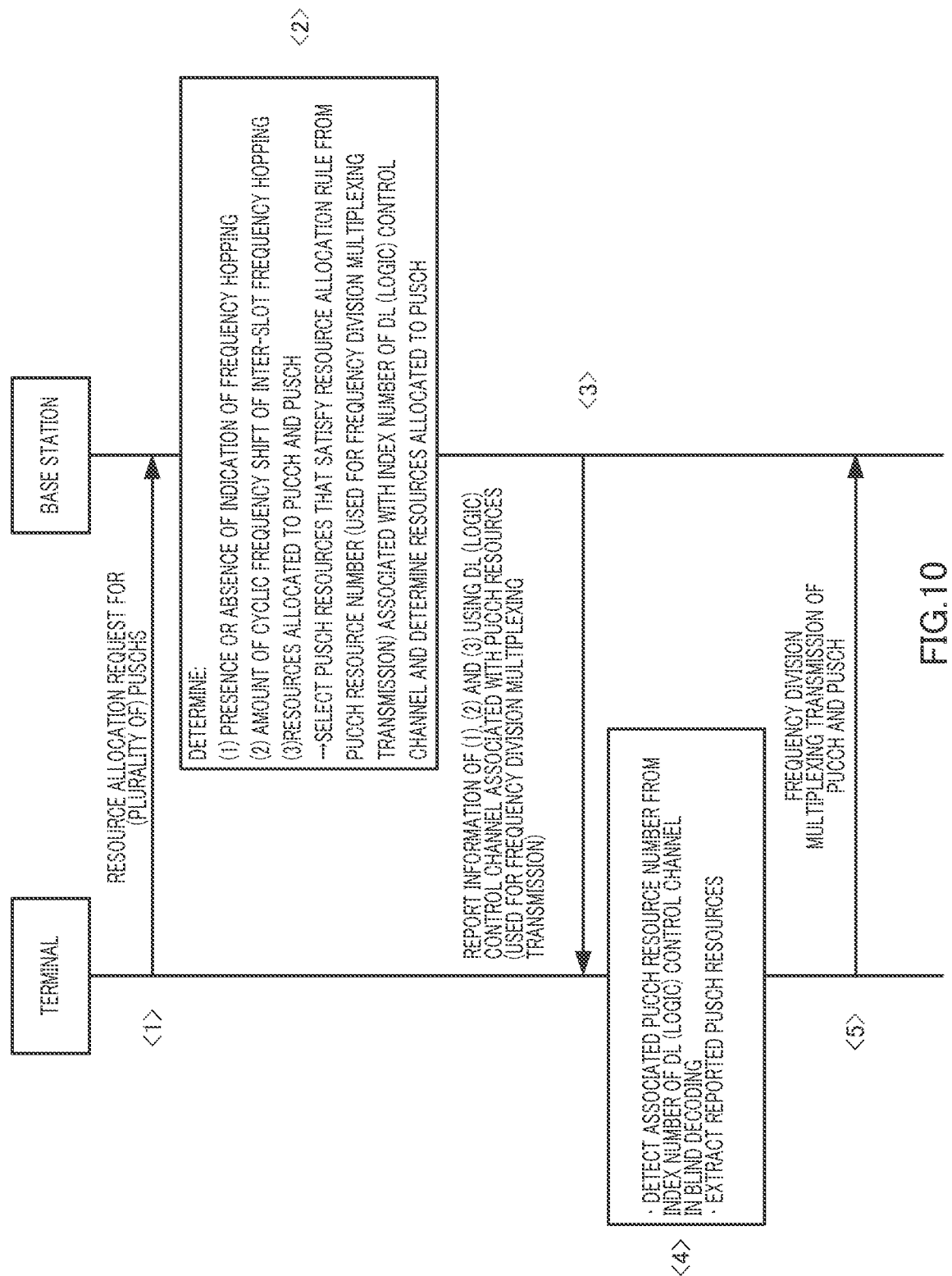
FIG. 10 is a sequence diagram illustrating an example of a control procedure when performing inter-slot frequency hopping.

Base station 100 determines resources in order of PUCCH resources and PUSCH resources (see FIG. 10). To be more specific, PUSCH which satisfies the resource allocation rule according to the present embodiment is selected from the resource number of the PUCCH used for frequency division multiplexing transmission associated with the index number of a DL (logic) control channel used in the PDCCH.

Figure 11:
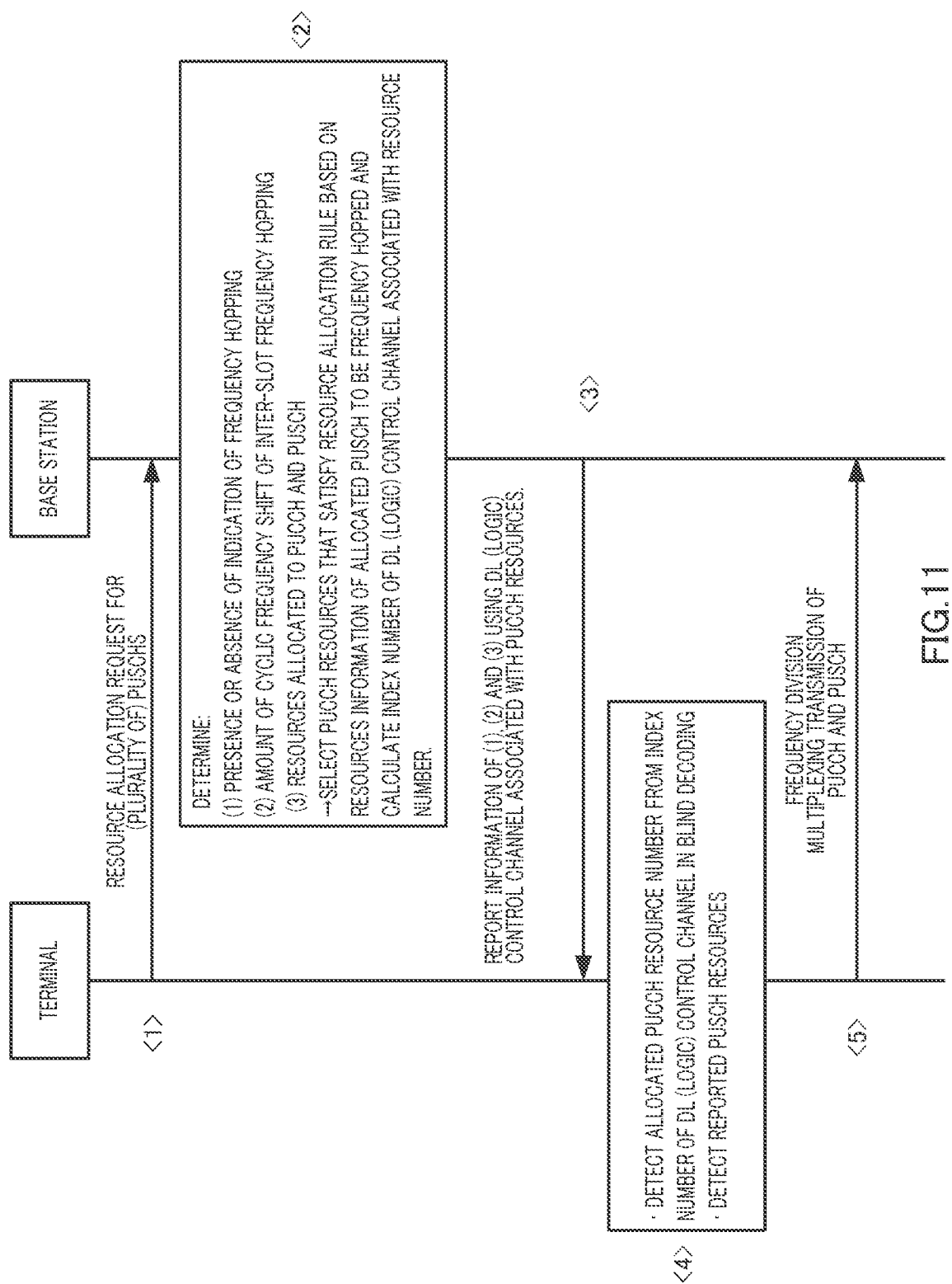
FIG. 11 is a sequence diagram illustrating another example of the control procedure when performing inter-slot frequency hopping.

Base station 100 determines resources in order of PUSCH resources and PUCCH resources (see FIG. 11). To be more specific, resource allocation is determined for the PUSCH to be subjected to frequency hopping, PUCCH resources that satisfy the resource allocation rule according to the present embodiment are selected based on the resources to which the PUSCH is allocated and the index number of the DL (logic) control channel associated with the resource number is calculated.

<3> Base station 100 transmits control information of DL/UL transmission through a control channel (PDCCH) corresponding to a certain index number of the DL (logic) control channel through which control information for DL transmission and (or) control information for UL transmission is transmitted.

<4> Terminal 200 blind-decodes a plurality of DL (logic) control channel candidates and thereby detects a DL/UL control signal directed to the terminal. To decide the presence or absence of a DL/UL control signal directed to the terminal, an identification number specific to the terminal or CRC (Cyclic Redundancy Check) or the like masked with an identification number is used.

Terminal 200 then detects PUCCH resource number allocated from the index number of the DL (logic) control channel detected through blind decoding. Furthermore, terminal 200 extracts information of PUSCH resources reported through the DL control channel.

Upon detecting a control signal directed to the terminal, terminal 200 transmits control information (ACK/NACK or the like for DL data transmission) through the UL control channel using resources of the UL (logic) control channel (or UL physical control channel (PUCCH)) after a plurality of subframes associated with an index number of the DL (logic) control channel.

<5> Terminal 200 frequency-division-multiplexes and transmits UL PUCCH and PUSCH.

[When UL PUCCH Resources are Reserved]

When UL PUCCH resources are reserved and allocated beforehand for certain terminal 200, a control procedure shown below may also be used. The control procedure in this case will be described using FIG. 12.

<1> Terminal 200 transmits allocation requests for (a plurality of) PUSCH resources.

<2> Base station 100 determines (1) the presence or absence of indication of frequency hopping of PUSCH and PUCCH based on the allocation request.

Furthermore, base station 100 calculates PUSCH resources that satisfy a resource allocation rule based on the reserved PUCCH resources (and hopping pattern information of the resources) and allocates a PUSCH hopping pattern (amount of cyclic frequency shift, resources of PUSCH) ((2), (3)).

<3> Base station 100 reports resource allocation of UL PUSCH, presence or absence of indication of frequency hopping of PUSCH and PUCCH and information (inter-slot frequency hopping information) of an amount of cyclic frequency shift of inter-slot frequency hopping of PUSCH and PUCCH to terminal 200 using a DL (logic) control channel.

<4> Terminal 200 calculates allocated PUSCH resources and reserved PUCCH resources.

<5> Terminal 200 frequency-division-multiplexes and transmits UL PUCCH and PUSCH using the calculated PUSCH resources and reserved PUCCH resources.

Next, information included in the inter-slot frequency hopping information reported through a control procedure will be described.

A case has been described in the above-described example of the control procedure where base station 100 reports the following inter-slot frequency hopping information to terminal 200 explicitly or implicitly to thereby perform frequency division multiplexing transmission applying UL inter-slot frequency hopping.

Figure 12:
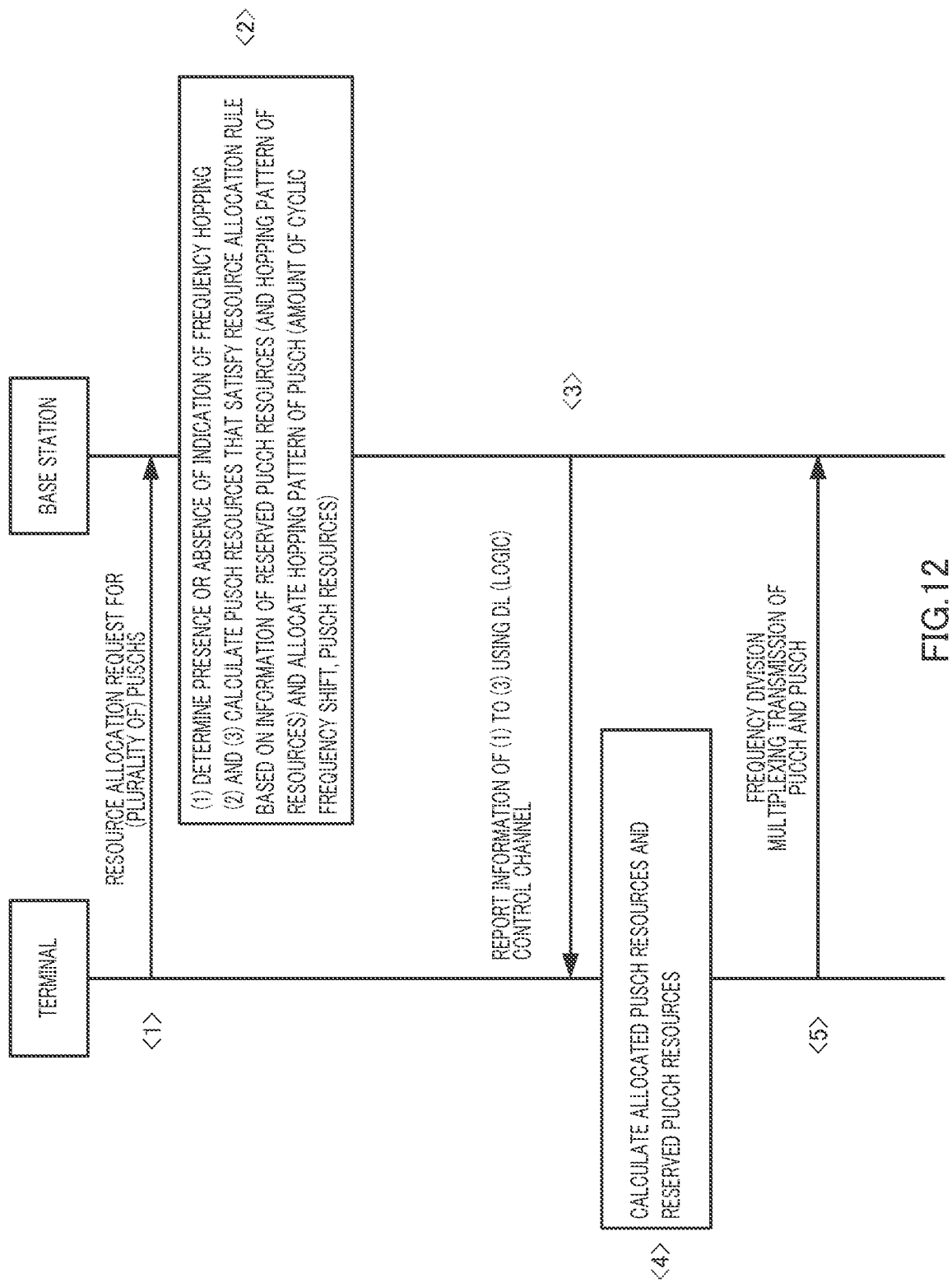
FIG. 12 is a sequence diagram illustrating a further example of the control procedure when performing inter-slot frequency hopping.

[1] PUCCH and PUSCH resource allocation information (see FIG. 9), PUSCH resource allocation information and PUCCH resource allocation information associated with DL (logic) control channel (see FIG. 10 and FIG. 11) or PUSCH resource allocation information and reserved PUCCH resource allocation information (see FIG. 12).

[2] Amount of cyclic frequency shift used for inter-slot frequency hopping of PUSCH and PUCCH

[3] Presence or absence of indication of frequency hopping of PUSCH and PUCCH

Hereinafter, such report information will be described.

[1] Regarding Reporting of Resource Allocation Information

In the control procedure in FIG. 9, for example, frequency resources to which PUSCH and PUCCH are mapped in the first slot may be reported as PUSCH and PUCCH resource allocation information. The PUSCH and PUCCH frequency resource allocation information in the second slot can be calculated by giving an amount of cyclic frequency shift which will be described later to frequency resources in the first slot. For example, in the case where the amount of cyclic frequency shift is S, the frequency resource allocation information can be expressed by second slot frequency resource number [a1, b1, c1]=first slot allocation frequency resource number [a0, b0, c0]+amount of cyclic frequency shift [S, S, S]=[a0+S, b0+S, c0+S].

Furthermore, as shown in FIG. 10 and FIG. 11, when an index number of the DL (logic) control channel is associated with a resource number (and inter-slot frequency hopping pattern) of the PUCCH or, as shown in FIG. 12, when resources (and inter-slot frequency hopping pattern) of PUCCH are reserved beforehand, only resource allocation information of the PUSCH in the first slot may be directly (explicitly) reported and resource allocation information of the PUCCH may be indirectly (implicitly) reported via a DL (logic) control channel. Frequency resources in the second slot can be calculated by giving an amount of cyclic frequency shift, which will be described later, to the frequency resources in the first slot as in the case of FIG. 9.

[2] Regarding Reporting of Amount of Cyclic Frequency Shift

Figure 13:
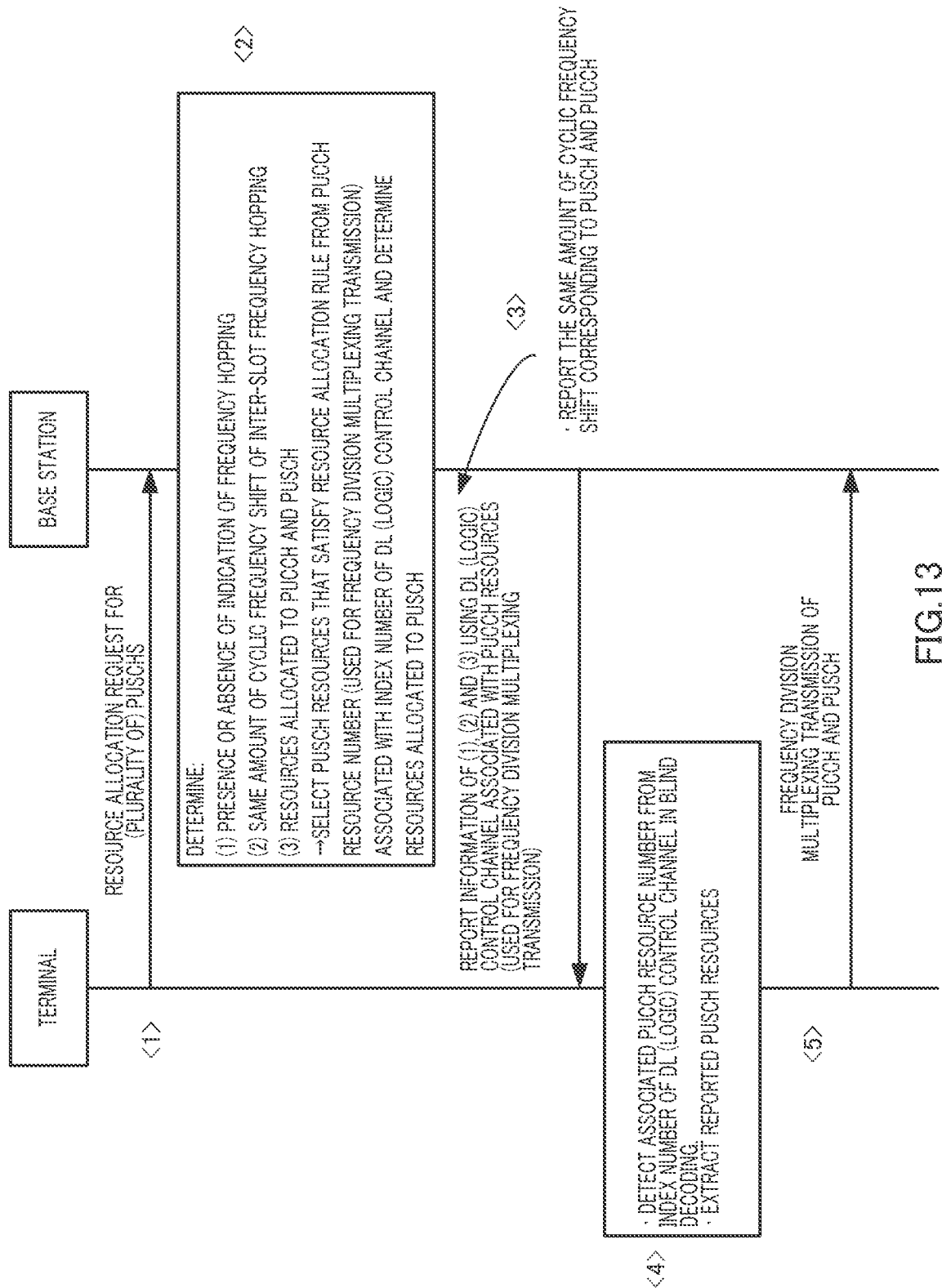
FIG. 13 is a sequence diagram illustrating a method of reporting an amount of cyclic frequency shift.

In the case of FIG. 9, as information for reporting the amount of cyclic frequency shift used for inter-slot frequency hopping of PUSCH and PUSCH, respective frequency resources of the PUCCH and PUSCH allocated to the first slot and frequency difference (amount of cyclic frequency shift) between the respective frequency resources of the PUCCH and PUSCH allocated to the second slot after frequency hopping may be reported. Since the present invention features frequency hopping by making the same frequency shift between slots while maintaining a frequency interval between the PUCCH and PUSCH, the same values may be transmitted as the respective amounts of cyclic frequency shift of the PUCCH and PUSCH. The terminal may perform slot frequency hopping of the PUSCH and PUCCH based on the two (PUCCH and PUSCH) same reported amounts of cyclic frequency shift. This makes it possible to secure backward compatibility with LTE which adopts a configuration of independently controlling frequency hopping of the PUCCH and PUSCH. Furthermore, the terminal can receive control a signal with higher reliability by combining signals indicating the two received amounts of cyclic frequency shift. FIG. 13 shows a sequence diagram of control information in this case.

Figure 14:
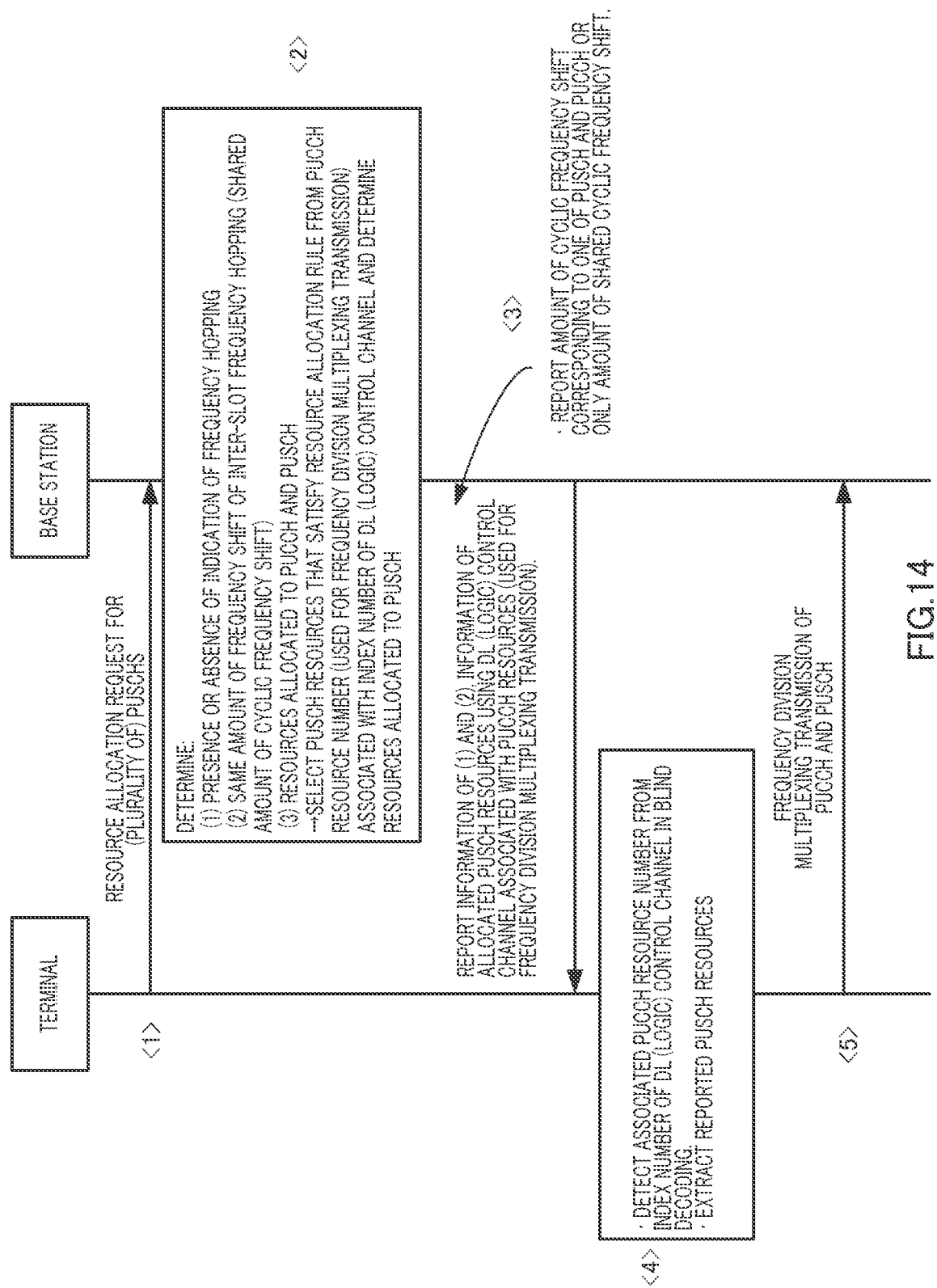
FIG. 14 is a sequence diagram illustrating a method of reporting an amount of cyclic frequency shift.

Furthermore, taking advantage of the feature of the present invention, that is, the fact that the amount of cyclic frequency shift of the PUCCH between slots is the same as the amount of cyclic frequency shift of the PUSCH between slots, a configuration of reporting only the amount of cyclic frequency shift common to the PUSCH and PUCCH (that is, one of the amounts of cyclic frequency shift) may be adopted. This makes it possible to reduce the amount of control information related to the amounts of cyclic frequency shift of PUSCH and PUSCH. FIG. 14 shows a sequence diagram of the control signal in this case.

As shown in FIG. 10 or FIG. 11, when the index number of the DL (logic) control channel is associated with the resource number (and inter-slot frequency hopping pattern) of the PUCCH or, as shown in FIG. 12, also when PUCCH resources (and inter-slot frequency hopping pattern) are reserved and allocated beforehand, the same values may be reported as the amounts of cyclic frequency shift of the PUCCH and PUSCH. Furthermore, taking advantage of the fact that the amount of cyclic frequency shift of the PUCCH is the same as the amount of cyclic frequency shift of the PUSCH; only the amount of cyclic frequency shift common to the PUSCH and PUCCH (that is, one of the amounts of frequency shift) may be reported.

Moreover, in addition to the resource number of the PUCCH, when the index number of the DL (logic) control channel is associated with the inter-slot frequency hopping pattern of the PUCCH (amount of cyclic frequency shift) or when the inter-slot frequency hopping pattern of the PUCCH (amount of cyclic frequency shift) is reserved beforehand, the amount of cyclic frequency shift between slots of the PUCCH may be set as the amount of cyclic frequency shift of the PUSCH, and therefore the amount of cyclic frequency shift of the PUSCH need not be reported in addition to the resource number and amount of cyclic frequency shift of the PUCCH. This makes it possible to further reduce the amount of control information.

By setting the amount of cyclic frequency shift common to the PUCCH and PUSCH as a value common to a plurality of cell-specific users, setting, for example, the amount of cyclic frequency shift in association with the identification number of the cell, it is possible to further reduce the amount of control information related to the amount of cyclic frequency shift while simultaneously and easily obtaining the effects of the present invention for a plurality of users frequency-division-multiplexed and transmitted.

[3] Regarding Reporting of Presence or Absence of Indication of Inter-Slot Frequency Hopping As in the above-described case of reporting the amount of cyclic frequency shift, the present invention causes the PUSCH and PUCCH to simultaneously perform frequency hopping while maintaining a frequency interval between the PUSCH and PUCCH, and can thereby also reduce control information by sharing identification numbers of the presence or absence of indication of inter-slot frequency hopping of the PUSCH and PUSCH.

(Other Variations)

Hereinafter, other variations of inter-slot hopping pattern will be described.

[Inter-Slot Hopping Pattern #2]

Figure 15:
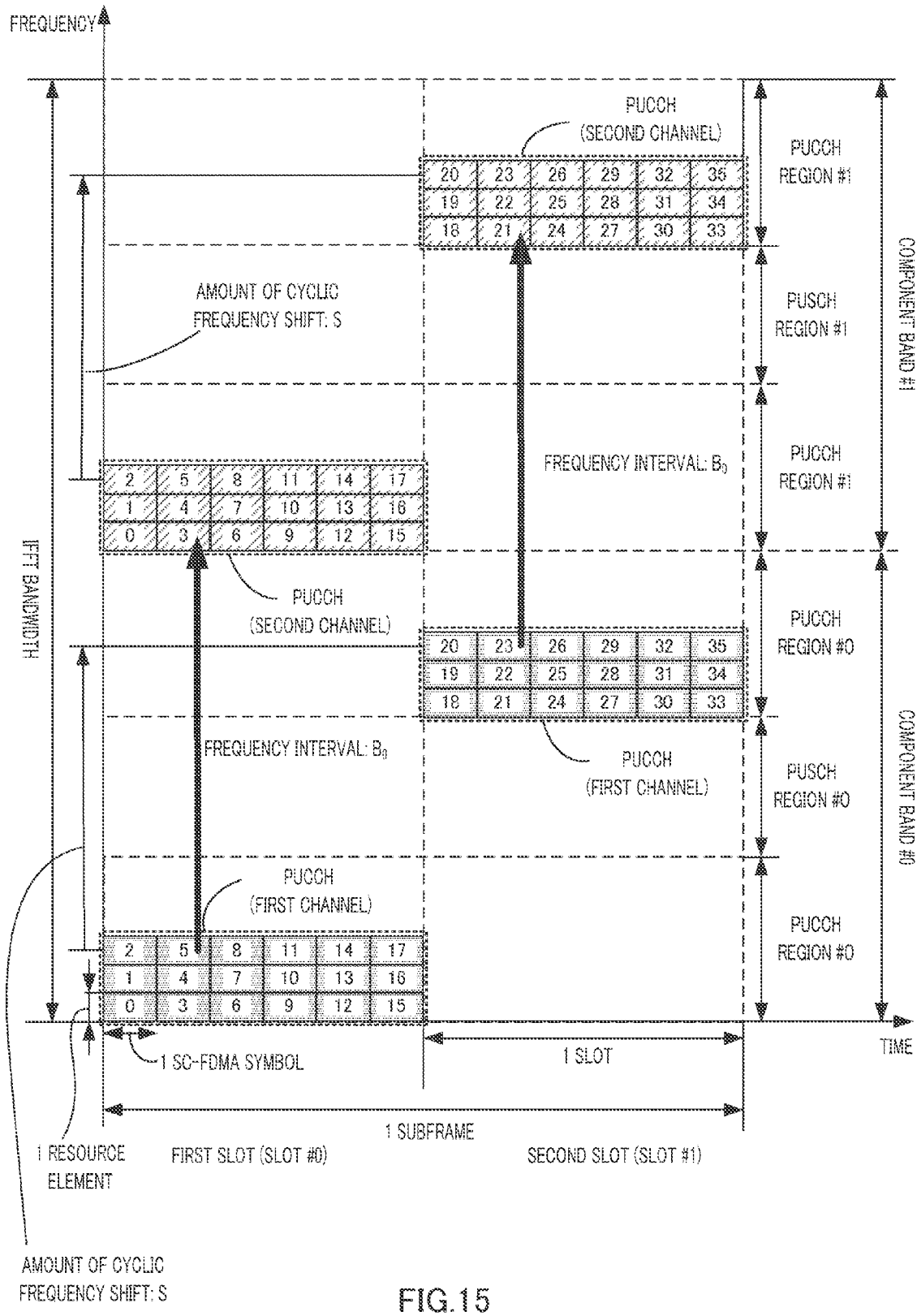
FIG. 15 is a diagram illustrating an example of [inter-slot hopping pattern #2] (frequency division multiplexing of PUCCHs (2 PUCCHs) per component band)
Figure 16:
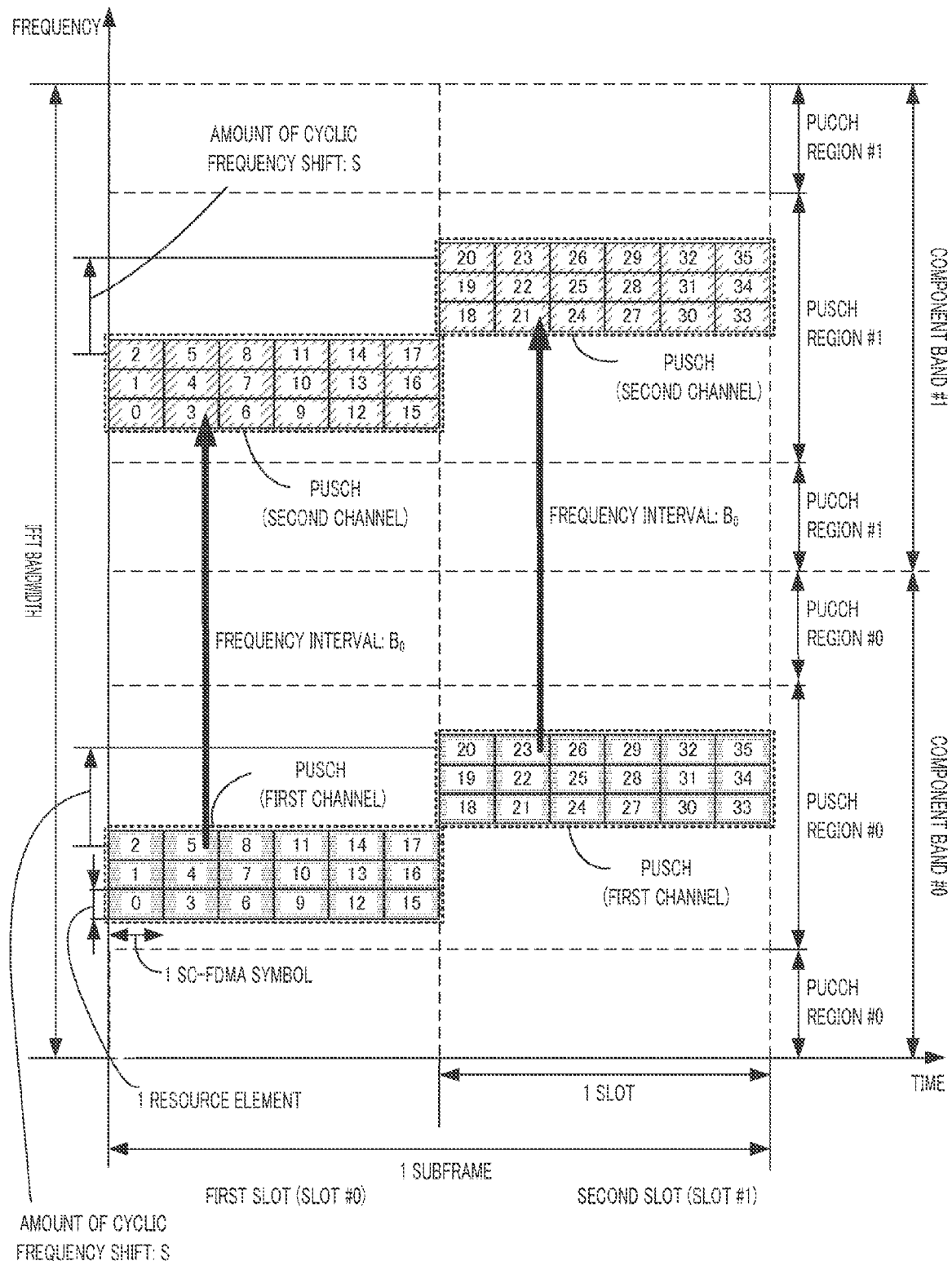
FIG. 16 is a diagram illustrating another example of [inter-slot hopping pattern #2] (frequency division multiplexing of PUSCHs (two PUSCHs) per component band)
Figure 17:
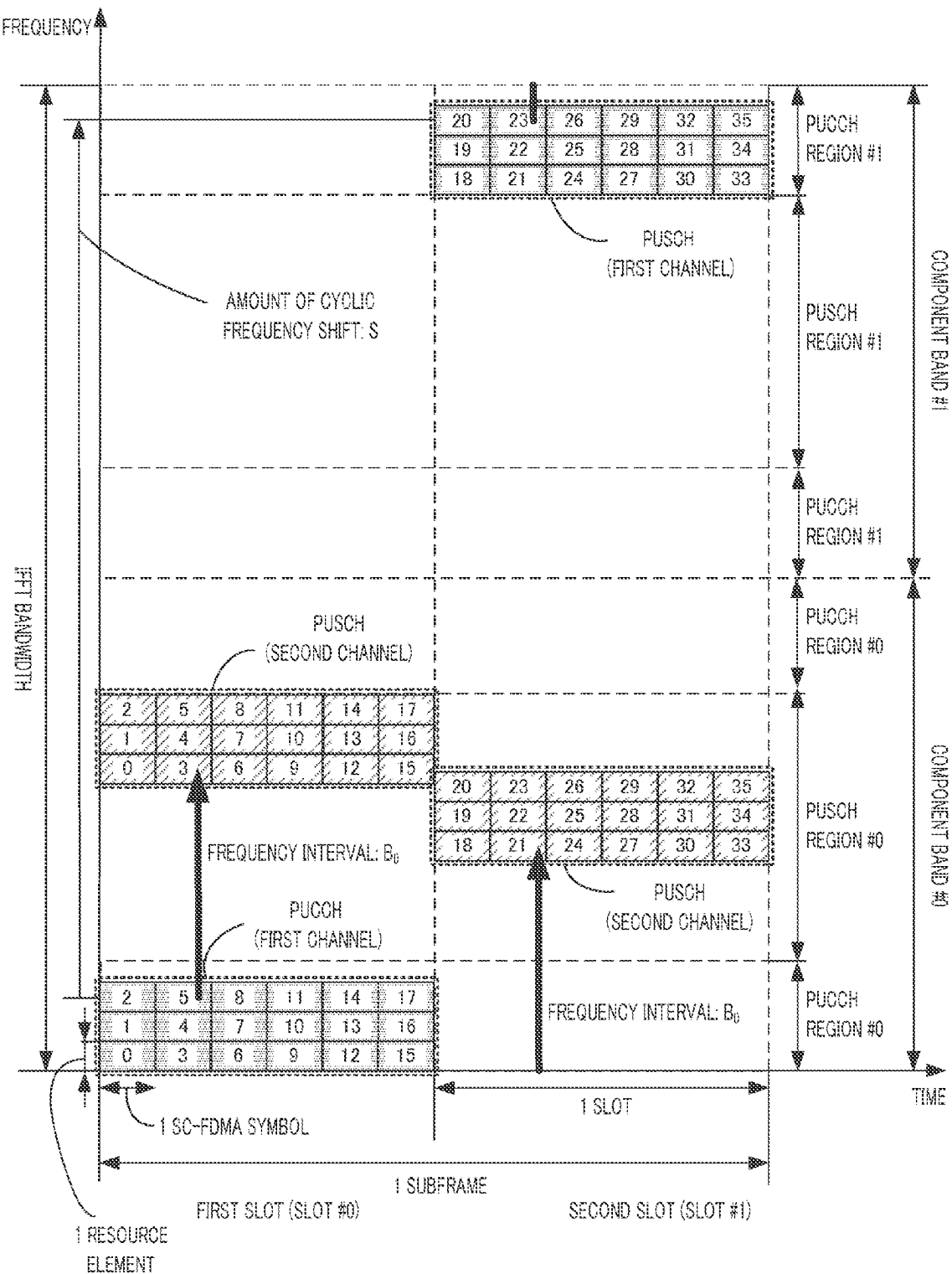
FIG. 17 is a diagram illustrating a further example of [inter-slot hopping pattern #2] (when PUCCH performs inter-slot frequency hopping between different component bands)

FIG. 15 to FIG. 17 show an example of [inter-slot hopping pattern #2].

FIG. 7 described above shows an example where one channel is mapped to PUCCH and two channels are mapped to PUSCH (that is, a case of frequency division multiplexing transmission of PUSCH と PUCCH). In addition to such mapping, the present invention is also applicable to a case where a carrier aggregation technique as shown in FIG. 15 to FIG. 17 is used for the purpose of improving the transmission rate by transmitting a plurality of component bands bundled together and effects similar to those described in [inter-slot hopping pattern #1] can be obtained.

Frequency division multiplexing transmission of a plurality of PUCCHs (see FIG. 15)

Two PUCCH regions defined per component band are subjected to inter-slot frequency hopping while maintaining frequency difference +$B_0$. However, for PUCCH per component band, the PUCCH region defined within the component band is subjected to inter-slot frequency hopping. FIG. 15 shows an example where PUCCH regions are defined at both edges of component bands #0 and #1 respectively.

Frequency division multiplexing transmission of a plurality of PUSCHs (see FIG. 16)

One PUSCH region defined per component band is subjected to inter-slot frequency hopping while maintaining the frequency difference. However, for PUSCH per component band, a PUSCH region defined per component band is subjected to inter-slot frequency hopping. FIG. 16 is an example where a PUSCH region is defined in the middle of component bands #0 and #1 respectively.

Frequency division multiplexing transmission of a plurality of PUCCHs and a plurality of PUSCHs (combination of FIG. 15 and FIG. 16)

By combining the examples shown in FIG. 15 and FIG. 16, it is possible to realize a plurality of PUCCHs and a plurality of PUSCHs to be subjected to inter-slot frequency hopping within a component band over a plurality of component bands.

A case is described in the examples shown in FIG. 15 and FIG. 16 where each PUCCH and each PUSCH are subjected to inter-slot frequency hopping within a component band, but as shown in FIG. 17, a configuration may also be adopted in which PUCCH and PUSCH are subjected to inter-slot frequency hopping between a plurality of component bands. FIG. 17 shows a case where PUCCH is subjected to inter-slot frequency hopping between component band #0 and component band #1 and PUSCH is subjected to inter-slot frequency hopping within component band #0. This makes it possible to accommodate a terminal (LTE-Advanced terminal) that transmits a plurality of component bands bundled together and a terminal (e.g. LTE terminal) that performs transmission using only one component band in the same PUCCH region while obtaining effects similar to those of the inter-slot hopping patterns shown in FIG. 15 and FIG. 16. That is, backward compatibility with LTE can further be secured. Furthermore, since a plurality of PUCCH regions (PUSCH regions) present in different component bands can be flexibly allocated, it is possible to avoid traffic from being concentrated on a PUCCH region (PUSCH region) in a certain specific component band.

The control procedure and report information in the above-described carrier aggregation may be controlled per component band of UL using a DL control channel (PDCCH) in the same way as for the control procedure shown in FIG. 9, FIG. 10, FIG. 11 and FIG. 12.

Furthermore, since FIG. 15 to FIG. 17 correspond to a case where the present invention is applied over a plurality of component bands, the amount of inter-slot cyclic frequency shift is the same for PUCCH and PUSCH per component band. Therefore, when the presence or absence of indication of inter-slot frequency hopping and the amount of cyclic frequency shift are set to be the same for each of a plurality of component bands, it is possible to further secure backward compatibility with the control method of LTE that controls inter-slot frequency hopping per component band.

Furthermore, it may also be possible to bundle a plurality of component bands, make the same setting about the presence or absence of indication of inter-slot frequency hopping and the amount of cyclic frequency shift, report and control the report information collectively as indication information of inter-slot frequency hopping and a common amount of cyclic frequency shift. For example, when a plurality of component bands are bundled and subjected to carrier aggregation, the amount of cyclic frequency shift of each PUCCH or each PUSCH present in a plurality of component bands may be reported as an amount of cyclic frequency shift (one amount of cyclic frequency shift is defined/set in a plurality of component bands) common to all bands. Thus, when carrier aggregation is performed, it is possible to reduce the amount of control information related to UL frequency hopping of PUSCH or PUCCH reported through the DL control channel.

Furthermore, as described above, by setting the same amount of cyclic frequency shift for PUCCH and PUSCH common to a plurality of cell-specific users, for example, setting an amount of cyclic frequency shift in association with an identification number of the cell, it is possible to further reduce the amount of control information related to the amount of cyclic frequency shift while simultaneously and easily obtaining the effects of the present invention for a plurality of users subjected to carrier aggregation and frequency division multiplexing transmission.

[Inter-Slot Hopping Pattern #3]

Figure 18:
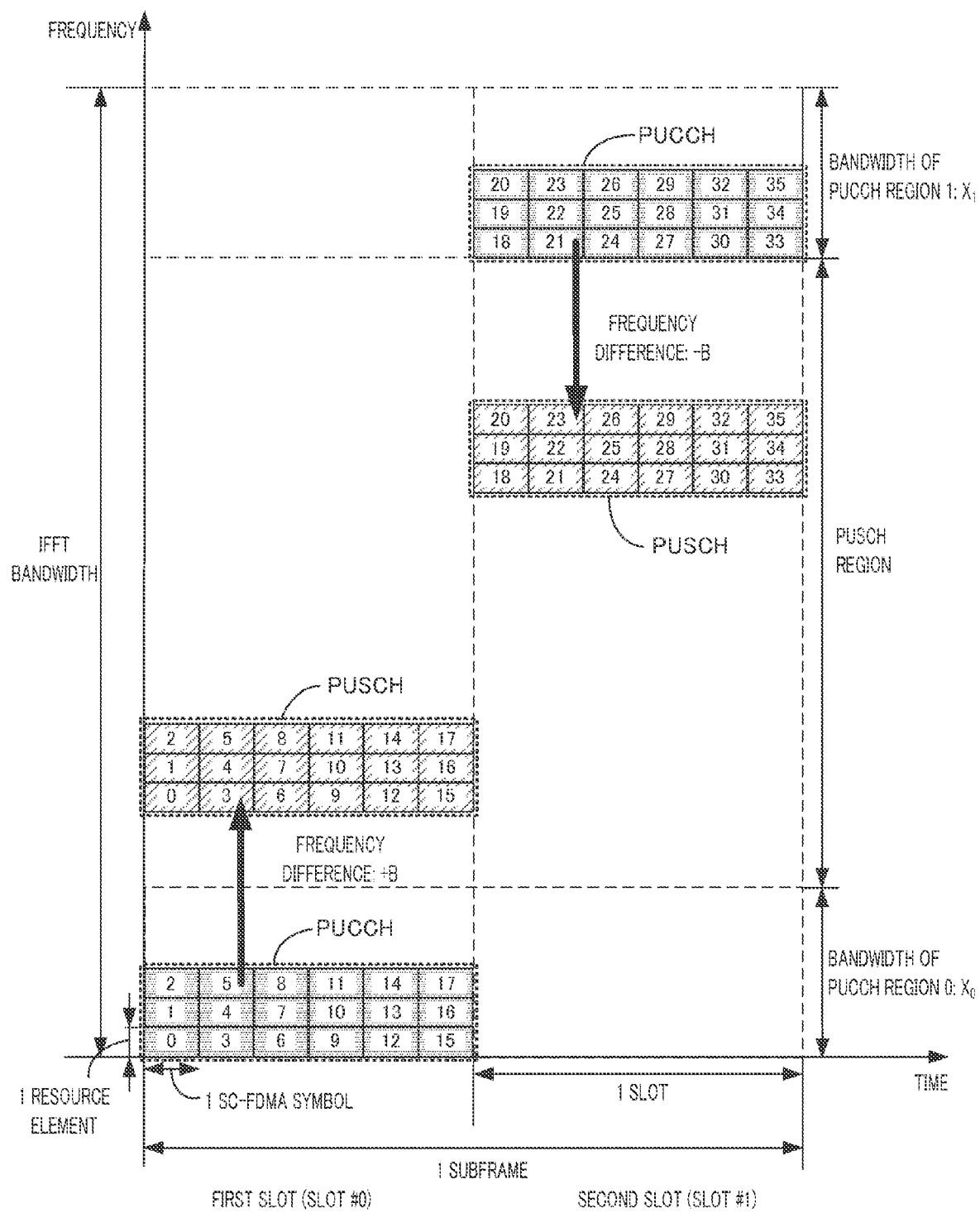
FIG. 18 is a diagram illustrating an example of [inter-slot hopping pattern #3]

FIG. 18 shows an example of [inter-slot hopping pattern #3].

As shown in FIG. 18, when the frequency difference between a frequency resource to which a first channel is allocated in the first slot and a frequency resource to which a second channel is allocated is +B, the second channel is cyclically allocated to a frequency resource located −B apart from the first channel in the second slot within the IDFT or IFFT bandwidth.

Thus, when frequency interval B between the PUCCH and PUSCH in the first slot is equal to or below the total bandwidth (=$X_0+X_1$) of the PUCCH defined at both edges of the IFFT band, it is possible to avoid a case where the PUSCH is mapped to the PUCCH region in the second slot depending on the inter-slot frequency hopping pattern (amount of cyclic frequency shift) of the PUCCH and obtain effects similar to the effects described in [inter-slot hopping pattern #1] when the signal mapped to the PUCCH and PUSCH is a signal that stochastically changes.

Furthermore, it is also possible to adaptively switch between the inter-slot frequency hopping method having frequency difference +B in the first slot and frequency difference +B in the second slot as shown in [inter-slot hopping pattern #1] and the inter-slot frequency hopping method having frequency difference +B in the first slot and frequency difference −B in the second slot as shown in [inter-slot hopping pattern #3]. Thus, even when mapping a signal sequence in which signals of a plurality of different characteristics (stochastic signal, deterministic signal or the like) coexist to PUCCH and PUSCH, it is possible to select inter-slot frequency hopping that minimizes a change in the instantaneous power of the transmission signal waveform between slots.

[Inter-Slot Hopping Pattern #4]

Figure 19:
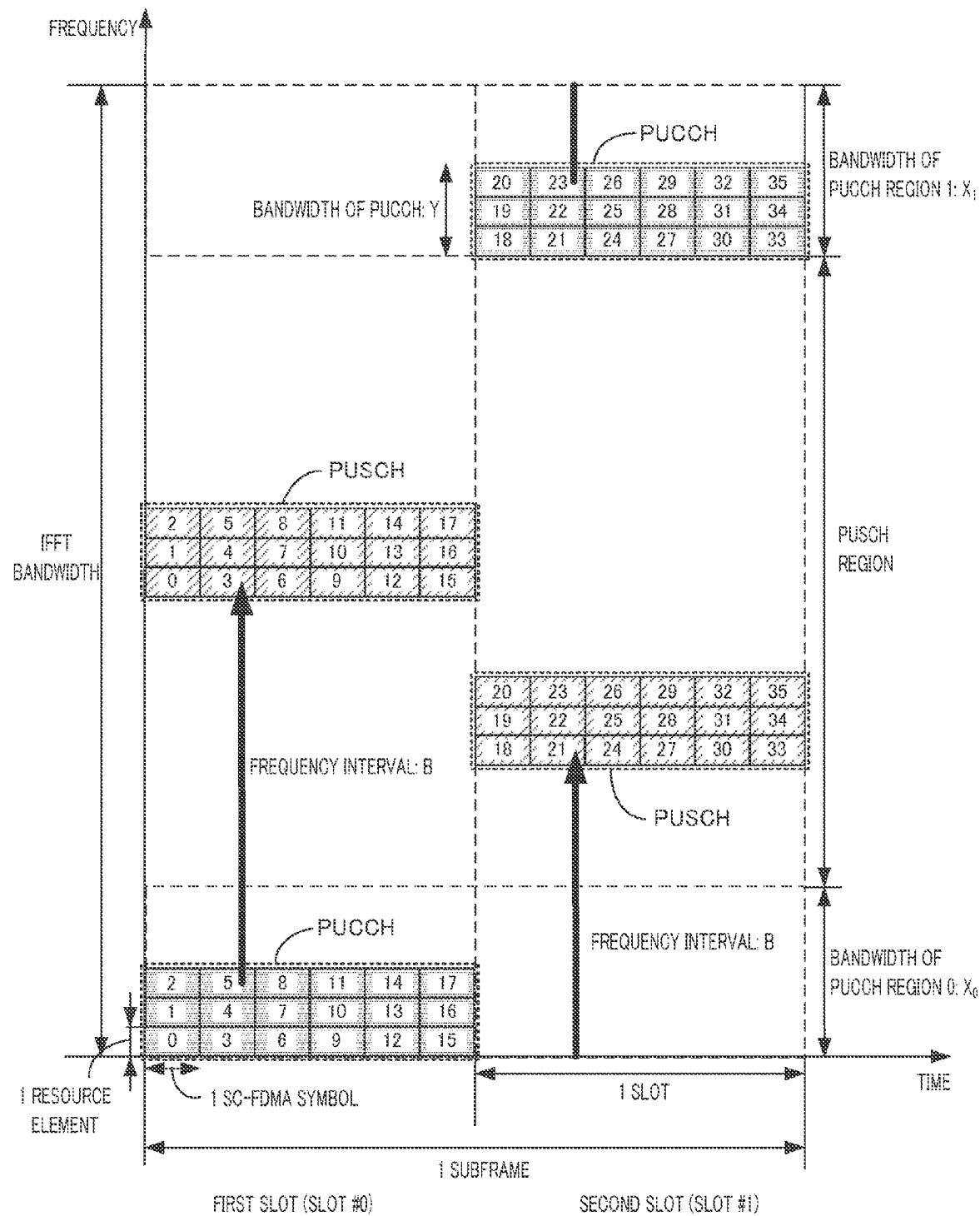
FIG. 19 is a diagram illustrating an example of [inter-slot hopping pattern #4]

FIG. 19 shows an example of [inter-slot hopping pattern #4].

Frequency interval B between the first channel and second channel is set to no less than a maximum value of the total bandwidth of the PUCCH region cyclically and continuously present in the IFFT (IDFT) bandwidth.

FIG. 19 shows a case where the bandwidth of PUCCH region #0 present in a low frequency of the IFFT band is $X_0$ and the bandwidth of PUCCH region #1 present in a high frequency of the IFFT band is $X_1$. As shown in FIG. 19, frequency interval B between PUCCH and PUSCH in the first slot is set to no less than total bandwidth ($X_0+X_1$) of the PUCCH region cyclically and continuously present in the IFFT (IDFT) bandwidth. This makes it possible to avoid the inter-slot frequency hopped PUSCH from being mapped to PUCCH region #0 and PUCCH region #1 specially provided for mapping a control signal to PUCCH region #1 while causing the PUCCH to perform inter-slot hopping in the second slot.

Furthermore, frequency interval B between the first channel and second channel may also be set to no less than a value ($X_0+X_1−Y$ in FIG. 19) resulting from subtracting PUCCH bandwidth Y from a maximum value of the total bandwidth of the PUCCH region cyclically and continuously present in the IFFT (IDFT) bandwidth. This widens the degree of freedom in the setting of frequency interval B between the first channel and second channel, and can thereby reduce constraints in frequency resource allocation in the first channel and second channel in the first slot.

[Inter-Slot Hopping Pattern #5]

Figure 20:
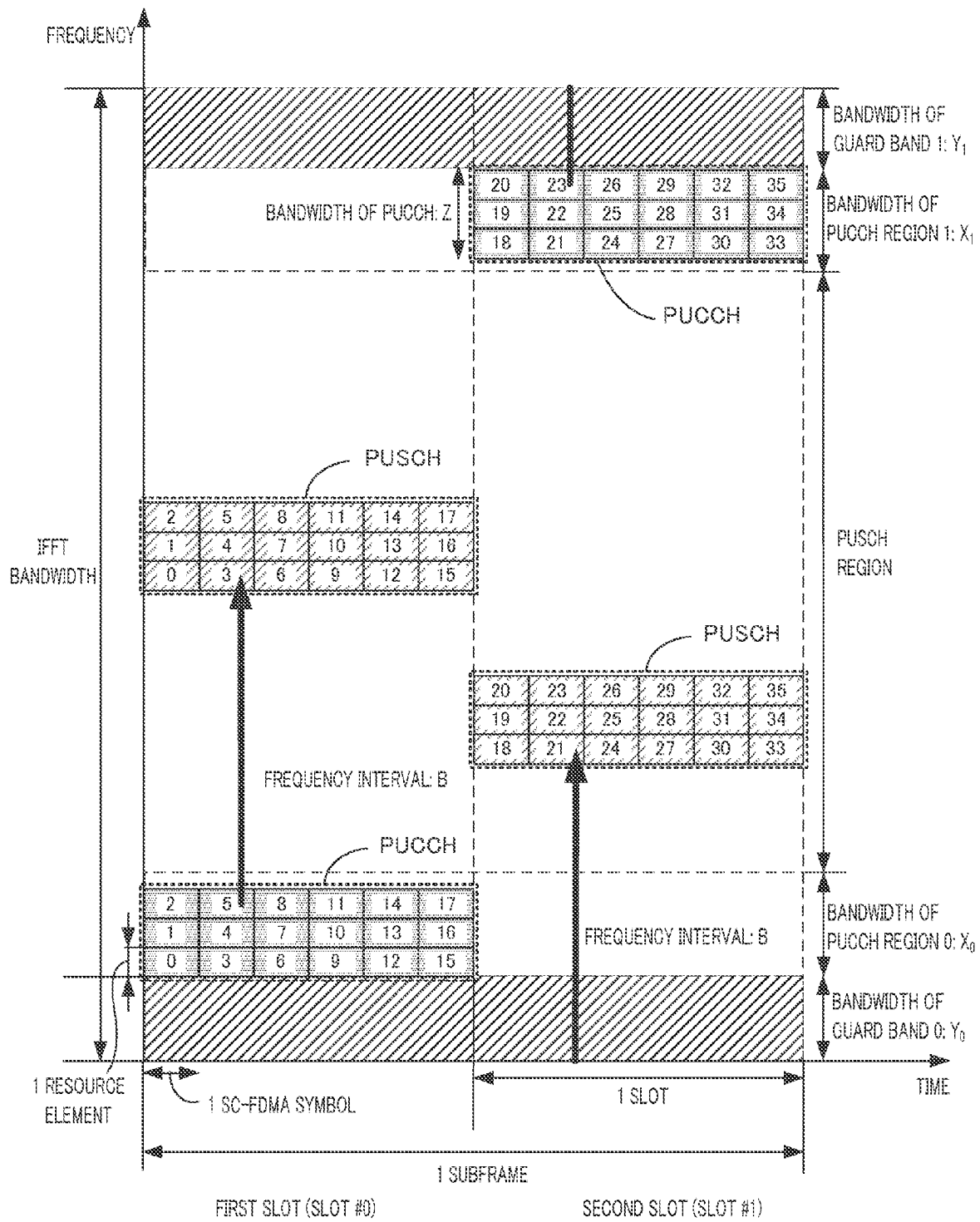
FIG. 20 is a diagram illustrating an example of [inter-slot hopping pattern #5]

FIG. 20 shows an example of [inter-slot hopping pattern #5].

Frequency interval B between the first channel and second channel is set to no less than the total bandwidth of the PUCCH region and/or guard band (zero padding) cyclically and continuously present in the IFFT (IDFT) bandwidth.

FIG. 20 shows a case where the bandwidth of guard band (zero padding) region 0 present in a low frequency of the IFFT band is $Y_0$, the bandwidth of PUCCH region #0 is $X_0$, the bandwidth of guard band (zero padding) region #1 present in a high frequency of the IFFT band is $Y_1$ and the bandwidth of PUCCH region #1 is $X_1$. As shown in FIG. 20, frequency interval B between PUCCH and PUSCH in the first slot is set to no less than the total bandwidth ($X_0+X_1+Y_0+Y_1$) of guard band (zero padding) region #0, guard band (zero padding) region #1, PUCCH region #0 and PUCCH region #1 cyclically and continuously present in the IFFT (IDFT) bandwidth. This makes it possible to avoid the inter-slot frequency hopped PUSCH from being mapped to PUCCH region #0, PUCCH region #1, guard band (zero padding) region #0 and guard band (zero padding) region #1 specially provided for mapping a control signal while causing PUCCH to perform inter-slot hopping to PUCCH region #1 in the second slot.

FIG. 20 shows a case where the PUCCH region is located adjacent to the guard band region, but when these regions are not located adjacent to each other and PUCCH regions and guard band regions are present in a plurality of bands (when these regions are continuous to a discontinuous frequency band), frequency interval B may be set to no less than a maximum total bandwidth of the continuous PUCCH region and/or guard band region, and it is thereby possible to obtain effects similar to those when the PUCCH region and the guard band region are located adjacent to each other.

For example, when a carrier aggregation technique for realizing high speed transmission is used by bundling the plurality of component bands shown in, for example, FIG. 15 and FIG. 16, if leakage interference from an LTE system comprised of only one component band to an LTE-advanced system or conversely leakage interference from an LTE-advanced system to an LTE system is taken into account, a case is assumed where a guard band is provided between component bands. That is, in FIG. 15 and FIG. 16, a case is assumed where a guard band (zero padding that makes the subcarrier component 0) region is provided between PUCCH region #0 of neighboring component band #0 and PUCCH region #1 of component band #1. In such a case, the total bandwidth of PUCCH region #0 of component band #0 and PUCCH region #1 of the guard band region and component band #1 cyclically and continuously present in the center of the IFFT band is wider than the total bandwidth of PUCCH region #0 of component band #0 and PUCCH region #1 of component band #1 cyclically and continuously present at both edges of the IFFT band. Therefore, in the above-described case, frequency interval B may be set to no less than a maximum total bandwidth of the continuous PUCCH region and/or guard band region, that is, the total bandwidth of PUCCH region #0 of component band #0, guard band region and PUCCH region #1 of component band #1 cyclically and continuously present in the center of the IFFT band.

Furthermore, frequency interval B between the first channel and second channel may be set to no less than a value resulting from subtracting PUCCH bandwidth Z from a maximum value of the maximum total bandwidth of the PUCCH region and/or guard band region cyclically and continuously present in the IFFT (IDFT) bandwidth ($X_0+X_1+Y_0+Y_1-Z$ in the case of FIG. 20). This widens the degree of freedom in the setting of frequency interval B between the first channel and second channel, and can thereby reduce constraints of frequency resource allocation of the first channel and second channel in the first slot.

[Inter-Slot Hopping Pattern #6]

Figure 21:
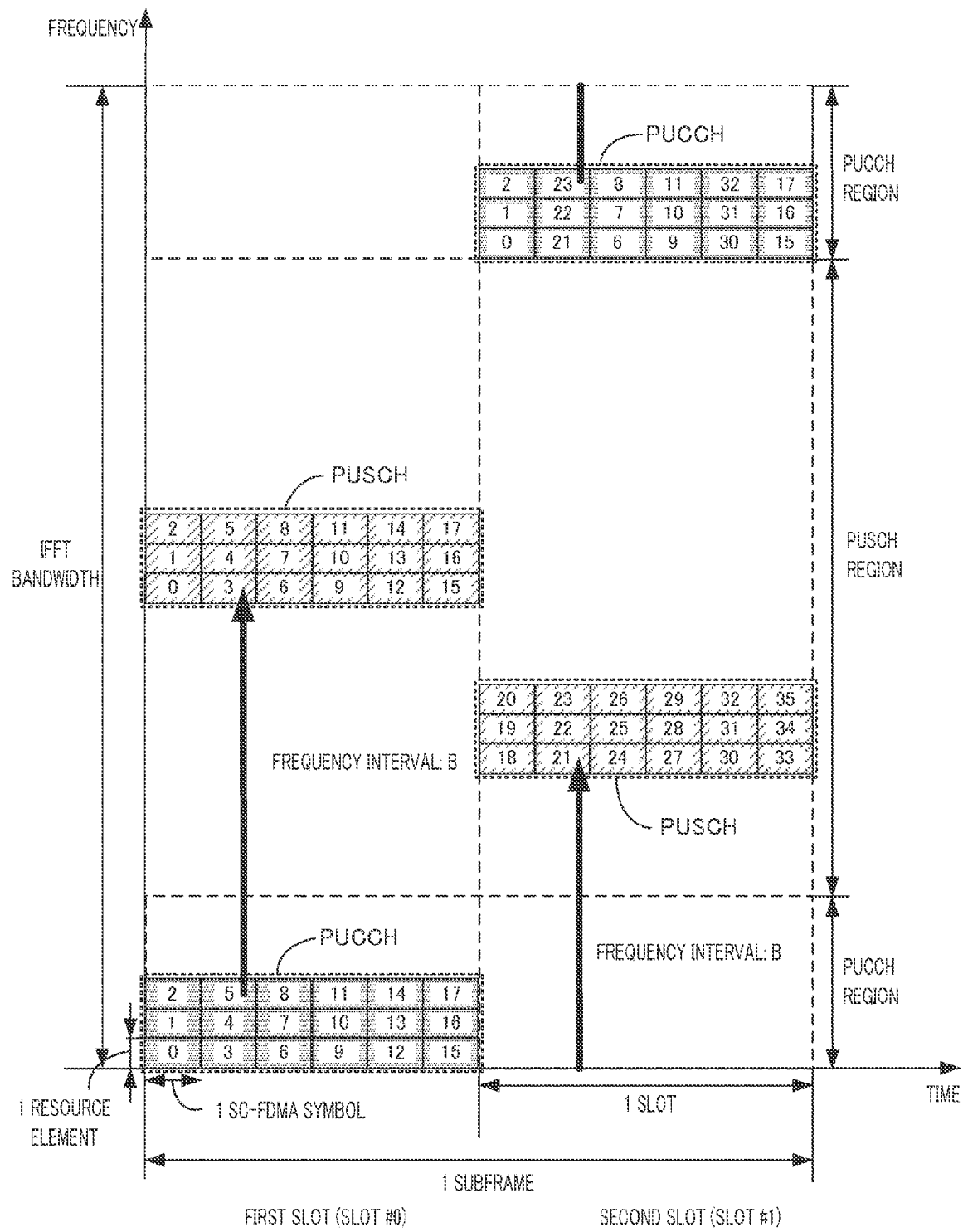
FIG. 21 is a diagram illustrating an example of [inter-slot hopping pattern #6]

FIG. 21 shows an example of [inter-slot hopping pattern #6].

Suppose the signal mapped in the first channel in the second slot after inter-slot frequency hopping (or second channel in the second slot) is a signal that repeats a signal mapped in the first channel in the first slot (or second channel in the first slot).

FIG. 21 shows a situation in which inter-slot frequency hopping is applied to signals of #0 to 2, #6 to 11 and #15 to 17 out of signals mapped to each allocation unit of the PUCCH region in the first slot while maintaining a frequency interval between PUCCH and PUSCH and then the same signal is repeatedly mapped also in the PUCCH region of the second slot. Thus, by combining repetition signals in the first slot and the second slot while maintaining a distribution of instantaneous power variation of the inter-slot frequency multiplexing division multiplexed signal, it is possible to obtain frequency and time diversity effects.

An example of the method of generating a repetition signal to be mapped to the first slot and the second slot is shown below.

[1] A modulated symbol is replicated without being spread and the replicated modulated symbol is mapped to the first slot and second slot as is.

[2] By spreading the modulated symbol with one certain spreading sequence such as a DFT or CAZAC sequence and duplicating the spread signal, a plurality of repetition signals are generated and mapped to the first slot and second slots respectively. A configuration may also be adopted in which a bit sequence before channel coding or a bit sequence after channel coding and before modulation is replicated, the replicated bit sequences are modulated, the modulated symbols are spread by one certain spreading sequence such as DFT or CAZAC sequence, a plurality of repetition signals are generated and mapped to the first slot and second slot respectively.

By generating a repetition signal using the above-described methods in [1] and [2], the instantaneous power distribution characteristic (e.g. CCDF characteristic of PAPR) of the SC-FDMA time waveform is a correlated (similar) characteristic between the first slot and second slot, and can thereby prevent a drastic change of an inter-slot instantaneous power distribution characteristic.

[3] A modulated symbol is replicated, the replicated modulated symbols are spread by a spreading sequence which differs from one slot to another, and the spread signals are mapped to the first slot and second slot. A configuration may also be adopted in which a bit sequence before channel coding or a bit sequence after channel coding and before modulation is replicated, the replicated bit sequences are modulated and then the modulated symbols are spread by a spreading sequence which differs from one slot to another, a plurality of repetition signals are generated and mapped to the first slot and second slot.

By generating a repetition signal using the above-described method in [3], it is possible to obtain effects similar to the effects described in [inter-slot hopping pattern #1] when signals mapped to PUCCH and PUSCH are signals that change stochastically while randomizing interfered (e.g. other cell interference) components between the first slot and second slot.

[Inter-Slot Hopping Pattern #7]

A signal mapped to at least one channel of the first channel and second channel is a signal spread by one certain code sequence such as DFT or CAZAC sequence.

Explaining this using, for example, above-described FIG. 5, one modulated data symbol is spread (N=3) with a 3×3 DFT matrix and a signal sequence having a length of 3 is mapped to frequency resources of PUSCH (e.g. resource elements 0 to 2 of the 0-th SC-FDMA symbol). Similarly, one modulated control symbol is spread by a CAZAC sequence having a sequence length of 3 and the spread signal sequence having a length of 3 is mapped to PUCCH frequency resources (e.g. resource elements 0 to 2 of the 0-th SC-FDMA symbol).

Thus, by mapping each spread signal sequence to frequency resources (continuous), each signal sequence can generate a signal sequence having a high correlation among neighboring frequency resources, and therefore an amplitude variation width of a time domain signal of each spread signal sequence is reduced. Therefore, the amplitude variation width of the frequency-division-multiplexed signal corresponding to a signal generated by combining a plurality of those signals is smaller than an unspread signal. That is, it is possible to obtain a frequency diversity effect by inter-slot frequency hopping while reducing the instantaneous power variation width of the transmission signal waveform per slot and further obtain an effect of being able to reduce changes in an instantaneous power variation distribution of the transmission time waveform of an inter-slot frequency-division-multiplexed signal.

[Inter-Slot Hopping Pattern #8]

Of the plurality of inter-slot frequency hopped channels, suppose a signal mapped to two or more discontinuous channels is a signal resulting from dividing a signal (spectrum) spread by a code sequence of a DFT or CAZAC sequence or the like.

A case has been described in above-described FIG. 5 where a DFT-spread information signal sequence is mapped to PUSCH and a control signal sequence is mapped to PUCCH through a CAZAC sequence, but signals mapped to a plurality of PUSCHs present in the PUSCH region in the first slot may be one of the following signals.

[1] Suppose signals to be mapped to two or more discontinuous channels are signals resulting from spectrum dividing the DFT-spread signal into a plurality of clusters in the frequency domain (Cluster-SC-FDMA signal, cluster SC-FDMA signal).

Figure 22:
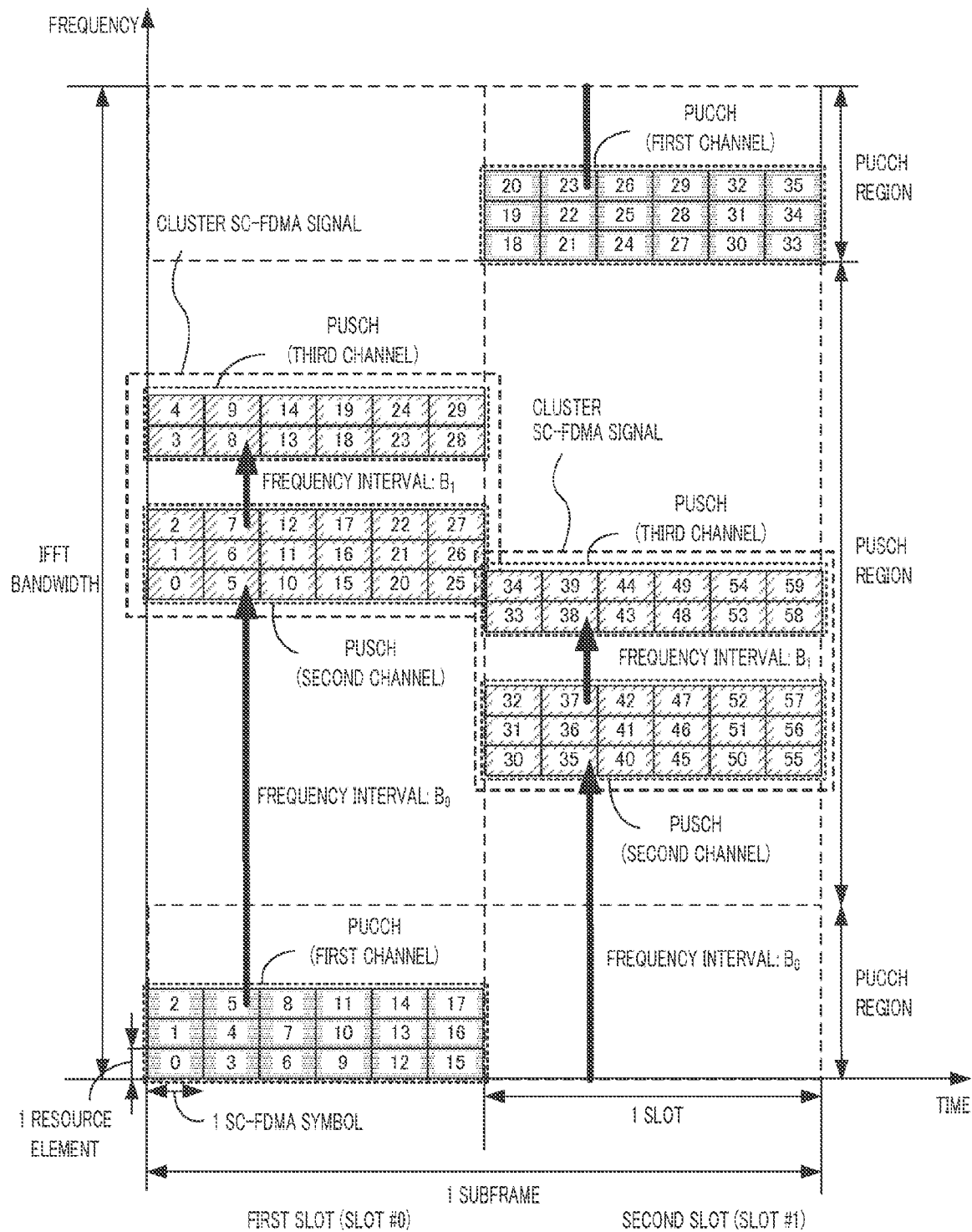
FIG. 22 is a diagram illustrating an example of [inter-slot hopping pattern #8]

FIG. 22 is an example where one modulated symbol is spread (N=5) by a 5×5 DFT matrix, the spread signal sequence having a length of 5 is divided into 3:2 (e.g. 0 to 2 and 3 to 4) and are mapped to allocation units of the SC-FDMA symbol at the heads of the second channel and third channel of PUSCH. FIG. 22 is an example where similar processing is performed on subsequent SC-FDMA symbols and then inter-slot frequency hopping similar to the case with three channels described in [inter-slot hopping pattern #1] is applied.

Figure 23:
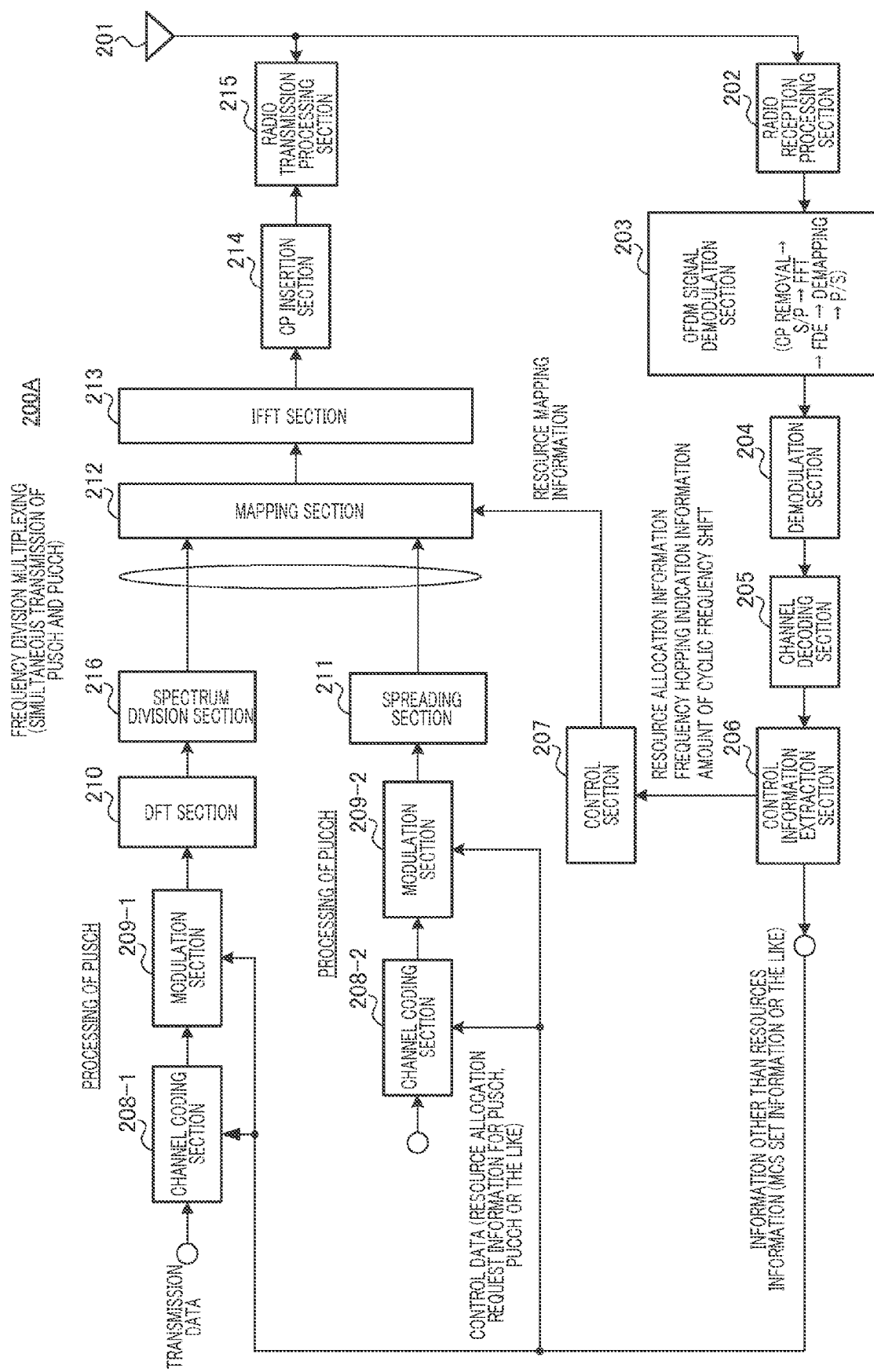
FIG. 23 is a diagram illustrating another configuration of the terminal according to Embodiment 1.

FIG. 23 shows a configuration example of the terminal in this case. In FIG. 23, components common to those in FIG. 4 will be assigned the same reference numerals as those in FIG. 4 and descriptions thereof will be omitted. Terminal 200A in FIG. 23 adopts a configuration in which spectrum division section 216 that divides a signal sequence after DFT is added to terminal 200 in FIG. 4 between DFT section 210 and mapping section 212.

[2] Suppose signals to be mapped to two or more discontinuous channels are signals (N×SC-FDMA signals) resulting from individually DFT spreading a signal sequence generated independently by channel coding or modulating two or more different transport blocks (codewords) in a different or the same transmission format (MCS set or transmission power control value).

In this case, in FIG. 16 shown above, respective DFT-spread signal sequences corresponding to two or more different transport blocks (codewords) may be mapped to two or more PUSCHs (first channel, second channel, . . . ).

By mapping the above-described signals as shown in [1] or [2] and causing the signals to frequency hop between slots, even when the signals are mapped to two or more discontinuous channels, it is possible to suppress changes in the distribution characteristic of instantaneous power between slots while maintaining resource allocation flexibility in the frequency domain without leading to a drastic increase of PAPR compared to OFDM transmission.

By arranging two or more discontinuous channels to which a DFT-spread sequence is mapped at equal intervals in the frequency domain, it is possible to further avoid changes in the distribution characteristic of instantaneous power between slots while maintaining the distribution characteristic of instantaneous power of lower PAPR.

A method of reporting an amount of cyclic frequency shift using the feature of the present invention, that is, that the amount of cyclic frequency shift of PUCCH between slots is the same as the amount of cyclic frequency shift of PUSCH between slots has been described above. To be more specific, descriptions have been given about a method of setting the amount of cyclic frequency shift of PUSCH and the amount of cyclic frequency shift of PUCCH to the same value and reporting the amounts and a method of reporting only the amount of cyclic frequency shift common to PUSCH and PUCCH (that is, one of the amounts of cyclic frequency shift). In the case of setting the amount of cyclic frequency shift of PUSCH and the amount of cyclic frequency shift of PUCCH to the same value and reporting both, the terminal combines the same two received amounts of cyclic frequency shift, and can thereby improve receiving quality of the information. However, a case may also be assumed where inter-slot frequency hopping patterns (cyclic frequency shifts) of a plurality of PUSCHs and a plurality of PUCCHs are transmitted through the same component carrier (component band) or different component carriers (component bands) on a DL and reported at different times and the inter-slot frequency hopping patterns of the plurality of channels are not the same at a certain point in time of frequency division multiplexing transmission on an UL. In such a case, inter-slot frequency hopping may be performed on a plurality of channels according to the following method.

(1) When a plurality of PUSCHs are simultaneously transmitted through the same component carrier or different component carriers, all of the plurality of PUSCHs are inter-slot frequency hopped preferentially following an inter-slot frequency hopping pattern (cyclic frequency shift) of PUSCH reported by the primary component carrier (PCC) of a DL preferentially received and monitored by the terminal with. This makes it possible to obtain effects similar to those described above.

(2) When PUSCH and PUCCH (PUCCH and PUCCH) are simultaneously transmitted through the same component carrier, PUSCH and PUCCH (PUCCH and PUCCH) are inter-slot frequency hopped preferentially following an inter-slot frequency hopping pattern of (one certain) PUCCH reported. This makes it possible to obtain effects similar to those described above.

(3) When a plurality of PUSCHs and a plurality of PUCCHs are simultaneously transmitted through the same component carrier or different component carriers, all the channels are inter-slot frequency hopped following an inter-slot frequency hopping pattern (cyclic frequency shift) of PUCCH reported by the primary component carrier of a DL preferentially received and monitored by the terminal. This makes it possible to obtain effects similar to those described above.

FIG. 18 has described the method of cyclically allocating the second channel to a frequency resource located frequency difference −B apart from the first channel in the second slot within the IDFT or IFFT bandwidth when the frequency difference between the frequency resource to which the first channel is allocated and the frequency resource to which the second channel is allocated is +B in the first slot. Using this method makes it possible to obtain effects similar to the effects described in [inter-slot hopping pattern #1] also for a signal sequence where signals having a plurality of different characteristics (stochastic signal, deterministic signal or the like) coexist within a slot (subframe) in addition to stochastic signals.

Embodiment 2

A case has been described in Embodiment 1 where when the frequency interval between the first channel and second channel allocated to the first slot is B within the IDFT or IFFT band, frequency division multiplexing transmission is performed based on the resource allocation rule whereby the second channel is cyclically allocated to a frequency resource located B apart from the first channel in the second slot within the IDFT or IFFT band (system band) width. The present embodiment will describe a method of setting frequency interval (frequency difference) B between a plurality of channels subjected to frequency division multiplexing transmission according to the resource allocation rule. For frequency interval B in the second slot, the same value as frequency interval B in the first slot is maintained as described in Embodiment 1.

[Frequency Interval Setting Method #1-0]

Of the first channel or second channel frequency-division-multiplexed and transmitted in the first slot or second slot, as frequency resources of at least one channel approach both edges of the system band (or move apart from the central frequency), frequency interval B between the first channel and second channel (or maximum value of frequency interval B) is set to be narrower.

Figure 25:
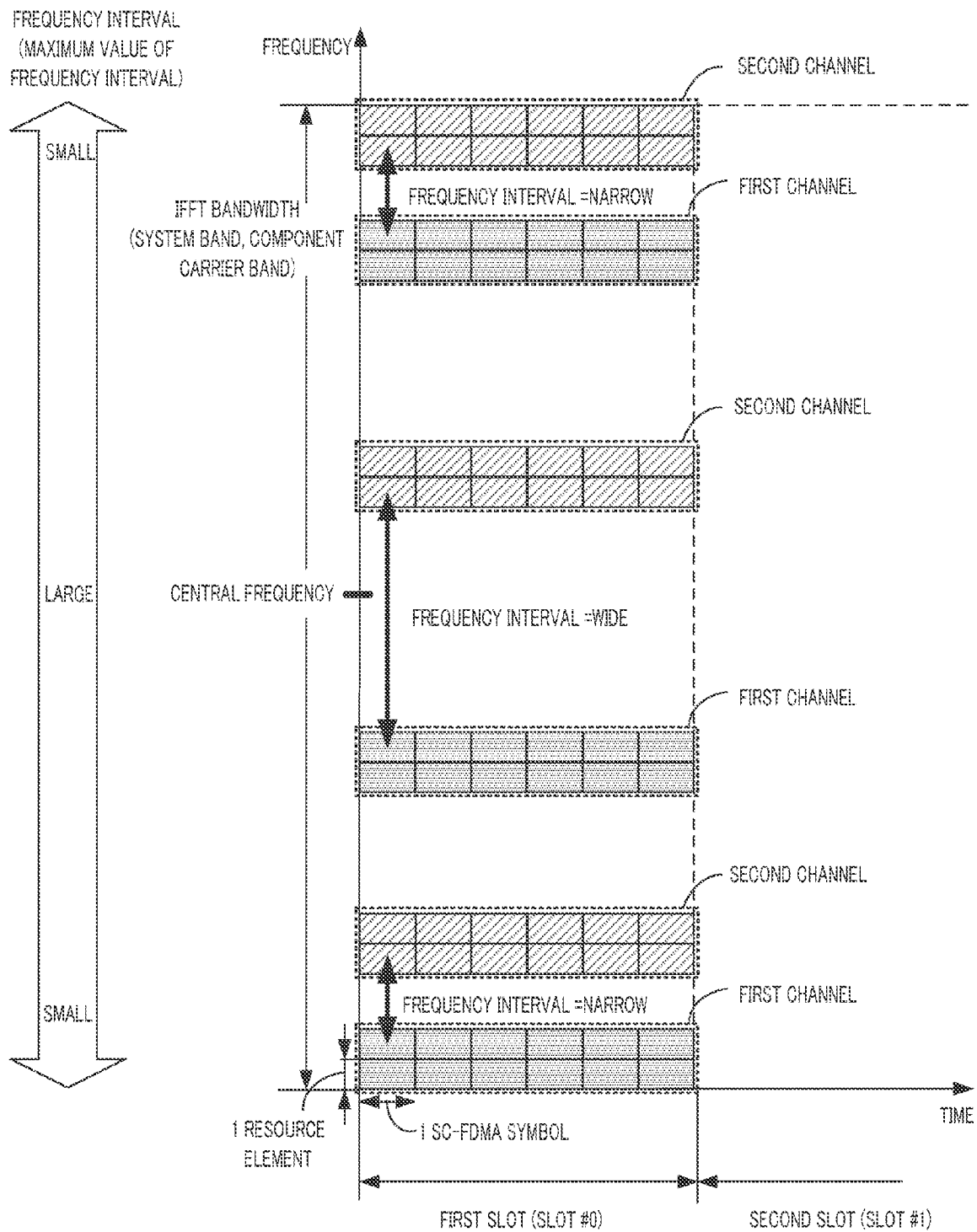
FIG. 25 is a diagram illustrating an example of [frequency interval setting method #1-0]

FIG. 25 shows an example of [frequency interval setting method #1-0]. As shown in FIG. 25, [frequency interval setting method #1-0] controls frequency interval B between the frequency resources to which the first channel is allocated in the first slot and frequency resources to which the second channel is allocated based on the frequency distance from both edges of the system band or frequency distance from the central frequency. To be more specific, as the frequency distance from both edges of the system band increases or the frequency distance from the central frequency decreases, frequency interval (maximum value of frequency interval) B between the first channel and second channel is set to be narrower.

Generally, when a plurality of channels are frequency-division-multiplexed and simultaneously transmitted, due to the influence of non-linearity of the amplifier, inter-modulation distortion occurs among a plurality of channels, which is liable to cause a problem that leakage to outside the transmission band occurs. However, by using [frequency interval setting method #1-0], frequency interval B between the first channel and second channel which are frequency-division-multiplexed is set to be narrower at both edges of the system band where the influence of inter-modulation distortion to outside the band (where the influence of out-of-band leakage power increases) and it is thereby possible to reduce the influence. On the other hand, in the vicinity of the center of the system band where the influence of out-of-band leakage power is small, frequency interval B between the first channel and second channel which are frequency-division-multiplexed is set to be wider (or limitless), and it is thereby possible to maintain the scheduling effect accompanying flexible resource allocation in the frequency domain. That is, it is possible to further obtain the above-described effect while maintaining the effect of Embodiment 1.

[Frequency Interval Setting Method #1-1]

Of the first channel and second channel which are frequency-division-multiplexed and transmitted, as the frequency distance between frequency resources of at least one channel and both edges of the system band decreases, frequency interval B between the first channel and second channel (maximum value of the frequency interval) is set to be narrower (set to threshold X [RE: Resource Element] or below). Alternatively, of the first channel and second channel which are frequency-division-multiplexed and transmitted, frequency interval B between the first channel and second channel (maximum value of the frequency interval) is set to be narrower as the frequency distance between frequency resources of at least one channel and the central frequency of the system band increases (set to threshold X [RE] or below).

FIG. 26 shows a table of correspondence between the frequency distance from both edges of the system band and the central frequency of the system band, frequency interval B and maximum value (threshold) of frequency interval B based on [frequency interval setting method #1-1]. In the example shown in FIG. 26, of the first channel and second channel which are frequency-division-multiplexed and transmitted, when the frequency distance between frequency resources of at least one channel and both edges of the system band is large, no limit is placed on the maximum value of frequency interval B between the first channel and second channel. Of the first channel and second channel which are frequency-division-multiplexed and transmitted, when the frequency distance between frequency resources of at least one channel and both edges of the system band is small, the maximum value of frequency difference B between the two channels is limited to X [RE] or below.

This limits frequency interval B between the first channel and second channel which are frequency-division-multiplexed and transmitted to X [RE] or below in the vicinity of both edges of the system band where the influence of out-of-band leakage power due to inter-modulation distortion caused by non-linearity of the amplifier is large, and can limit the expanse of out-of-band leakage power to a predetermined value or below.

[Frequency Interval Setting Method #1-2]

When frequency resources of at least one channel of the first channel and second channel which are frequency-division-multiplexed and transmitted fall within frequency distance Y [RE] from both edges of the system band, frequency interval B (maximum value of the frequency interval) is set to X [RE] or below.

Figure 27:
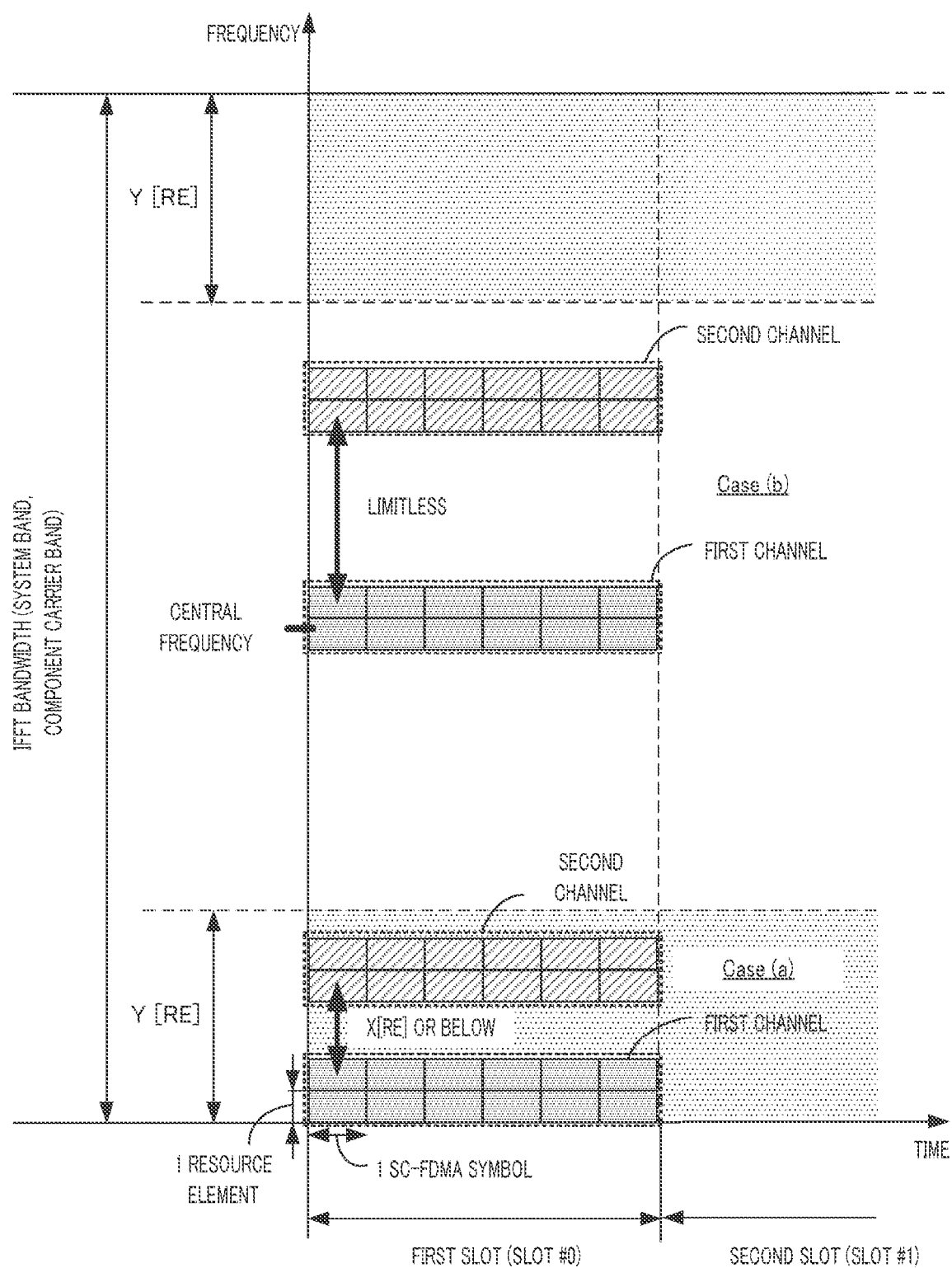
FIG. 27 is a diagram illustrating an example of [frequency interval setting method #1-2]

FIG. 27 shows an example of [frequency interval setting method #1-2]. In FIG. 27, Case (a) shows an example of case where frequency resources of at least one channel of the first channel and second channel which are frequency-division-multiplexed and transmitted fall within frequency distance Y [RE] from both edges of the system band. Furthermore, in FIG. 27, Case (b) shows an example of case where frequency resources of at least one channel of the first channel and second channel which are frequency-division-multiplexed and transmitted do not fall within frequency distance Y [RE] from both edges of the system band.

As shown in FIG. 27, when frequency resources of at least one channel of the first channel and second channel which are frequency-division-multiplexed and transmitted fall within frequency distance Y [RE] from both edges of the system band, [frequency interval setting method #1-2] limits frequency interval B between the first channel and second channel to X [RE] or below. On the other hand, when frequency resources of at least one channel of the first channel and second channel which are frequency-division-multiplexed and transmitted do not fall within frequency distance Y [RE] from both edges of the system band, [frequency interval setting method #1-2] places no limit on frequency interval B between the first channel and second channel.

FIG. 28 shows a table of correspondence between the frequency distance Y [RE] from both edges of the system band, frequency interval B (maximum value of frequency interval B) based on [frequency interval setting method #1-2].

This limits frequency interval B between the first channel and second channel which are frequency-division-multiplexed and transmitted to X [RE] or below when the frequency distance from both edges of the system band is in the vicinity of Y [RE] where the influence of out-of-band leakage power due to inter-modulation distortion caused by non-linearity of the amplifier is large, and can thereby limit the expanse of out-of-band leakage power to a predetermined value or below. On the other hand, in the band in which the frequency distance from both edges of the system band where the influence of out-of-band leakage power is large is other than Y [RE], no limit is placed on frequency interval B between the first channel and second channel which are frequency-division-multiplexed and transmitted, and it is thereby possible to maintain the scheduling effect accompanying flexible resource allocation in the frequency domain.

[Frequency Interval Setting Method #1-3]

When frequency resources of at least one channel of the first channel and second channel which are frequency-division-multiplexed and transmitted fall within a frequency distance of Y [RE] from both edges of the system band and the (maximum value of) total transmission power of a frequency-division-multiplexed signal is greater than a predetermined power value (Z [Watt (dBm)]), frequency interval B between the first channel and second channel (maximum value of frequency interval B) is set to X [RE] or below.

Figure 29:
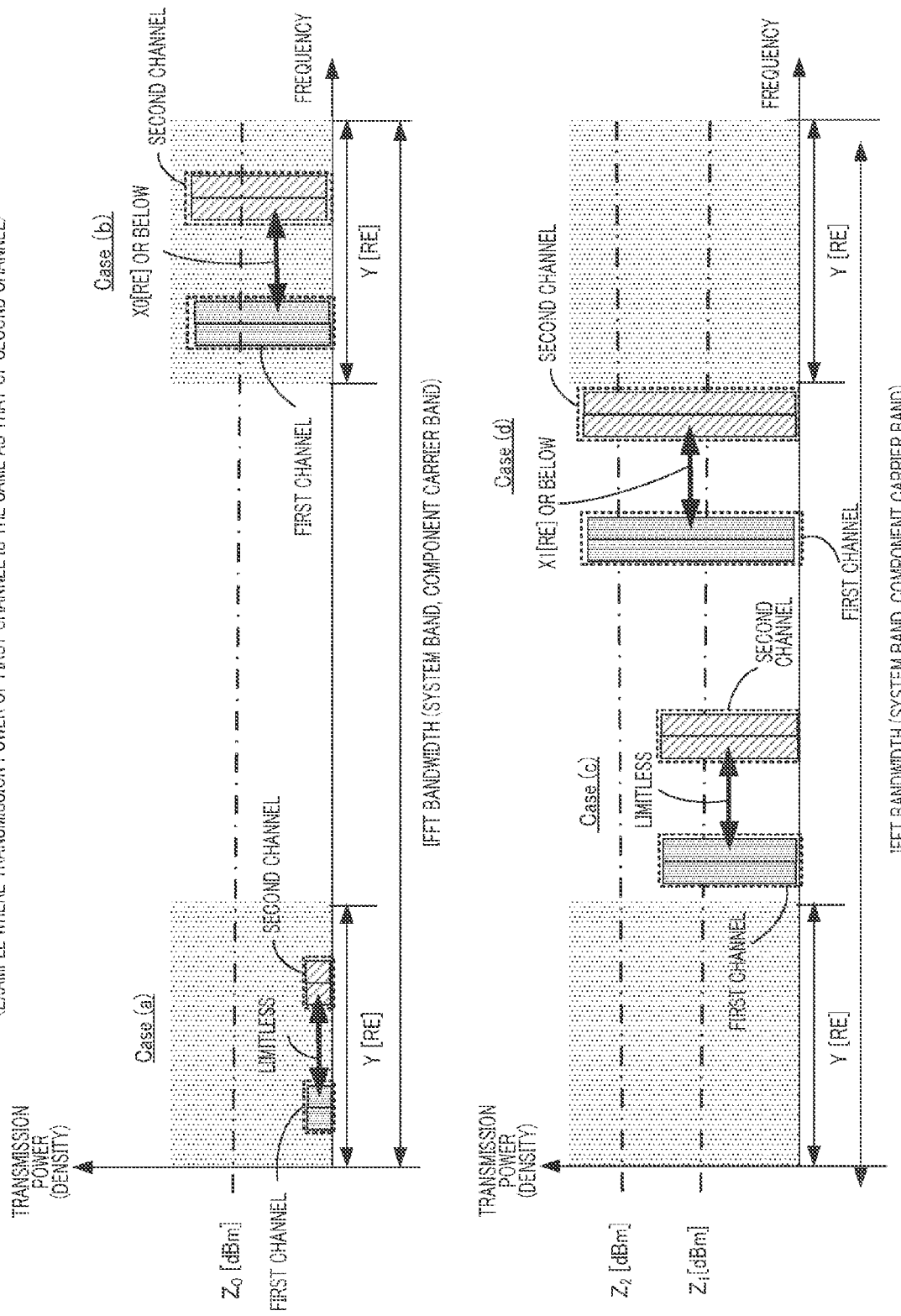
FIG. 29 is a diagram illustrating an example of [frequency interval setting method #1-3]

FIG. 29 shows an example of [frequency interval setting method #1-3]. FIG. 29 shows an example of case where transmission powers of the first channel and second channel which are frequency-division-multiplexed and transmitted are the same and Cases (a) to (d) are examples of cases shown below.

Case (a): Example where frequency resources of at least one channel of the first channel and second channel which are frequency-division-multiplexed and transmitted are located within frequency distance Y [RE] from both edges of the system band and the total transmission power of the frequency-division-multiplexed signal is below $Z_0$ [dBm]

Case (b): Example where frequency resources of at least one channel of the first channel and second channel which are frequency-division-multiplexed and transmitted are located within frequency distance Y [RE] from both edges of the system band and the total transmission power of the frequency-division-multiplexed signal is equal to or above $Z_0$[dBm]

Case (c): Example where frequency resources of at least one channel of the first channel and second channel which are frequency-division-multiplexed and transmitted are located outside frequency distance Y [RE] from both edges of the system band and the total transmission power of the frequency-division-multiplexed signal is equal to or above $Z_1$[dBm] and equal to or below $Z_2$[dBm]

Case (d): Example where frequency resources of at least one channel of the first channel and second channel which are frequency-division-multiplexed and transmitted are located outside frequency distance Y [RE] from both edges of the system band and the total transmission power of the frequency-division-multiplexed signal is equal to or above $Z_2$[dBm].

FIG. 30 shows a table of correspondence between the frequency distance from both edges of the system band, total transmission power of a frequency-division-multiplexed signal, frequency interval B (maximum value of frequency interval B) based on [frequency interval setting method #1-3] shown in Cases (a) to (d) of FIG. 29.

Based on the table of correspondence shown in FIG. 30, frequency interval B between the first channel and second channel (maximum value of the frequency interval) is set to be limitless in Case (a), $X_0$[RE] or below in Case (b), limitless in Case (c) and $X_1$[RE] or below in Case (d). Here, there is a relationship of $Z_1 < Z_2$, $X_0 < X_1$.

The greater the frequency interval (frequency difference) between the channels, the greater is the expanse of inter-modulation distortion of a frequency-division-multiplexed signal caused by non-linearity of the amplifier. In addition, the magnitude of inter-modulation distortion of the frequency-division-multiplexed signal is proportional to the cube of an amplitude product of the frequency-division-multiplexed signal. Therefore, when frequency resources of at least one channel of the plurality of channels which are frequency-division-multiplexed and transmitted are located at both edges of the system band where the influence of out-of-band leakage power is large and the total transmission power of the frequency-division-multiplexed signal is large, the frequency interval (maximum value of the frequency interval) between the plurality of channels which are frequency-division-multiplexed and transmitted is limited to a certain value ($X_0$[RE]) or below.

Furthermore, even when frequency resources of at least one channel of the plurality of channels which are frequency-division-multiplexed and transmitted are not located within frequency distance Y [RE] from both edges of the system band, if the total transmission power of the frequency-division-multiplexed signal is equal to or above a certain specified value ($Z_2$ [dBm]), the frequency interval (maximum value of the frequency interval) between the plurality of channels which are frequency-division-multiplexed and transmitted is similarly limited to a certain value ($X_1$ [RE]) or below to reduce the influence of inter-modulation distortion inside and outside the system band.

Thus, by setting the frequency interval of the frequency-division-multiplexed signal by taking into account the influence of the magnitude of transmission power of the frequency-division-multiplexed signal in addition to the positions of frequency resources in which the plurality of channels frequency-division-multiplexed and transmitted are arranged, it is possible to control the influence of interference of inter-modulation distortion on other channels with higher accuracy than when [frequency interval setting method #1-2] is used in addition to the above effect.

Frequency interval B may also be set based on transmission power of at least one channel of the plurality of channels making up the frequency-division-multiplexed signal instead of the total transmission power of the frequency-division-multiplexed signal. FIG. 31 shows a table of correspondence between the frequency distance from both edges of the system band, transmission power of one channel of a plurality of channels making up a frequency-division-multiplexed signal, frequency interval B (maximum value of frequency interval B). Effects similar to those described above can be obtained even when frequency interval B is set based on the transmission power of at least one channel of the plurality of channels making up the frequency-division-multiplexed signal instead of the total transmission power of the frequency-division-multiplexed signal. However, frequency interval B is preferably set based on the transmission power value of a channel having high transmission power as at least one channel. This makes it possible to control the influence of interference of inter-modulation distortion on other channels more accurately than when based on the transmission power value of a channel having smaller transmission power.

Furthermore, frequency interval B may also be set based on an amplitude product of each channel or power product (or power of a power product) making up the frequency-division-multiplexed signal instead of the total transmission power of the frequency-division-multiplexed signal. It is possible to obtain effects similar to those described above in this case, too.

Furthermore, when the first channel and second channel making up the frequency-division-multiplexed signal are PUSCH and PUCCH, the frequency distance may be calculated based on frequency resources in which PUSCH is arranged. As described above, PUCCH hops at both edges of the system band between slots. On the contrary, PUSCH hops in frequency bands sandwiched between the hopping regions of PUCCH. That is, PUCCH is always arranged on a frequency located farther (closer to both edges of the system band) from the central frequency than PUSCH. Therefore, as a result of calculating the frequency distance from both edges or the central frequency of the system band based on frequency resources on which PUSCH is arranged, if the frequency distance between frequency resources on which PUSCH is arranged and both edges or the central frequency of the system band is Y [RE] or below, it is clear that the frequency distance from frequency resources on which PUCCH is arranged necessarily becomes Y [RE] or below. That is, calculation of the frequency distance between the frequency resources of PUCCH and both edges or the central frequency of the system band can be omitted.

Embodiment 3

The present embodiment reuses the method in LTE Rel.8 that applies frequency hopping to PUCCH and PUSCH independently of each other according to the resource allocation rule for frequency division multiplexing and transmitting PUSCH and PUCCH. Furthermore, the present embodiment generates a coordinated frequency hopping pair of PUSCH and PUCCH according to the number of subbands included in the system band and resource numbers of frequency resources on which PUCCH is arranged in the first slot.

The number of subbands is set by the base station. The base station sets the number of subbands so that the bandwidth of subbands obtained by dividing the band of the system band to which frequency hopping is applied is, for example, a natural number multiple of an RBG (Resource Block Group) size. Information of the number of subbands set by the base station is included, for example, in frequency hopping indication information (or signaling information of a higher layer (RRC (Radio Resource Control)) and reported to the terminal.

Figure 32:
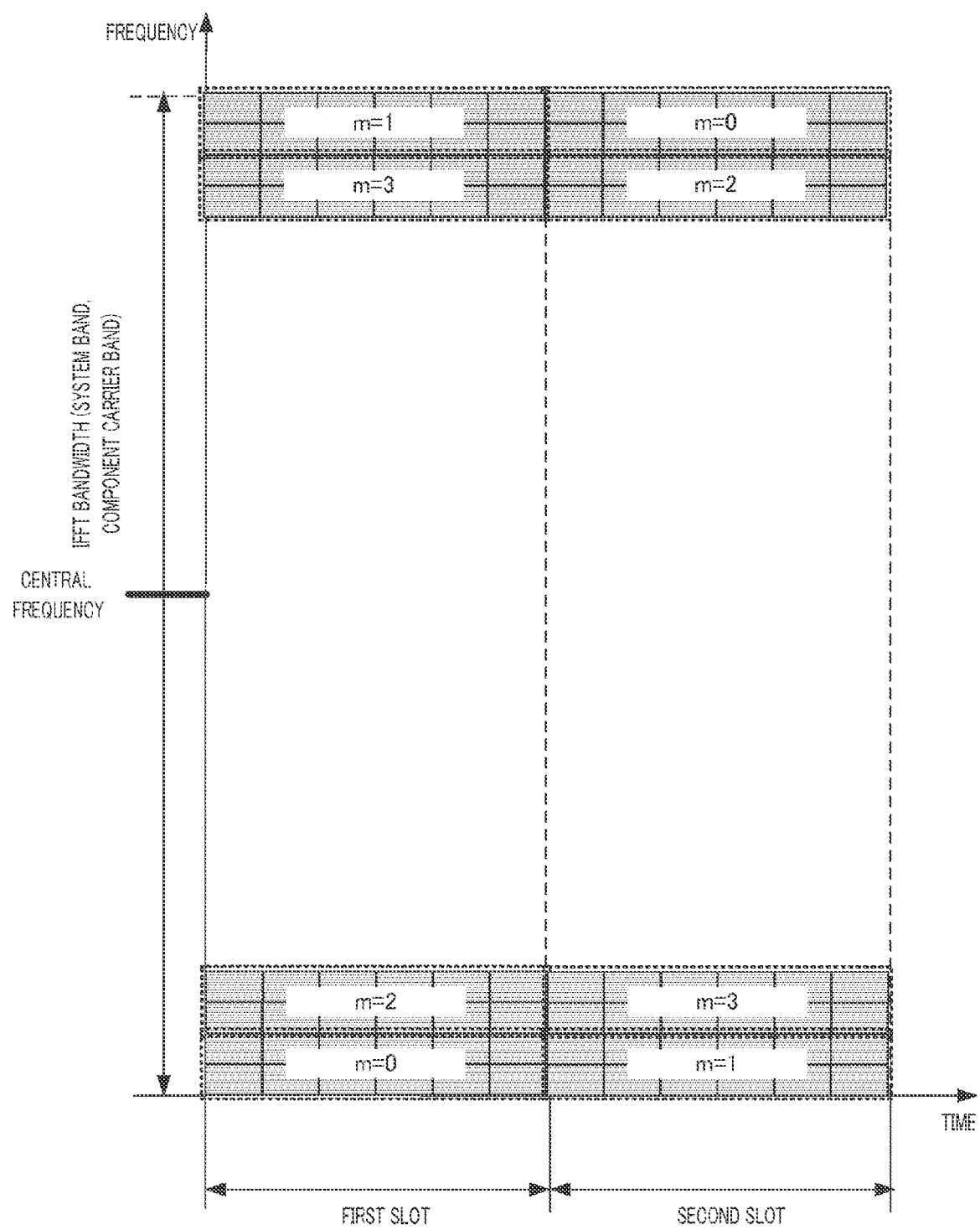
FIG. 32 is a diagram illustrating a correlation between resource number m of a frequency resource in which PUCCH is arranged and the position of a physical channel resource.

Furthermore, there is a correlation as shown in FIG. 32 between resource number m of a frequency resource on which PUCCH is arranged and the position of a physical channel resource (see Non-Patent Literature 3). That is, as shown in FIG. 32, in the first slot, a frequency resource whose resource number m is an even number is associated with a physical channel resource in the lower part of the system band (that is, low frequency side) and a frequency resource whose resource number m is an odd number is associated with a physical channel resource in the upper part of the system band (that is, high frequency side). On the other hand, in the second slot, a frequency resource whose resource number m is an even number is associated with a physical channel resource in the upper part of the system band (that is, high frequency side) and a frequency resource whose resource number m is an odd number is associated with a physical channel resource in the lower part of the system band (that is, low frequency side).

In the present embodiment, PUSCH and PUCCH are caused to perform frequency hopping according to the number of subbands included in the system band and resource number m of each frequency resource on which PUCCH is arranged in the first slot using the correspondence between resource number m and a physical channel resource in each slot.

[Inter-Slot Hopping Pattern #9] (Number of Subbands=1)

Figure 33:
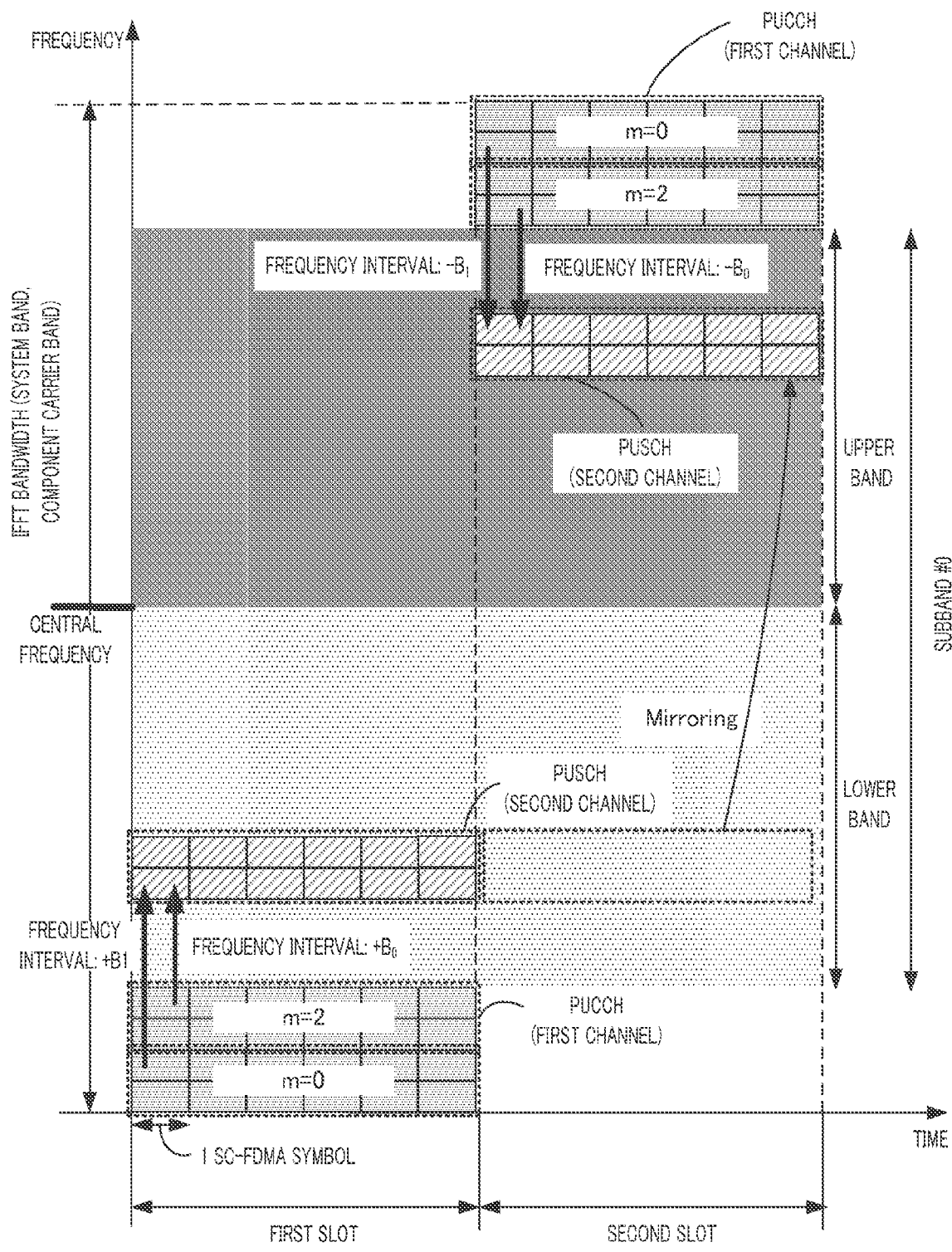
FIG. 33 is a diagram illustrating an example of [inter-slot hopping pattern #9]
Figure 34:
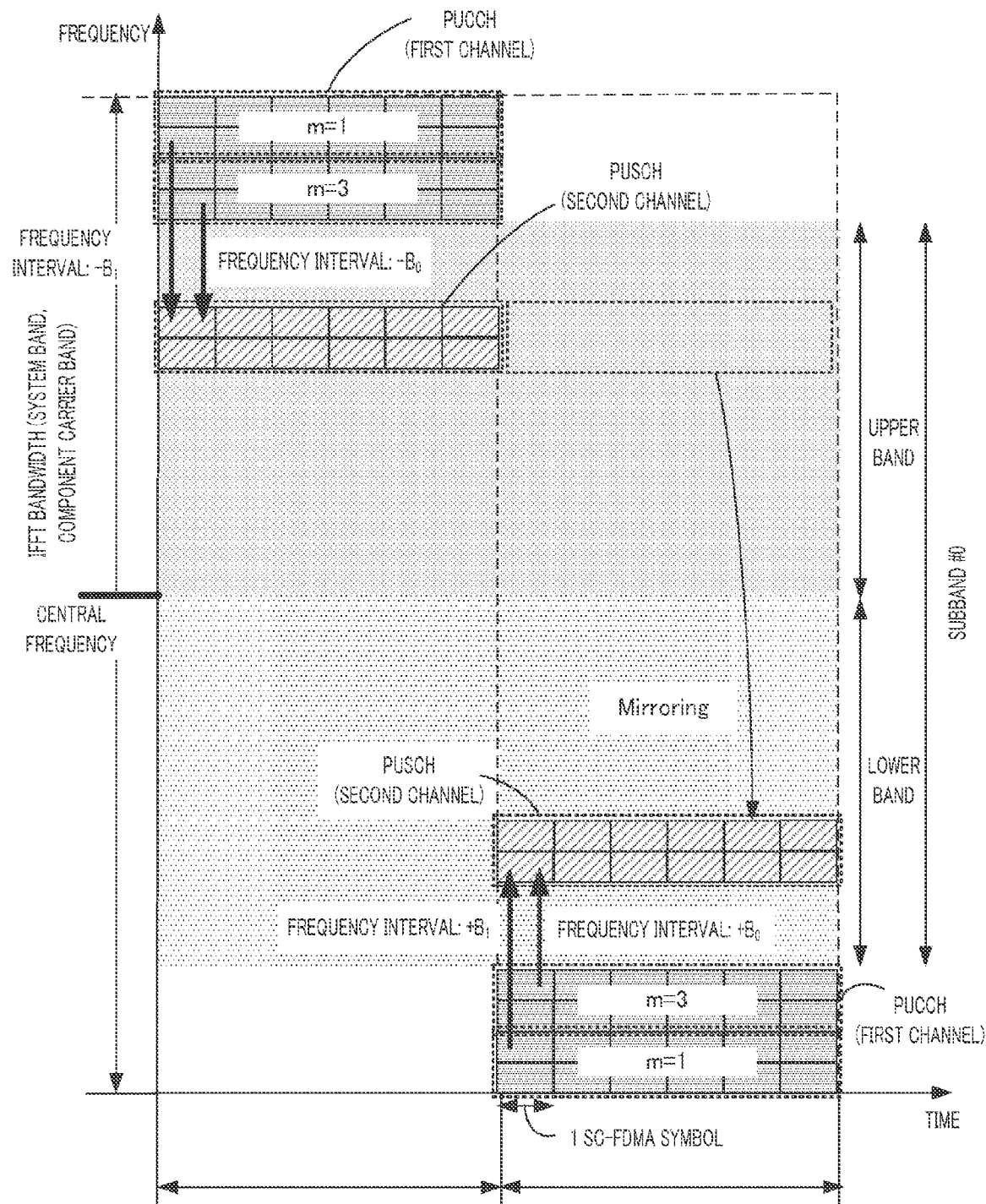
FIG. 34 is a diagram illustrating another example of [inter-slot hopping pattern #9]

FIG. 33 and FIG. 34 show an example of [inter-slot hopping pattern #9]. [Inter-slot hopping pattern #9] is an inter-slot hopping pattern when only one subband is included in the system band (when the number of subbands=1). In [inter-slot hopping pattern #9], PUSCH (second channel) is arranged in the first slot and second slot as follows.

(a) When PUCCH (first channel) is arranged on a frequency resource whose resource number m is an even number in the first slot, PUSCH (second channel) is arranged on a frequency resource in a lower band within the subband in the first slot and PUSCH (second channel) is arranged on a frequency resource in an upper band within the subband in the second slot (see FIG. 33).

(b) When PUCCH (first channel) is arranged on a frequency resource whose resource number m is an odd number in the first slot, PUSCH (second channel) is arranged on a frequency resource in an upper band within the subband in the first slot and PUSCH (second channel) is arranged on a frequency resource in a lower band within the subband in the second slot (see FIG. 34).

That is, in one of the above cases in (a) and (b), PUSCH (second channel) is arranged in the first slot and second slot using mirroring within the subband. Here, "mirroring" refers to an operation of shifting a resource in question to a frequency resource position mirror symmetric with respect to the central frequency within the subband (frequency resource positions whose frequency distances from the central frequency within the subband are the same).

This makes it possible to reduce the influence of out-of-band leakage power while reusing the method used in LTE Rel.8 of causing PUCCH and PUSCH to perform frequency hopping independently of each other, that is, while maintaining backward compatibility with LTE Rel.8.

Figure 35:
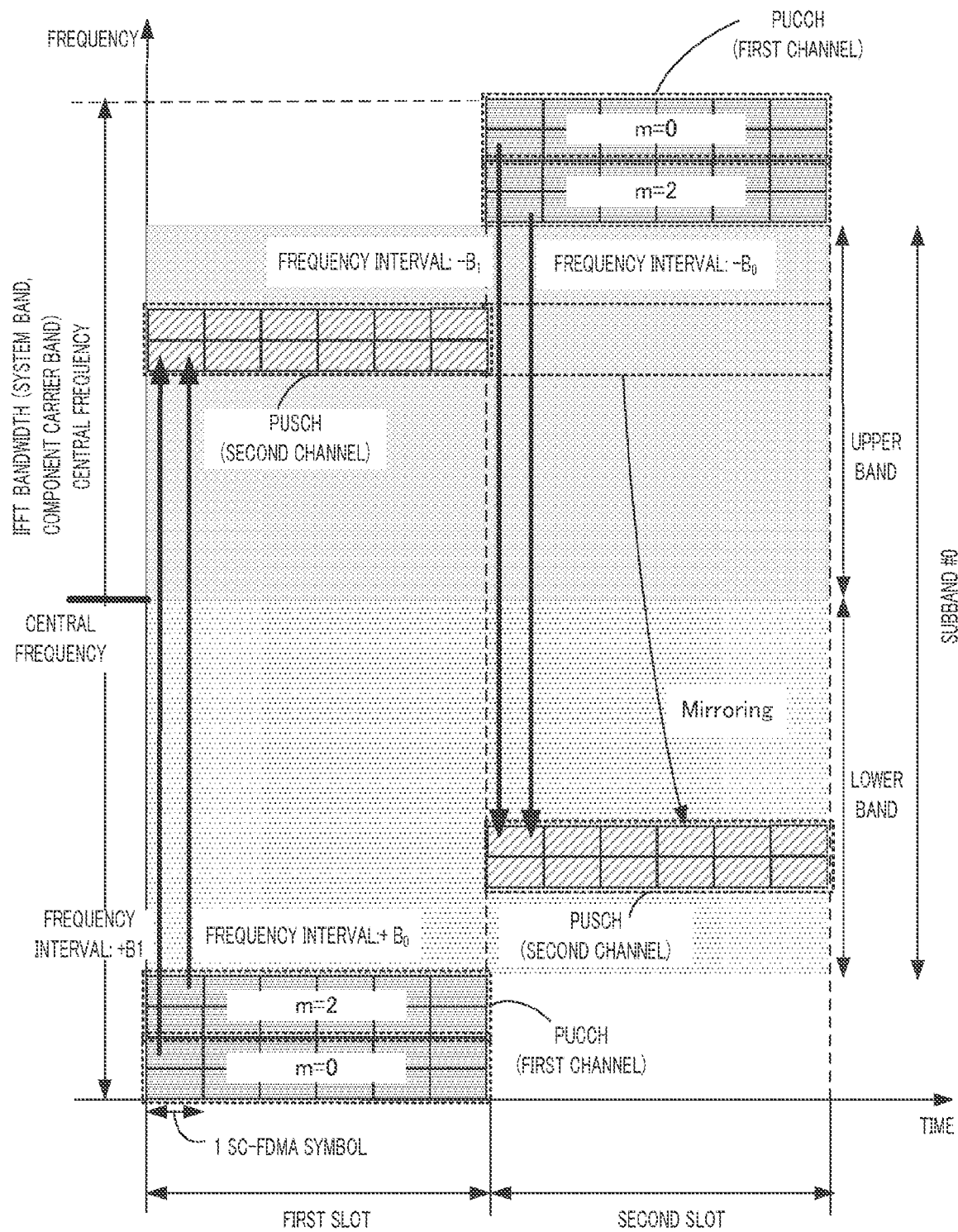
FIG. 35 is a diagram illustrating an example of inter-slot hopping pattern to be compared.

Points to enable out-of-band leakage power to be reduced will be additionally described. The following description will be given taking above-described case in (a) as an example. As a comparison target in (a), suppose a case where when PUCCH is arranged on a frequency resource whose resource number m is an even number in the first slot, PUSCH is arranged on a frequency resource in an "upper" band within the subband in the first slot and arranged on a frequency resource in a "lower" band within the subband in the second slot. FIG. 35 is an arrangement example in the comparison target and PUSCH (second channel) is arranged in the second slot using mirroring within the subband.

When PUCCH is arranged on a frequency resource whose resource number m is an even number in the first slot, the frequency interval between PUSCH and PUCCH is smaller in the case where PUSCH is arranged on a frequency resource in a "lower" band than in the case where PUSCH is arranged on a frequency resource in an "upper" band within the subband in the first slot. On the other hand, when PUCCH is arranged on a frequency resource whose resource number m is an even number in the second slot, the frequency interval between PUSCH and PUCCH is smaller in the case where PUSCH is arranged on a frequency resource in an "upper" band than in the case where PUSCH is arranged on a frequency resource in a "lower" band within the subband in the second slot.

Therefore, in both the first slot and the second slot, the frequency interval can be maintained to be always smaller in (a) than the above comparison target (see FIG. 33 and FIG. 35). As the frequency interval of each channel making up a frequency-division-multiplexed signal becomes smaller, the expanse of inter-modulation distortion can be reduced, and therefore the influence of out-of-band leakage power can be reduced in (a) compared to the comparison target. The same applies to the case in (b).

[Inter-Slot Hopping Pattern #10] (Number of Subbands >1)

Figure 36:
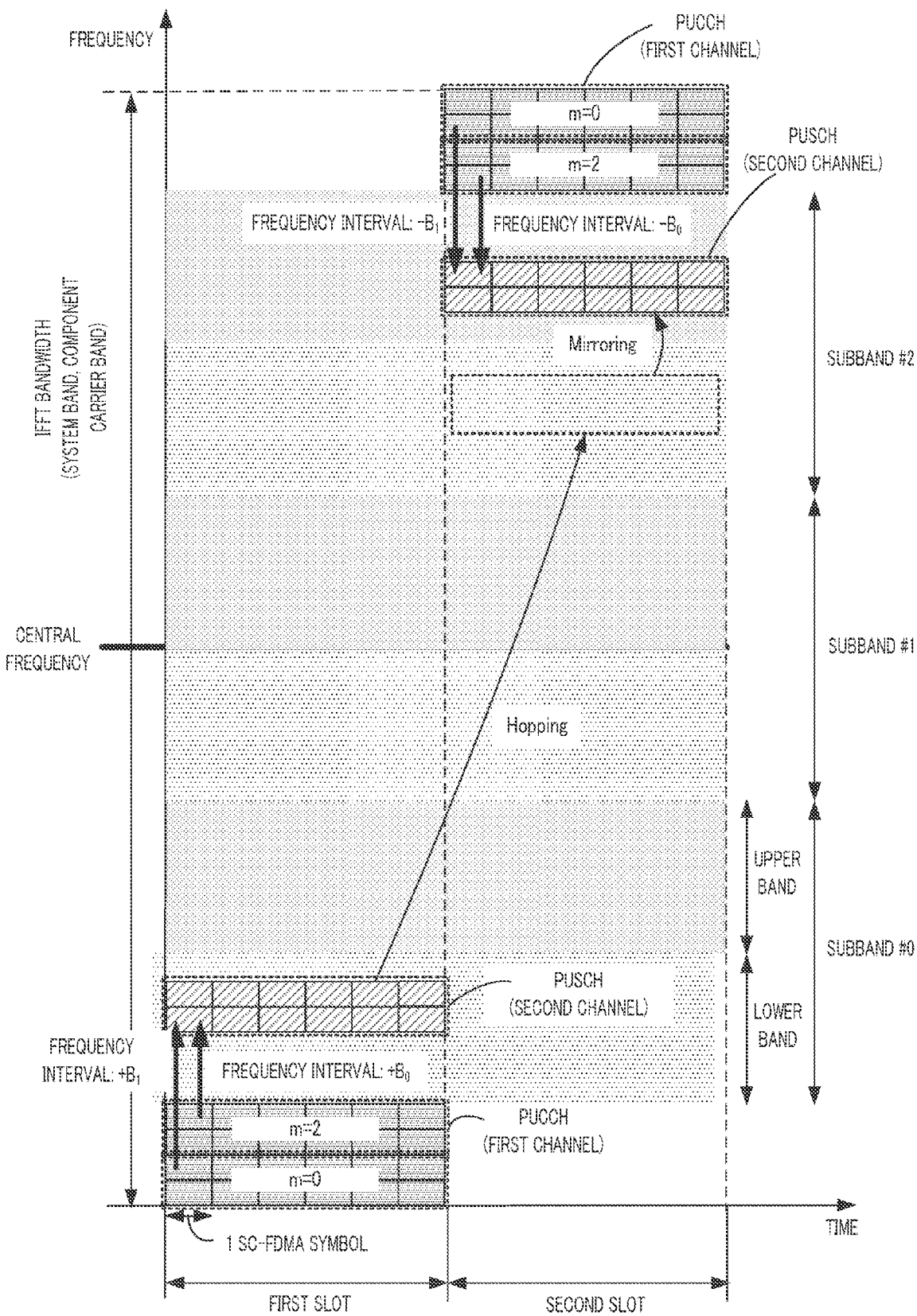
FIG. 36 is a diagram illustrating an example of [inter-slot hopping pattern #10]
Figure 37:
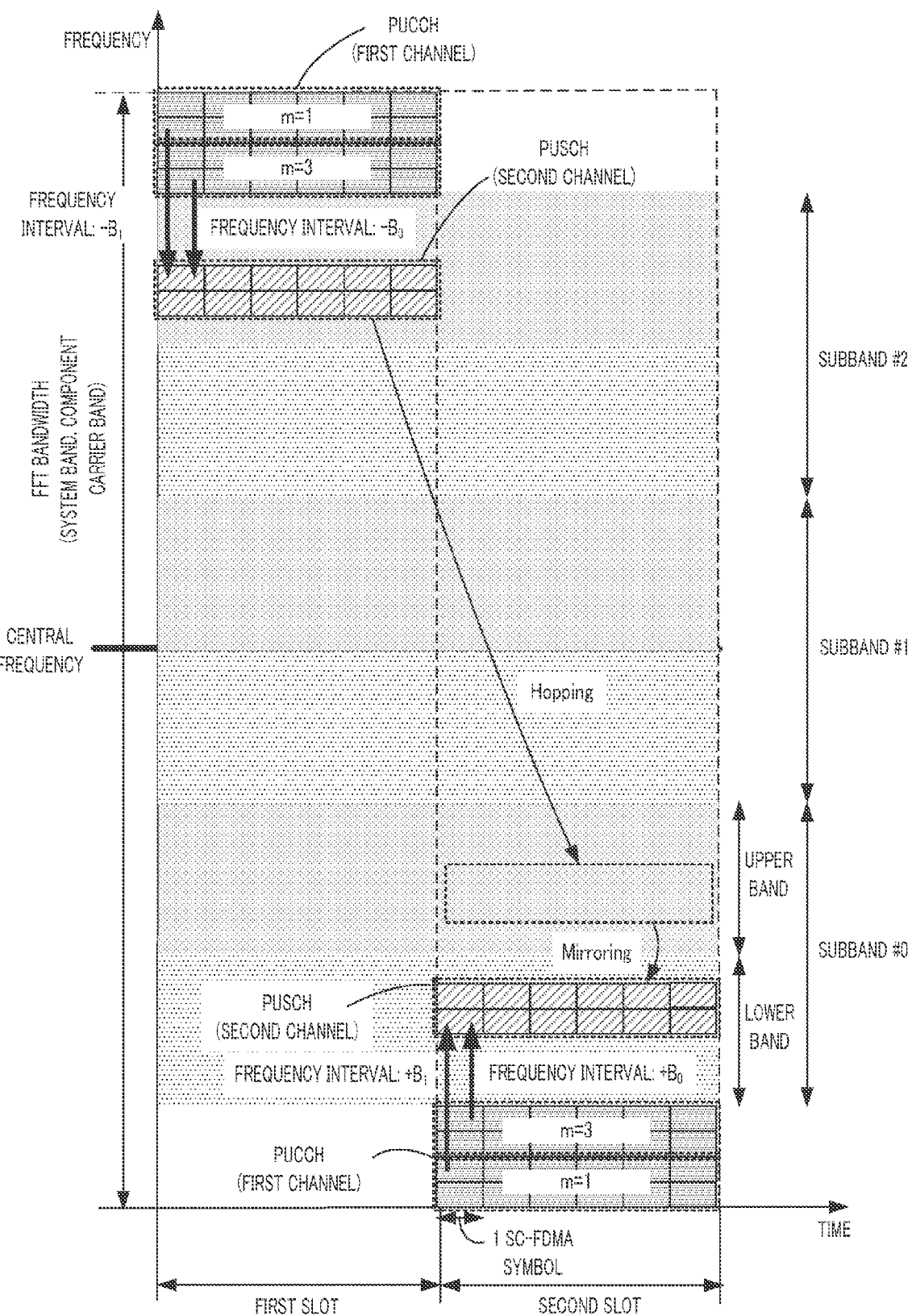
FIG. 37 is a diagram illustrating another example of [inter-slot hopping pattern #10]

FIG. 36 and FIG. 37 show an example of [inter-slot hopping pattern #10]. [Inter-slot hopping pattern #10] is an inter-slot hopping pattern when the number of subbands >1. FIG. 36 and FIG. 37 show examples when the number of subbands=3. In [inter-slot hopping pattern #10], PUSCH (second channel) is arranged in the first slot and second slot as follows.

(a) When PUCCH is arranged on a frequency resource whose resource number m is an even number in the first slot, PUSCH is arranged on a frequency resource in a "lower (that is, low frequency side)" band in each subband in the first slot and arranged on a frequency resource in an "upper (that is, high frequency side)" band in each subband in the second slot (see FIG. 36).

(b) When PUCCH is arranged on a frequency resource whose resource number m is an odd number in the first slot, PUSCH is arranged on a frequency resource in an "upper (that is, high frequency side)" band within each subband in the first slot and arranged on a frequency resource in a "lower (that is, low frequency side)" band within each subband in the second slot (see FIG. 37).

That is, in one of above cases (a) and (b), PUSCH (second channel) is arranged in the first slot and second slot using mirroring within the subband.

Thus, in the case where the number of subbands >1, it is also possible to reduce the influence of out-of-band leakage power as in the case of [inter-slot hopping pattern #9] while reusing the method used in LTE Rel.8 of causing PUCCH and PUSCH to perform frequency hopping independently of each other, that is, while maintaining backward compatibility with LTE Rel.8.

Thus, according to the resource allocation rule in the present embodiment, PUSCH is arranged in the first slot according to resource number m of PUCCH in the first slot using a correlation between resource number m of a frequency resource on which PUCCH is arranged and the position of a physical channel resource. Furthermore, PUSCH is arranged in the second slot using mirroring within the subband as in the case of LTE Rel.8. This makes it possible to maintain the frequency interval between the first channel and second channel between the first slot and second slot while maintaining backward compatibility with LTE Rel.8, and can thereby reduce the influence of out-of-band leakage power.

Embodiment 4

A case has been described in Embodiment 3 where according to the resource allocation rule for frequency division multiplexing and transmitting PUSCH and PUCCH, inter-slot frequency hopping of PUSCH is performed using mirroring while maintaining the frequency interval between the first channel and second channel between slots. The present embodiment will describe a case where inter-slot frequency hopping of PUSCH is performed using a cyclic frequency shift instead of mirroring. In the resource allocation rule for frequency division multiplexing and transmitting PUSCH and PUCCH, the present embodiment will also reuse the method of performing frequency hopping LTE Rel.8 for PUCCH and PUSCH independently of each other as in the case of Embodiment 3.

In LTE Rel.8, PUSCH is made to cyclic frequency shift (wrap-around) within a hopping band (<=system band) and thereby perform inter-slot frequency hopping. On the other hand, PUCCH is made to hop frequency resources associated with resource number m (0, 1, 2, . . . ) defined at both edges of the system band between slots. This results in a problem that it is difficult to simply introduce coordinated frequency hopping for maintaining the frequency interval between a plurality of channels (e.g. PUSCH and PUCCH) to the Rel.8 scheme, which is the feature of the present invention described in Embodiment 1.

Thus, the present embodiment corrects (modifies) the frequency hopping method based on a PUSCH cyclic frequency shift of Rel.8 to address the above-described problem while reusing the frequency hopping method of Rel.8. The present embodiment corrects the amount of cyclic frequency shift of Rel.8 when causing PUSCH to wrap-around (cyclic frequency shift) within the system bandwidth.

To be more specific, a correction term of (system band−hopping band) is introduced and the amount of cyclic frequency shift of PUSCH is defined as equation 5.

[5]

Amount of cyclic frequency shift of PUSCH=(amount of cyclic frequency shift of Rel.8+(system band−hopping band))mod(system band)   (Equation 5)

where, "mod" represents a modulo operation.

Furthermore, when causing PUSCH to wrap-around within the hopping bandwidth, the present embodiment defines the amount of cyclic frequency shift of PUSCH as equation 6.

[6]

Amount of cyclic frequency shift of PUSCH=(hopping band−(PUSCH bandwidth+frequency difference(+B)))mod(hopping band)   (Equation 6)

Figure 38:
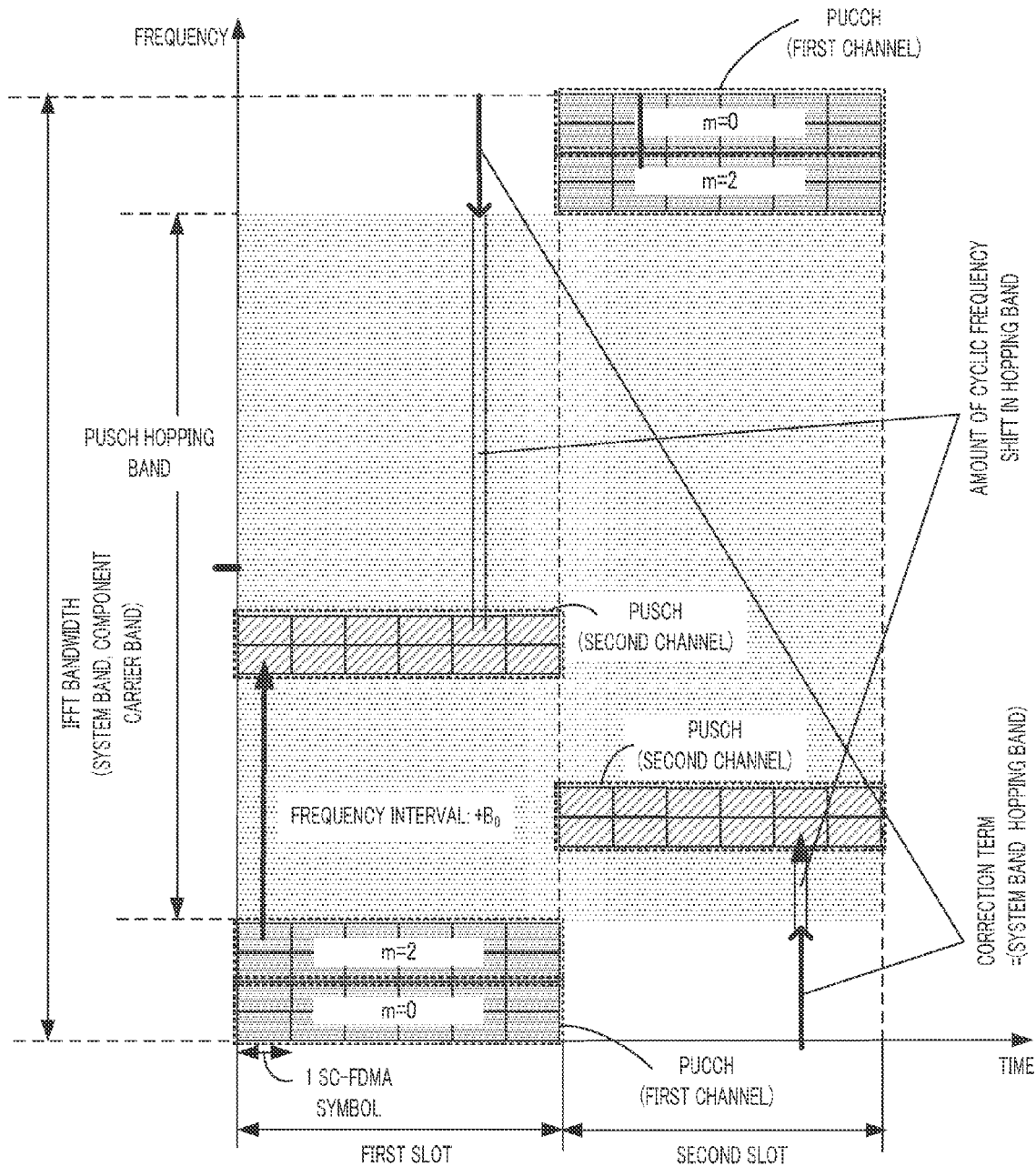
FIG. 38 is a diagram illustrating a correction term and an amount of cyclic frequency shift within a hopping band according to Embodiment 4 of the present invention.

FIG. 38 shows a correction term and an amount of cyclic frequency shift within a hopping band when causing PUSCH to wrap-around (cyclic frequency shift) within the system bandwidth according to the present embodiment.

Thus, according to the resource allocation rule of the present embodiment, a cyclic frequency shift is corrected based on the hopping band in which PUSCH performs frequency hopping. This allows effects similar to those of Embodiment 1 to be obtained by introducing a correction term to the frequency hopping method used in Rel.8 and only applying minor modifications.

Embodiment 5

The present embodiment will describe a case where the resource allocation rule described in the above embodiment is generalized to a case where the number of channels which are frequency-division-multiplexed and transmitted is n.

[Inter-Slot Hopping Pattern #11]

Figure 39:
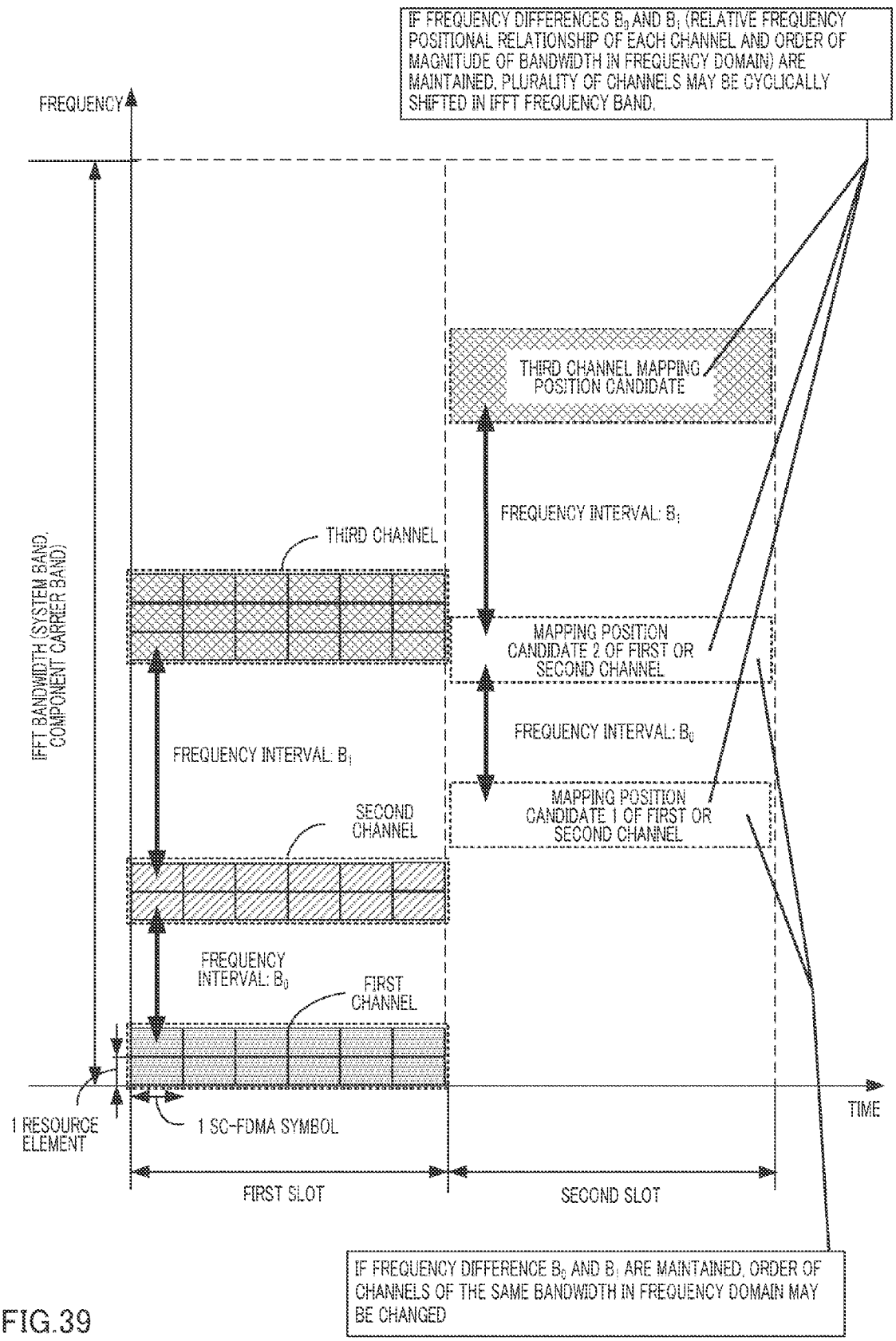
FIG. 39 is a diagram illustrating an example of [inter-slot hopping pattern #11]

FIG. 39 shows an example of [inter-slot hopping pattern #11]. FIG. 39 shows a case where three channels are frequency-division-multiplexed and transmitted. In FIG. 39, a first channel, second channel and third channel are arranged in the first slot in order starting from the component of the lowest frequency. Furthermore, the respective frequency intervals are $B_0$ and $B_1$. Furthermore, the frequency bandwidth of the first channel is the same as that of the second channel.

When three channels are frequency-division-multiplexed and transmitted, FIG. 39 shows candidates of mapping positions of the respective channels in the second slot after frequency hopping. The first channel and second channel having the same frequency bandwidth need only to be mapped at frequency resource positions spaced by frequency interval $B_0$ and the order of the respective channels has no preference. That is, there is a feature that the order of channels having the same frequency bandwidth in the frequency domain can be changed as long as frequency interval $B_0$ between the first channel and second channel is maintained.

Furthermore, a plurality of channels may be cyclically shifted in the IFFT frequency band as long as frequency intervals $B_0$ and $B_1$ (relative frequency positional relationship between channels and order in bandwidth size in the frequency domain) are maintained. This allows the frequency interval of each channel to be maintained between the first slot and second slot and enables effects similar to those of the above embodiments to be obtained.

[Inter-Slot Hopping Pattern #12]

Figure 40:
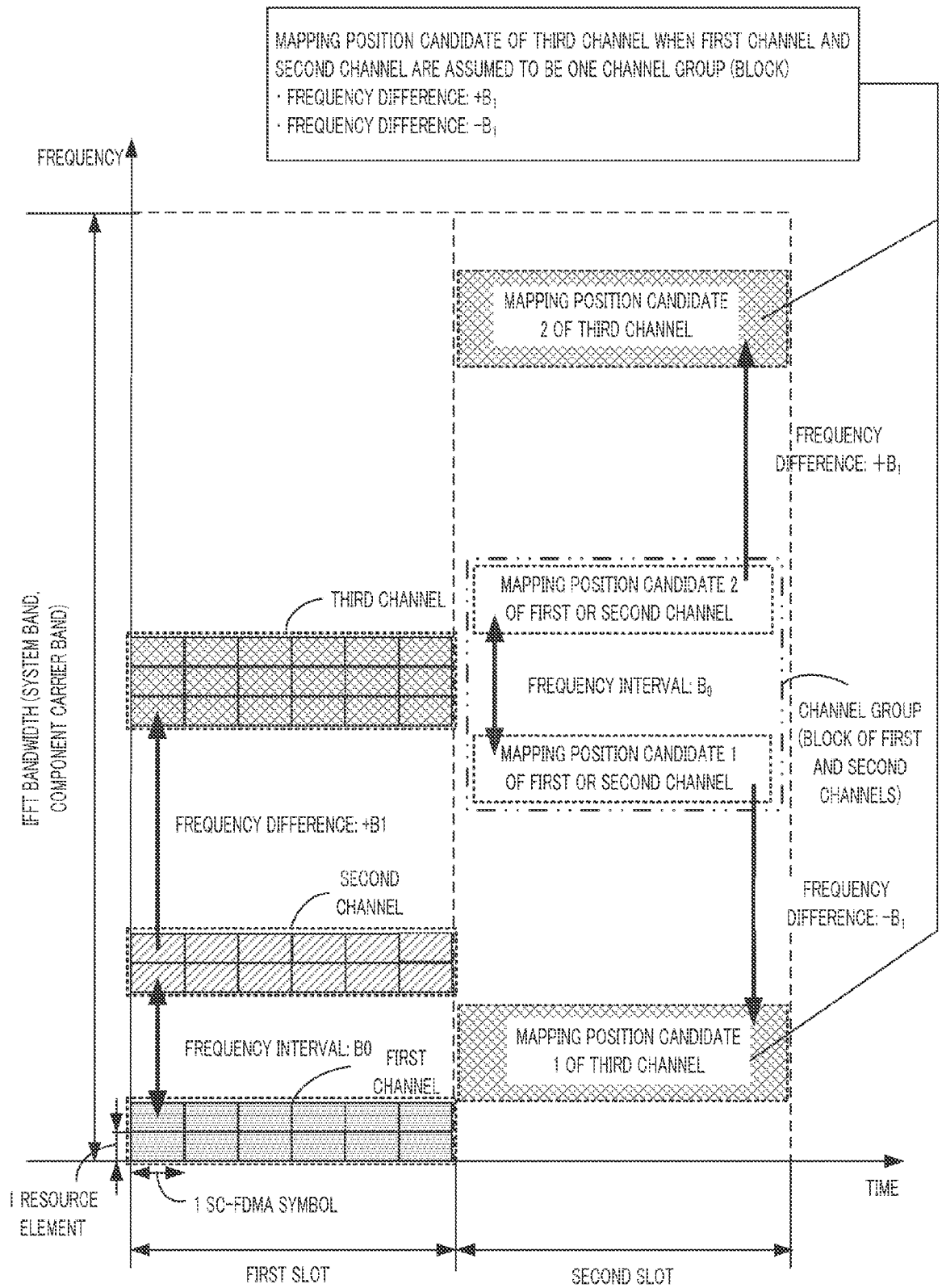
FIG. 40 is a diagram illustrating an example [inter-slot hopping pattern #12]

FIG. 40 shows an example of [inter-slot hopping pattern #12]. FIG. 40 is an example of case where three channels are frequency-division-multiplexed and transmitted as in the case of FIG. 39. The difference in the resource allocation rule based on the pattern shown in FIG. 40 and FIG. 39 is that in [inter-slot hopping pattern #12], the first channel and second channel in the second slot are assumed to be one channel group (block) and two candidates are provided as mapping position candidates of the third channel. That is, a mapping position candidate of the third channel is secured in a frequency resource located frequency difference $+B_1$ or frequency difference $-B_1$ apart from one channel group (block) comprised of the first channel and second channel in the second slot. This makes it possible to maintain the frequency interval between one channel group (block) of the first channel and second channel and the third channel in the first slot and second slot and obtain effects similar to those in the above embodiments.

[Inter-Slot Hopping Pattern #13]

Figure 41:
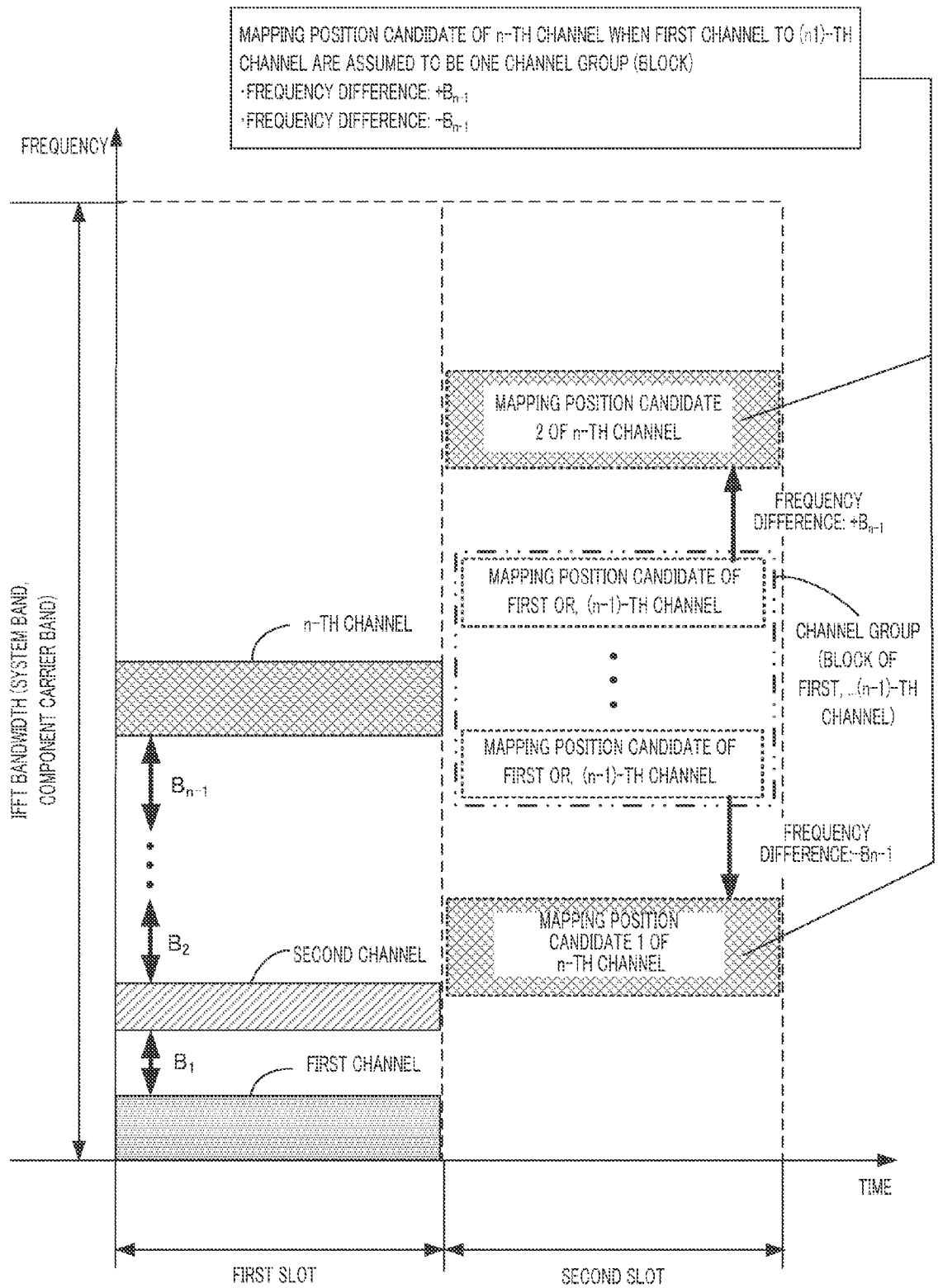
FIG. 41 is a diagram illustrating an example of [inter-slot hopping pattern #13]

FIG. 41 shows an example of [inter-slot hopping pattern #13]. FIG. 41 is an example of case where n channels are frequency-division-multiplexed and transmitted. In FIG. 41, n channels are arranged in order of first channel, second channel, . . . , n-th channel in the first slot starting from the component of the lowest frequency. In [inter-slot hopping pattern #13], a mapping position candidate of the n-th channel is determined from a channel group (block) comprised of first, . . . , to (n−1)-th channels in the second slot after frequency hopping. To be more specific, a mapping position candidate of the n-th channel is secured in a frequency resource located frequency difference $+B_{n-1}$ or frequency difference $-B_{n-1}$ apart from one channel group (block) comprised of first to (n−1)-th channels in the second slot.

Figure 42:
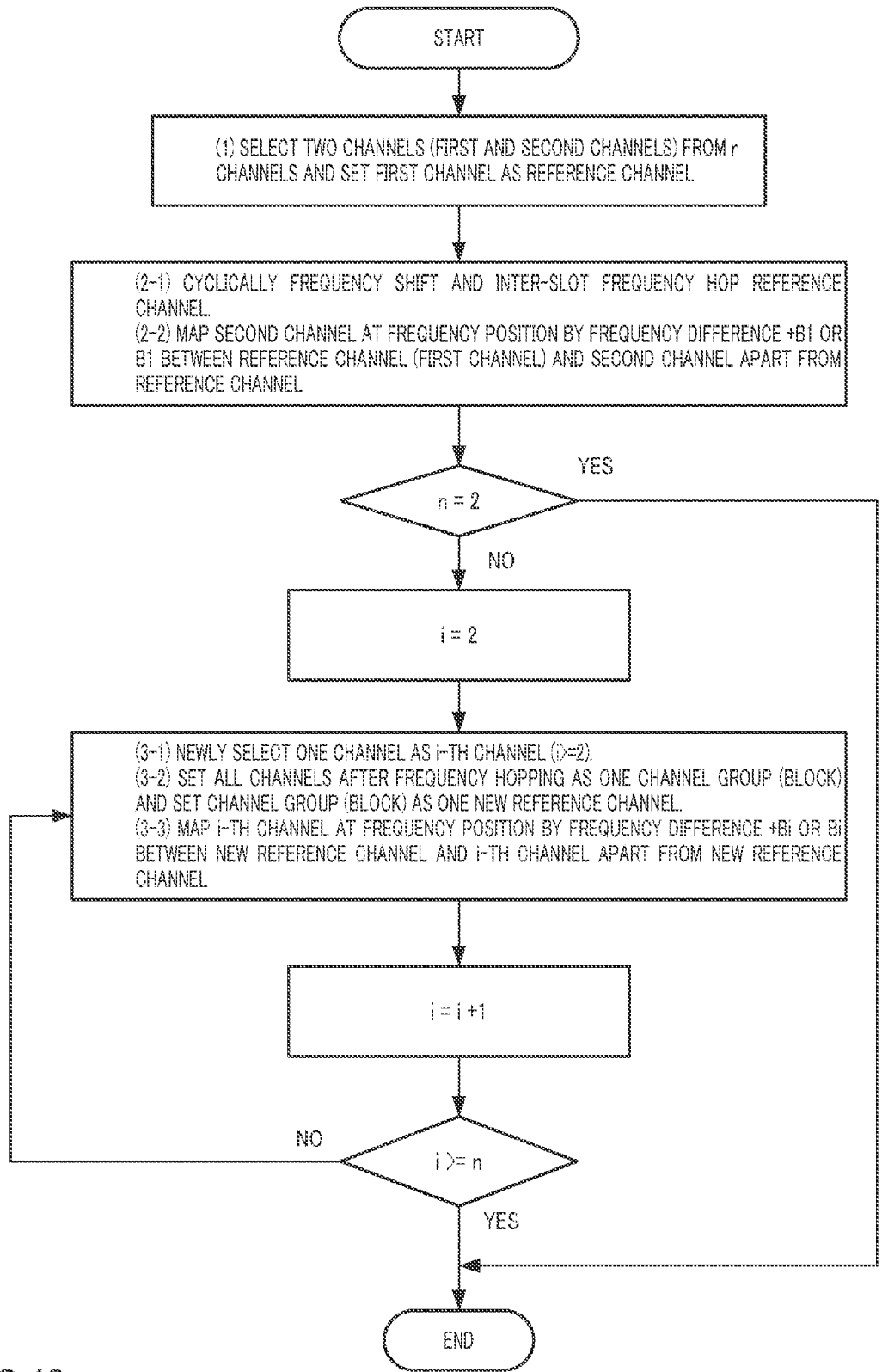
FIG. 42 is a flowchart for realizing inter-slot frequency hopping based on [inter-slot hopping pattern #13]

FIG. 42 is a flowchart for realizing inter-slot frequency hopping based on [inter-slot hopping pattern #13].

(1) Two channels (first and second channels) are selected from among n channels and the first channel is set as a reference channel.

(2-1) The reference channel is cyclically frequency shifted and caused to perform inter-slot frequency hopping.

(2-2) The second channel is mapped at the frequency position by frequency difference $+B_1$ or $-B_1$ between the reference channel and the second channel apart from the reference channel.

(3-1) One channel is newly selected from among n channels as an i-th channel (i>=2).

(3-2) Assuming all channels after frequency hopping as one channel group (block), the channel group (block) is set as one new reference channel.

(3-3) An i-th channel is mapped at a frequency position by frequency difference $+B_i$ or $-B_i$ between the new reference channel and the i-th channel apart from the new reference channel.

Hereinafter, (3-1) to (3-3) will be repeated.

Thus, according to the resource allocation rule of the present embodiment, when a frequency division multiplexing transmission signal is comprised of n (integer of n>2) channels, the frequency interval between channels is also maintained between slots. This makes it possible to perform inter-slot frequency hopping without changing the instantaneous power distribution characteristic of a transmission signal between two slots.

Embodiment 6

A feature of the present embodiment is that frequency differences among a plurality of channels are maintained within the respective component bands and relative interval Δ between the component bands is changed between slots using a plurality of channels within a plurality of simultaneously transmitted component bands as a block.

As a feature of inter-modulation distortion generated when a plurality of channels are simultaneously transmitted, frequency positions where inter-modulation distortion occurs depend on a frequency difference between simultaneously transmitted channels. That is, when the difference between two channel frequencies is B, inter-modulation distortion occurs at a frequency position at a frequency distance corresponding to a multiple of B from a frequency position of one channel of a plurality of simultaneously transmitted channels.

[Inter-Slot Hopping Pattern #14]

Taking advantage of the above-described features, a switchover is made between following two frequency hopping patterns 1 and 2 to be used between component bands (CC). For example, during intra-band continuous carrier aggregation, a switchover is made between frequency hopping patterns for each component band.

Hopping pattern 1: When the frequency difference is +(−)B in the first slot, suppose the frequency difference is +(−)B in the second slot.

Hopping pattern 2: When the frequency difference is +(−)B in the first slot, suppose the frequency difference is −(+)B in the second slot.

This causes inter-modulation distortion whose order differs from one slot to another to be received, and can thereby randomize interference due to inter-modulation distortion that occurs between different component bands.

Figure 43:
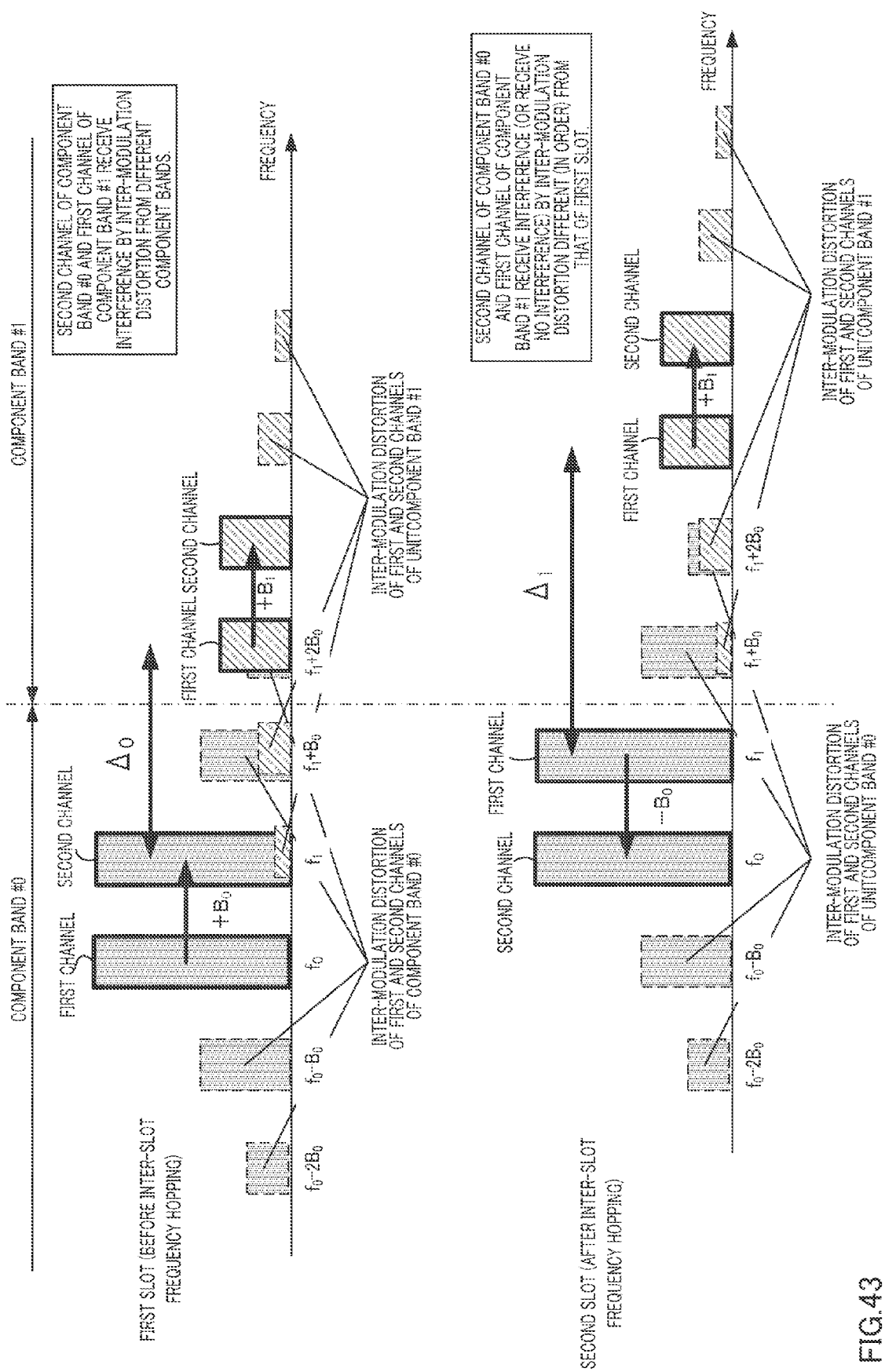
FIG. 43 is a diagram illustrating an example of [inter-slot hopping pattern #14]

FIG. 43 shows an example of [inter-slot hopping pattern #14]. FIG. 43 shows an example of case where four channels are simultaneously transmitted using two component bands (#0, #1) (two channels are transmitted in each component band).

In the first slot before frequency hopping, the frequency difference between two channels (first channel and second channel) in component band #0 is $+B_0$ and the frequency difference between two channels (first channel and second channel) in component band #1 is $+B_1$. Furthermore, a relative frequency interval between the two channels of component band #0 and the two channels of component band #1 is $\Delta_0$. In this case, the inter-modulation distortion of component band #0 (#1) matches the frequency position of at least one channel of the simultaneously transmitted channels of component band #1 (#0). For example, frequency positions $f_1$ and $f_1+2B_0$ correspond to that case. That is, a case is indicated where both component bands receive interference caused by inter-modulation distortion from different component bands.

In the second slot after the frequency hopping, the frequency difference between the two channels of component band #0 is $-B_0$ and the frequency difference between the two channels of component band #1 is $+B_1$. Furthermore, a relative frequency interval between the two channels of component band #0 and the two channels of component band #1 is $\Delta_1$ ($\neq \Delta_0$). In this case, since $\Delta_1 \neq \Delta_0$, the plurality of respective simultaneously transmitted channels of component band #0 and component band #1 receive different (order) inter-modulation distortion (from different component bands) from that of the case with the first slot. That is, it is possible to realize randomization of interference due to inter-modulation distortion simultaneously transmitted between the first slot and second slot.

A case has been described in the above embodiments where the frequency difference between the first channel and second channel of component band #0 and the frequency difference between the first channel and second channel of component band #1 have a relationship of $B_0 \neq B_1$, but the frequency differences may be set to the same value ($B_0 = B_1$).

As one method of maintaining the frequency difference between a plurality of channels within each component band and changing relative interval Δ between component bands by assuming a plurality of simultaneously transmitted component bands as a block in the above-described embodiments, the amounts of cyclic frequency shift of the plurality of channels within each component band may be set to the same value and set to different values between the component bands.

In the above-described embodiments, the above-described embodiment may be applied to only a case where at least one channel exists in the frequency bands at both edges Y [RE] of each component band. This causes inter-modulation distortion of different orders to be received at both edges of the system between the slots, which allows randomization of interference. Furthermore, in the vicinity of the central part of the system band where the influence of inter-modulation distortion is small, it is possible to keep a scheduling effect accompanying flexible frequency allocation.

Embodiment 7

A feature of the present embodiment is that a first channel and second channel after frequency hopping are mapped, in a second slot after the frequency hopping, to frequency resources other than a multiple of absolute value B of a frequency difference in a first slot.

As in the case of Embodiment 6, as a feature of inter-modulation distortion which occurs when a plurality of channels are simultaneously transmitted, the present embodiment takes advantage of the fact that the frequency position where inter-modulation distortion occurs depends on the frequency difference between simultaneously transmitted channels.

This makes it possible to change an interfered terminal (UE) due to inter-modulation distortion between slots (it is possible to reduce the probability of receiving large inter-modulation distortion interference from a specific terminal (UE) for two consecutive slots as viewed from the interfered terminal (UE)).

[Inter-Slot Hopping Pattern #15]

Figure 44:
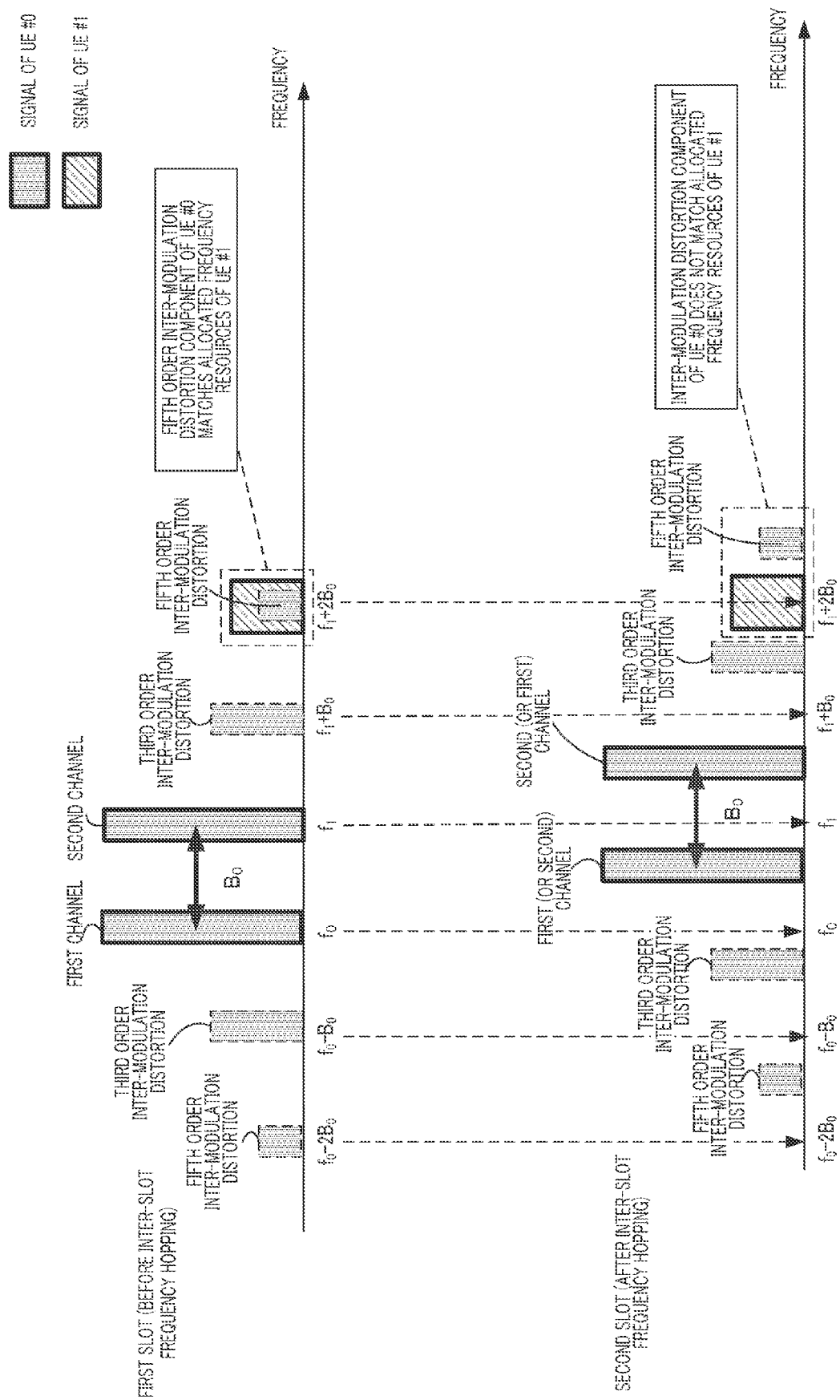
FIG. 44 is a diagram illustrating an example of [inter-slot hopping pattern #15].

FIG. 44 shows an example of [inter-slot hopping pattern #15] (case with two terminals (UE)). FIG. 44 shows a case where in the first slot (before inter-slot frequency hopping), UE #0 simultaneously transmits a first channel (frequency position: $f_0$) and second channel (frequency position: $f_1$) with frequency interval $B_0$ and UE #1 transmits one channel allocated to frequency position $f_0+2B_0$. Therefore, fifth order and third order inter-modulation distortion components of UE #0 are generated at frequency positions of $f_0-2B_0$ ($f_1+2B_0$) and $f_0-B_0$ ($f_1+B_0$) respectively. That is, in the first slot, UE #0 gives UE #1 interference due to inter-modulation distortion at frequency position $f_0+2B_0$.

In the second slot (after inter-slot frequency hopping), UE #0 simultaneously transmits two channels from any positions other than frequency positions of a plurality of channels simultaneously transmitted of UE #0 in the first slot and from any positions other than a frequency position at a frequency distance corresponding to a multiple of frequency interval $B_0$ from the frequency position of one channel of the plurality of channels in the first slot, while maintaining frequency interval $B_0$ between the first channel and second channel. In FIG. 44, the signal of UE #0 is transmitted by being mapped to a band at other than frequency resource positions of $f_0-2B_0$, $f_0-B_0$, $f_0$, $f_1$, $f_1+B_0$ and $f_1+2B_0$ in the second slot.

This makes it possible to change an interfered UE due to inter-slot inter-modulation distortion (it is possible to reduce the probability of receiving large inter-modulation distortion interference from a specific UE for two consecutive slots as seen from the interfered UE). The above-described embodiment may be applicable to one of a channel having a bandwidth of linear spectrum and a channel having a certain band.

Although the above-described embodiments have not referred to frequency resource allocation units of PUCCH and PUSCH which are (first, second, . . . ) channels that transmit a control signal and data signal, frequency resources may be allocated in a unit called "resource block (RB)" making up one allocation unit to perform inter-slot frequency hopping by bundling a plurality of resource elements (RE: Resource Elements, subcarriers, tones) as an allocation unit. Furthermore, by bundling a plurality of REs, frequency resources may be allocated in a unit called "resources block group (RBG)" making up one allocation unit to perform inter-slot frequency hopping. Furthermore, one resource element (subcarrier, tone, bin) may be configured as an allocation unit and frequency resources may be allocated to perform inter-slot frequency hopping.

Although all the above-described embodiments have described only inter-slot frequency hopping between slots in a subframe, when frequency hopping is performed between subframes, frequency hopping patterns (frequency difference B between a plurality of channels between subframes, amount of cyclic frequency shift between a plurality of channel slots and cyclic frequency shift direction) may differ between the subframes irrespective of whether or not inter-slot frequency hopping is applied.

Furthermore, a case has been described in all the above-described embodiments where signals spread in a DFT matrix and CAZAC sequence are frequency-division-multiplexed, but the present invention is also applicable to a configuration in which unspread signals are frequency-division-multiplexed, for example, frequency division multiplexing transmission in OFDM transmission. By applying the present invention to OFDM transmission, it is possible to suppress inter-slot changes in instantaneous power distribution characteristic (e.g. CCDF characteristic of PAPR) of a time waveform of an OFDM transmission signal.

Furthermore, a case has been described in all the above-described embodiments where frequency hopping is performed between slots, but the time unit for performing frequency hopping may have a length other than the slot length (time unit longer than the slot length ((sub)frame length or the like), shorter time unit (1 SC-FDMA symbol length)). For example, a plurality of channels may be caused to perform frequency hopping based on the above-described method within a subframe or between subframes (intra-subframe and inter-subframe frequency hopping). This makes it possible to obtain effects similar to those described above for periods during which a frequency difference between a plurality of channels is maintained in frequency hopping in that time unit.

Figure 24:
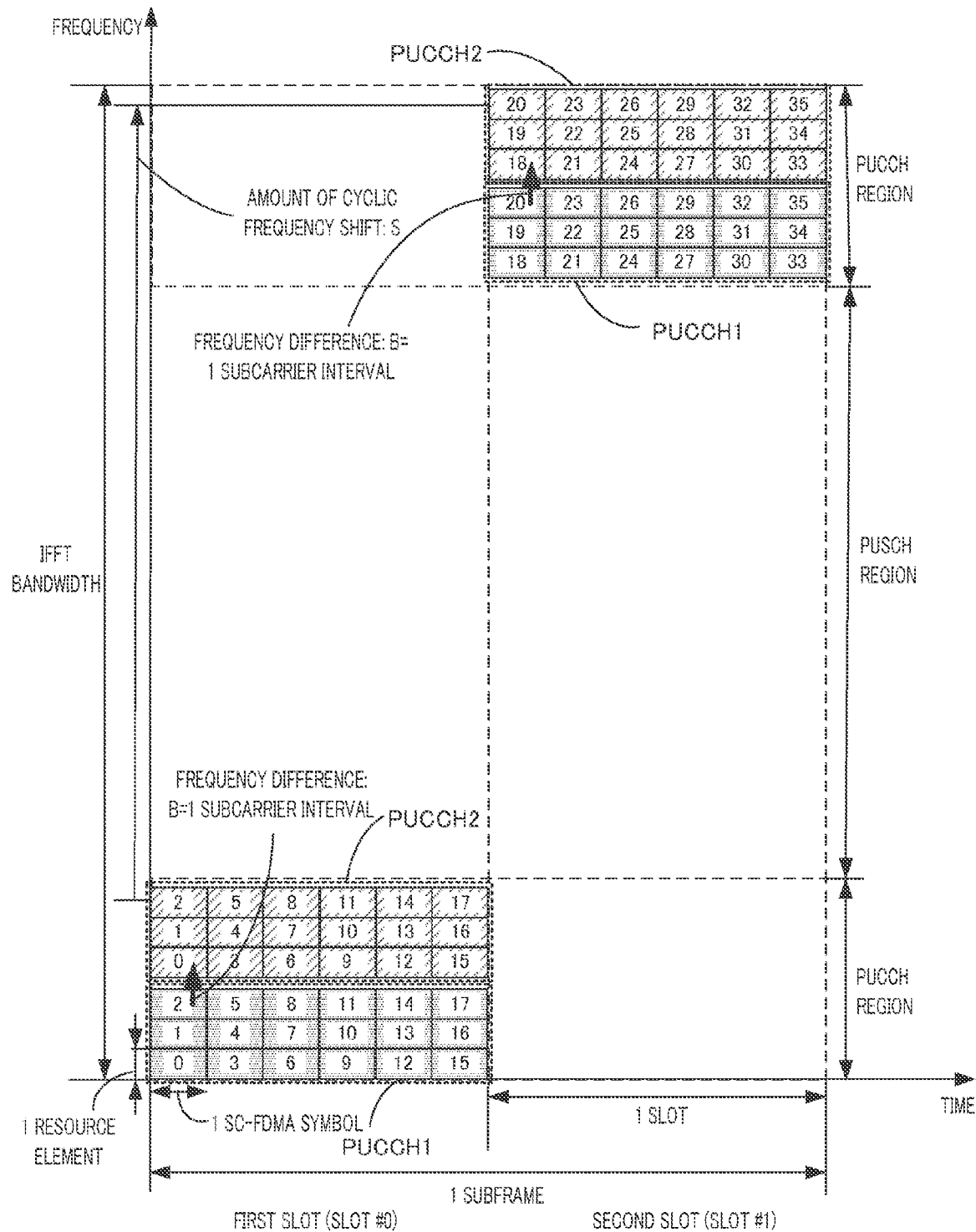
FIG. 24 is a diagram illustrating an example of an inter-slot frequency hopping pattern when a plurality of channels are mapped to continuous frequency resources.

Furthermore, a case has been described in all the above-described embodiments where a plurality of channels are mapped to discontinuous frequency resources, but a plurality of channel may also be mapped to continuous frequency resources. That is, a case with frequency difference B=1 subcarrier (resource element) interval is equivalent to a case where a plurality of different channels are mapped to continuous neighboring frequency resources (block). Inter-slot frequency hopping may be performed, for example, as shown in FIG. 24, by mapping PUCCH 1 of the first channel and PUCCH 2 of the second channel to neighboring frequency resources in the PUCCH region in the first-half slot and cyclically frequency shifting PUCCH 1 and PUCCH 2 within the IFFT bandwidth while maintaining a frequency difference B=1 subcarrier (resource element) interval between PUCCH 1 and PUCCH 2.

In all the above-described embodiments, in a case where for a time period during which a plurality of channels making up frequency division multiplexing transmission are transmitted, if the channels are transmitted in a predetermined transmission format, a certain modulation scheme (e.g. QPSK, QAM modulation) or (and) a certain transmission power (density) value may be maintained for the time period.

In all the above-described embodiments, as a method of maintaining a frequency difference between the plurality of channels making up frequency division multiplexing transmission, there may be a case where a frequency hopping pattern of each channel is determined based on a certain sequence such as a PN sequence and random sequence or a case where parameters for generating the sequence are determined by a cell ID, frame number, subframe number or the like. In such cases, in order that a plurality of channels may have the same sequence, the same hopping sequence corresponding to the respective channels or (and) the same parameter for generating the sequence may be set.

A case has been described in all the above-described embodiments where a frequency-division-multiplexed signal is transmitted from one transmitting antenna, but in a case where MIMO (Multi-Input Multi-Output) transmission with a plurality of antennas is performed, each frequency-division-multiplexed channel may be multiplied by an identical (time-invariant) linear spatial precoding matrix for a time period spanning over two slots. That is, the same matrix may be used for the precoding matrix by which each channel is multiplied in the first slot before frequency hopping and the precoding matrix by which each channel is multiplied in the second slot after frequency hopping. This makes it possible to obtain effects similar to those described above.

Furthermore, a case has been described in all the above-described embodiments where a CAZAC sequence or DFT sequence is used to spread PUCCH or PUSCH as the spreading method, but the spreading method is not limited to such sequences. For example, other sequences such as Walsh-Hadamard sequence, Gold sequence, PN sequence may also be used for spreading. This also makes it possible to obtain effects similar to those described above.

Furthermore, a case has been described in all the above-described embodiments where Acknowledgment (ACK), Non-Acknowledgment (NACK), Scheduling Request (SR), Channel Quality Indicator (CQI), Channel State Information (CSI) or the like is individually mapped as control information to be mapped to PUCCH, but the present invention is not limited to this. The present invention is also applicable to a configuration in which at least two pieces of control information of ACK (or NACK), SR, CQI, CSI or the like are mapped to one PUCCH resource. This also makes it possible to obtain effects similar to those described above.

Furthermore, data information has been described as information to be mapped to PUSCH in all the above-described embodiments, but without being limited to the configuration, data information and control information (ACK, NACK, SR, CQI, CSI or the like) may be mapped to one PUSCH. This also makes it possible to obtain effects similar to those described above.

Furthermore, in the above-described embodiments, when a plurality of PUCCHs in a plurality of component bands are inter-slot frequency hopped during carrier aggregation using two or more component bands (CC: component carriers), hopping may be performed with the amount of cyclic shift (CS) of the CAZAC sequence of PUCCH in each component band, which is spread using a CAZAC sequence, differing from one component band to another or being fixed to the same value. This makes it possible to obtain effects similar to those described above.

Furthermore, a configuration has been described in the above-described embodiments in which control information related to inter-slot frequency hopping ((reserved) resource allocation, amount of cyclic shift of frequency hopping, hopping pattern or the like) is reported via a control channel (e.g. PDCCH) of the physical layer, but the present invention is not limited to this. For example, the control information may also be reported using a reporting method for control information of a higher layer such as UE common signaling of RRC (Radio Resource Control) and UE-specific signaling. Furthermore, the control information may also be reported with system information (SI) using a broadcast channel (BCH). This makes it possible to obtain effects similar to those described above.

Furthermore, a case has been described in the above-described embodiments where one IDFT (or IFFT) is used, but the present invention is also applicable to a case with two or more IDFTs (or IFFTs). In that case, the frequency interval (frequency difference) between a plurality of channels may differ within a different IDFT (or each IFFT) band if inter-slot frequency hopping is performed which maintains the frequency interval (frequency difference) between the plurality of channels within each IDFT (or each IFFT) band. When, for example, inter-slot frequency hopping is used which maintains frequency difference $B_1$ between two channels within IDFT of component band #1, inter-slot frequency hopping may also be performed which maintains frequency difference $B_2$ ($\neq B_1$) between two channels within IDFT of component band #2.

However, the amount of cyclic frequency shift between two channels in IDFT of component band #1 is preferably the same value as the amount of cyclic frequency shift between two channels in IDFT of component band #2. Thus, when a plurality of channels are simultaneously transmitted in a plurality of component bands (e.g. when four channels (two channels in each component band) are simultaneously transmitted in two component bands), effects similar to those described above can be obtained in the component band as a whole.

The above-described embodiments have been described as an antenna, but the present invention is equally applicable to an antenna port.

The "antenna port" refers to a logical antenna comprised of one or a plurality of physical antennas. That is, the antenna port does not always refer to one physical antenna but may refer to an array antenna or the like comprised of a plurality of antennas.

For example, 3GPP LTE does not specify of how many physical antennas an antenna port is composed but specifies the antenna port as a minimum unit whereby a base station can transmit different reference signals.

The antenna port may also be defined as a minimum unit for multiplying a precoding vector by a weight.

Furthermore, although cases have been described with the embodiments above where the present invention is configured by hardware, the present invention may be implemented by software.

Each function block employed in the description of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2009-131255, filed on May 29, 2009, and Japanese Patent Application No. 2010-105329, filed on Apr. 30, 2010, including the specifications, drawings and abstracts, are incorporated herein by reference in their entirety.

INDUSTRIAL APPLICABILITY

The radio communication apparatus and frequency hopping method according to the present invention are suitable for use in a radio communication apparatus or the like that frequency-division-multiplexes and transmits a plurality of channels.

REFERENCE SIGNS LIST

100 Base station
101, 201 Transmitting/receiving antenna port
102, 202 Radio reception processing section
103 SC-FDMA signal demodulation section
104, 204 Demodulation section
105, 205 Channel decoding section
106 Quality measuring section
107 Frequency hopping control section
108 Scheduling section
109 Control information generation section
110-1, 110-2, 208-1, 208-2 Channel coding section
111-1, 111-2, 209-1, 209-2 Modulation section
112 OFDM signal modulation section
113, 215 Radio transmission processing section
200, 200A terminal
203 OFDM signal demodulation section
206 Control information extraction section
207 Control section
210 DFT section
211 Spreading section
212 Mapping section
213 IFFT section
214 CP insertion section
216 Spectrum division section

The invention claimed is:

1. An integrated circuit to control a process performed at a terminal apparatus configured with a plurality of downlink component carriers, the process comprising:
receiving downlink control information for each of the plurality of downlink component carriers; and
transmitting a signal on a frequency resource, the frequency resource including a first frequency resource and a second frequency resource of an uplink channel and being determined from resource information included in the downlink control information, with a frequency hopping between the first frequency resource in a first slot and the second frequency resource in a second slot within a subframe,
wherein a frequency hopping interval between the first frequency resource and the second frequency resource that are determined from the resource information included in the downlink control information for one of the plurality of downlink component carriers is the same as that for another one of the plurality of downlink component carriers.

2. The integrated circuit according to claim 1, comprising:
circuitry which, in operation, controls the process;
at least one input coupled to the circuitry, wherein the at least one input, in operation, receives the downlink control information; and
at least one output coupled to the circuitry, wherein the at least one output, in operation, outputs the signal to be transmitted.

3. The integrated circuit according to claim 2, wherein the frequency hopping interval is common among the downlink control information for all of the plurality of downlink component carriers, with which the terminal apparatus is configured.

4. The integrated circuit according to claim 2, wherein the downlink control information for the plurality of downlink component carriers, with which the terminal apparatus is configured, is transmitted from a base station at the same time.

5. The integrated circuit according to claim 2, wherein the downlink control information for the plurality of downlink component carriers, with which the terminal apparatus is configured, is transmitted from a base station at different times.

6. The integrated circuit according to claim 2, wherein the frequency resource is notified in advance by UE-specific signaling in a radio resource control (RRC).

7. The integrated circuit according to claim 2, wherein the frequency hopping interval between the first frequency resource and the second frequency resource is determined from the resource information.

8. The integrated circuit according to claim 2, wherein the uplink channel is an uplink control channel, and uplink control information is transmitted as the signal.

9. The integrated circuit according to claim 2, wherein the at least one output, in operation, is coupled to an antenna of the terminal apparatus.

10. An integrated circuit to control a process performed at a base station communicating with a terminal configured with a plurality of downlink component carriers, the process comprising:
transmitting, to the terminal, downlink control information for each of the plurality of downlink component carriers; and
receiving a signal that is transmitted from the terminal on a frequency resource, the frequency resource including a first frequency resource and a second frequency resource of an uplink channel and being determined from resource information included in the downlink control information, with a frequency hopping between the first frequency resource in a first slot and the second frequency resource in a second slot within a subframe,
wherein a frequency hopping interval between the first frequency resource and the second frequency resource that are determined from the resource information included in the downlink control information for one of the plurality of downlink component carriers is the same as that for another one of the plurality of downlink component carriers.

11. The integrated circuit according to claim 10, comprising:
circuitry which, in operation, controls the process;
at least one output coupled to the circuitry, wherein the at least one output, in operation, outputs the downlink control information to be transmitted; and
at least one input coupled to the circuitry, wherein the at least one input, in operation, receives the signal.

12. The integrated circuit according to claim 11, wherein the frequency hopping interval is common among the downlink control information for all of the plurality of component carriers, with which the terminal apparatus is configured.

13. The integrated circuit according to claim 11, wherein the downlink control information for the plurality of downlink component carriers, with which the terminal apparatus is configured, is transmitted at the same time.

14. The integrated circuit according to claim 11, wherein the downlink control information for the plurality of downlink component carriers, with which the terminal apparatus is configured, is transmitted at different times.

15. The integrated circuit according to claim 11, wherein UE-specific signaling in a radio resource control (RRC) notifies the frequency resource in advance.

16. The integrated circuit according to claim 11, wherein the resource information determines the frequency hopping interval between the first frequency resource and the second frequency resource.

17. The integrated circuit according to claim 11, wherein the uplink channel is an uplink control channel, and uplink control information is received as the signal.

18. The integrated circuit according to claim 11, wherein the at least one output, in operation, is coupled to an antenna of the base station.

19. An integrated circuit comprising circuitry, which, in operation:
    controls reception of downlink control information for each of a plurality of downlink component carriers, with which a terminal apparatus is configured; and
    controls transmission of a signal on a frequency resource, the frequency resource including a first frequency resource and a second frequency resource of an uplink channel and being determined from resource information included in the downlink control information, with a frequency hopping between the first frequency resource in a first slot and the second frequency resource in a second slot within a subframe,
    wherein a frequency hopping interval between the first frequency resource and the second frequency resource that are determined from the resource information included in the downlink control information for one of the plurality of downlink component carriers is the same as that for another one of the plurality of downlink component carriers.

20. The integrated circuit according to claim 19, further comprising:
    at least one input coupled to the circuitry, wherein the at least one input, in operation, receives the downlink control information; and
    at least one output coupled to the circuitry, wherein the at least one output, in operation, outputs the signal to be transmitted.

21. An integrated circuit comprising circuitry, which, in operation:
    controls transmission, to a terminal that is configured with a plurality of downlink component carriers and that communicates with a base station, of downlink control information for each of the plurality of downlink component carriers; and
    controls reception of a signal that is transmitted from the terminal on a frequency resource, the frequency resource including a first frequency resource and a second frequency resource of an uplink channel and being determined from resource information included in the downlink control information, with a frequency hopping between the first frequency resource in a first slot and the second frequency resource in a second slot within a subframe,
    wherein a frequency hopping interval between the first frequency resource and the second frequency resource that are determined from the resource information included in the downlink control information for one of the plurality of downlink component carriers is the same as that for another one of the plurality of downlink component carriers.

22. The integrated circuit according to claim 21, further comprising:
    at least one output coupled to the circuitry, wherein the at least one output, in operation, outputs the downlink control information to be transmitted; and
    at least one input coupled to the circuitry, wherein the at least one input, in operation, receives the signal.

* * * * *